United States Patent [19]
Shimada et al.

[11] Patent Number: 5,909,298
[45] Date of Patent: Jun. 1, 1999

[54] OPTICAL TELECOMMUNICATION APPARATUS FOR USE IN AN OPTICAL RING NETWORK

[75] Inventors: Shozo Shimada; Kiyonori Kusuda; Hirofumi Imabayashi; Katsuya Fujii; Tetsuya Takahashi; Masahiro Shioda, all of Kawasaki, Japan

[73] Assignee: Fujitsu Limited, Kanagawa, Japan

[21] Appl. No.: 08/804,894

[22] Filed: Feb. 24, 1997

[30] Foreign Application Priority Data

Jun. 18, 1996 [JP] Japan .................................. 8-157237
Jun. 19, 1996 [JP] Japan .................................. 8-158553

[51] Int. Cl.⁶ ........................ H04B 10/00; G02B 6/36; G02B 6/00
[52] U.S. Cl. .................... 359/163; 359/163; 359/162; 385/134; 385/135; 385/92
[58] Field of Search .................... 359/161, 163, 359/152; 455/90; 385/92, 88, 134

[56] References Cited

U.S. PATENT DOCUMENTS 5,353,367  10/1994  Czosnowski et al. .................. 385/135
5,412,497   5/1995  Kaetsu et al. ......................... 359/163
5,461,693  10/1995  Pimpinella ............................ 385/135
5,570,450  10/1996  Fernandez et al. .................... 385/134

*Primary Examiner*—Jason Chan
*Assistant Examiner*—Mohammad Sedighian
*Attorney, Agent, or Firm*—Helfgott & Karas, P C.

[57] ABSTRACT

An optical telecommunication unit includes a shielded case having a size adapted for mounting upon a standard open-rack frame, wherein the shielded case includes a rear panel carrying an interconnection pattern, a plurality of plug-in connectors provided on the rear panel at an inner side thereof in electrical connection with the interconnection pattern for holding plug-in units forming an optical telecommunication apparatus inside the optical telecommunication unit, wherein the optical telecommunication unit carries a plurality of interface connectors on the rear panel in electrical connection with the interconnection pattern for accepting external interconnection cables, and a rear cover is provided on the shielded case so as to cover the rear panel.

15 Claims, 48 Drawing Sheets

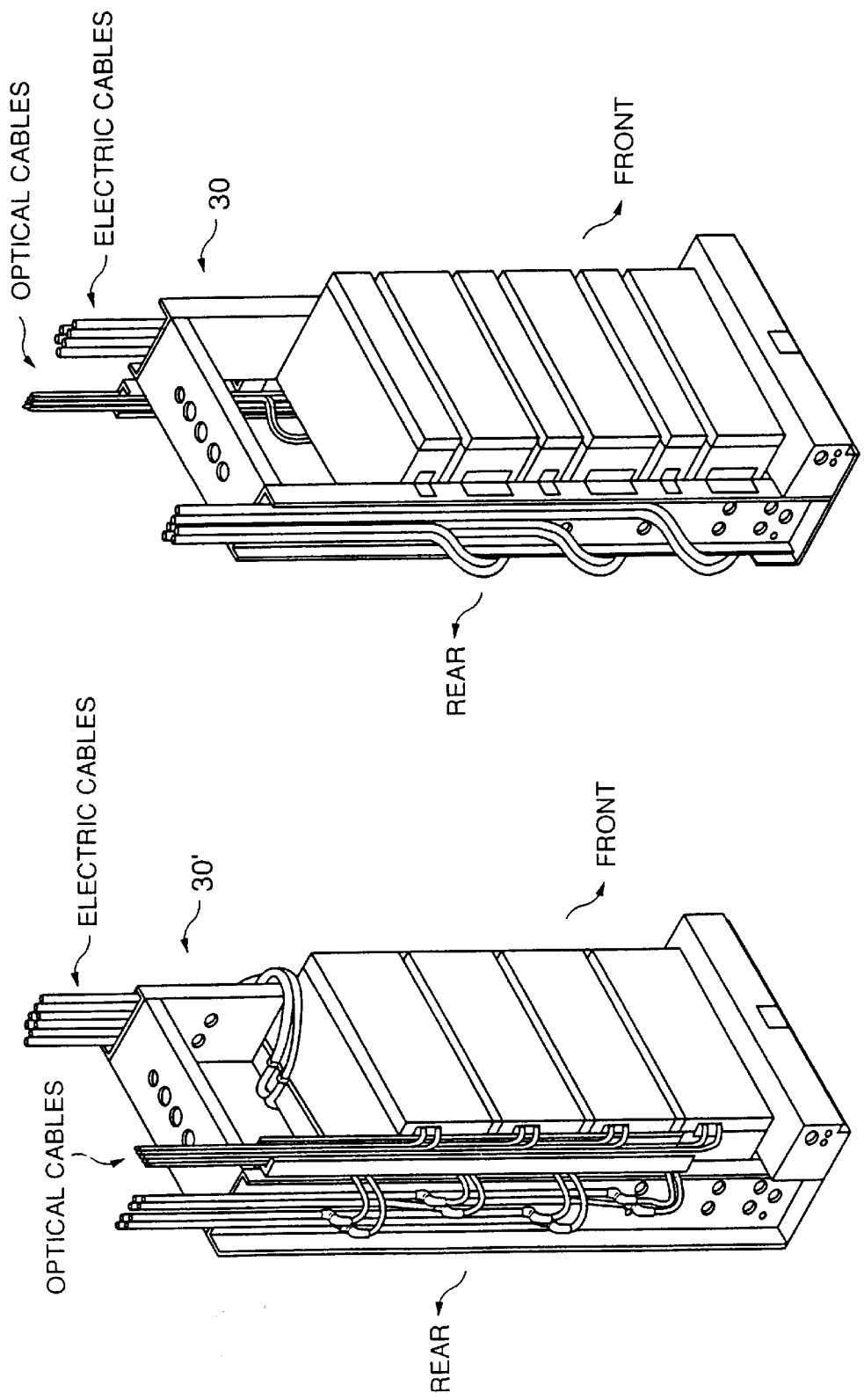

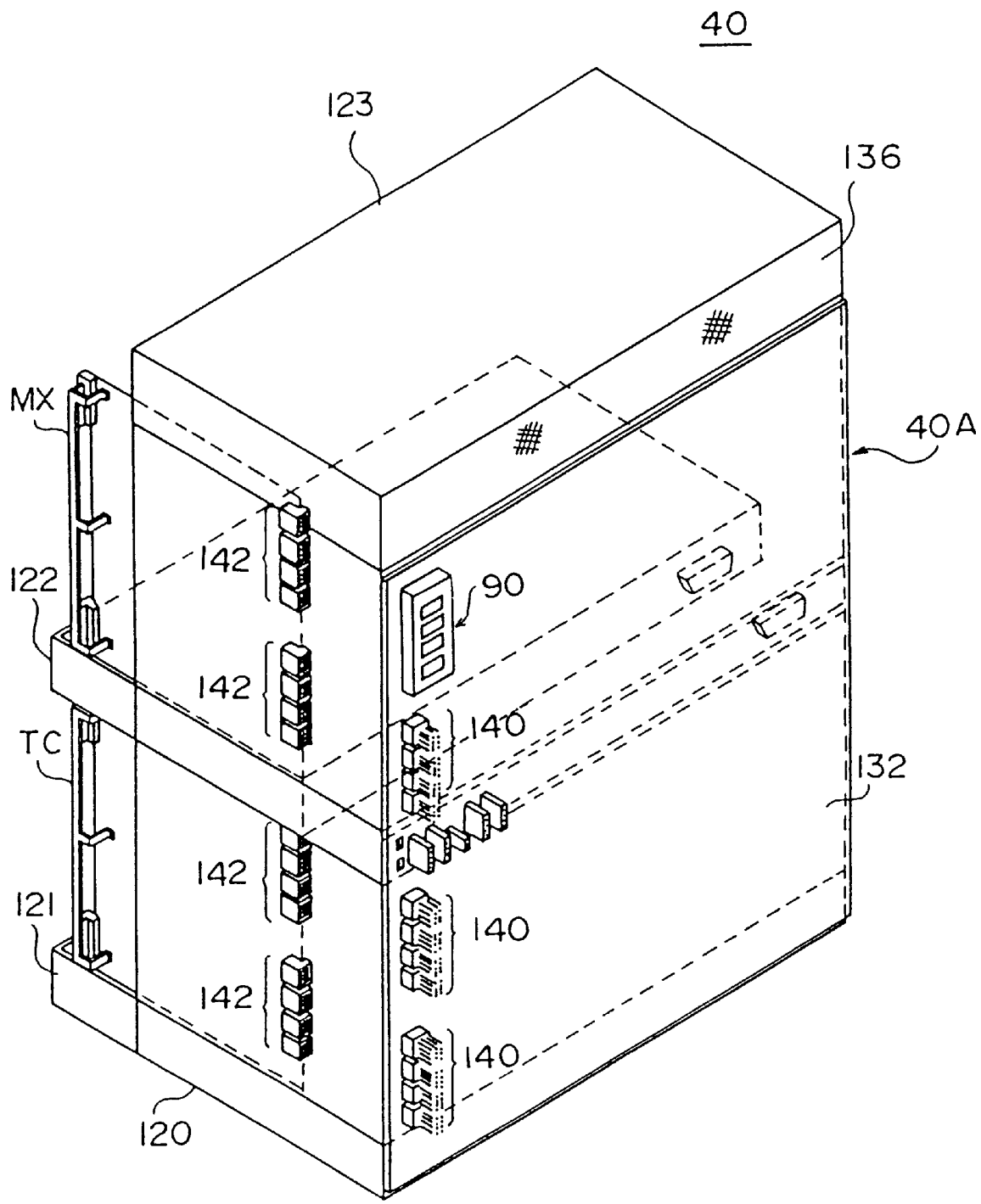

FIG. 22A  FIG. 22B
FIG. 22C  FIG. 22D
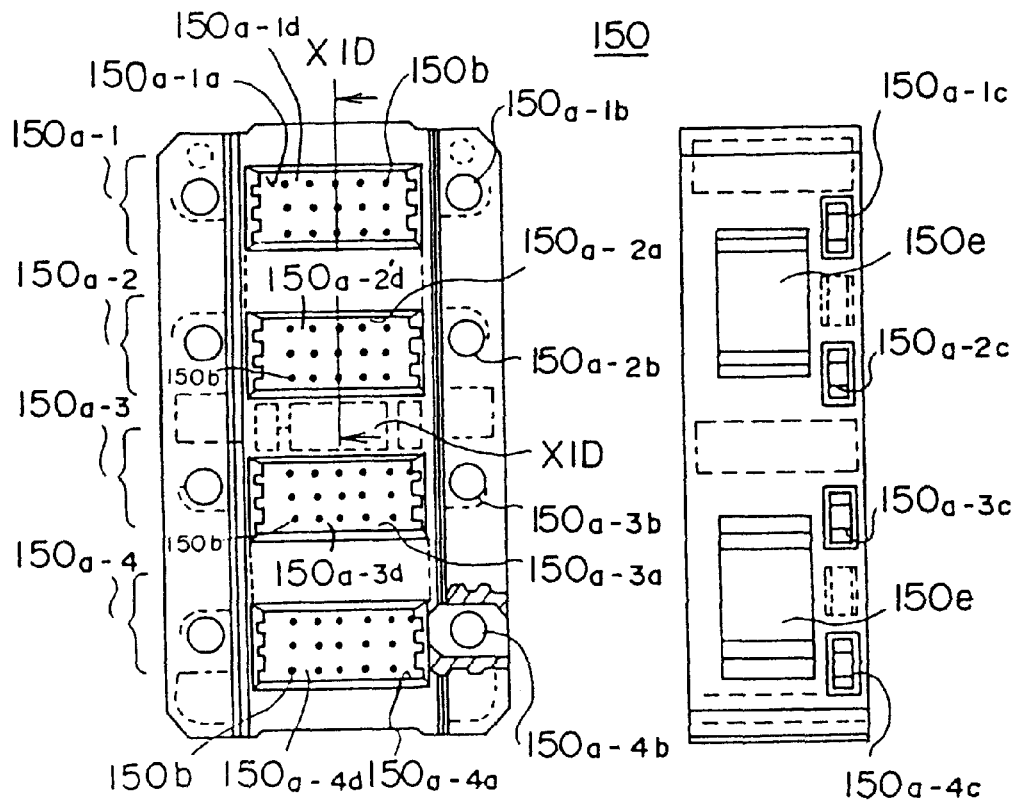
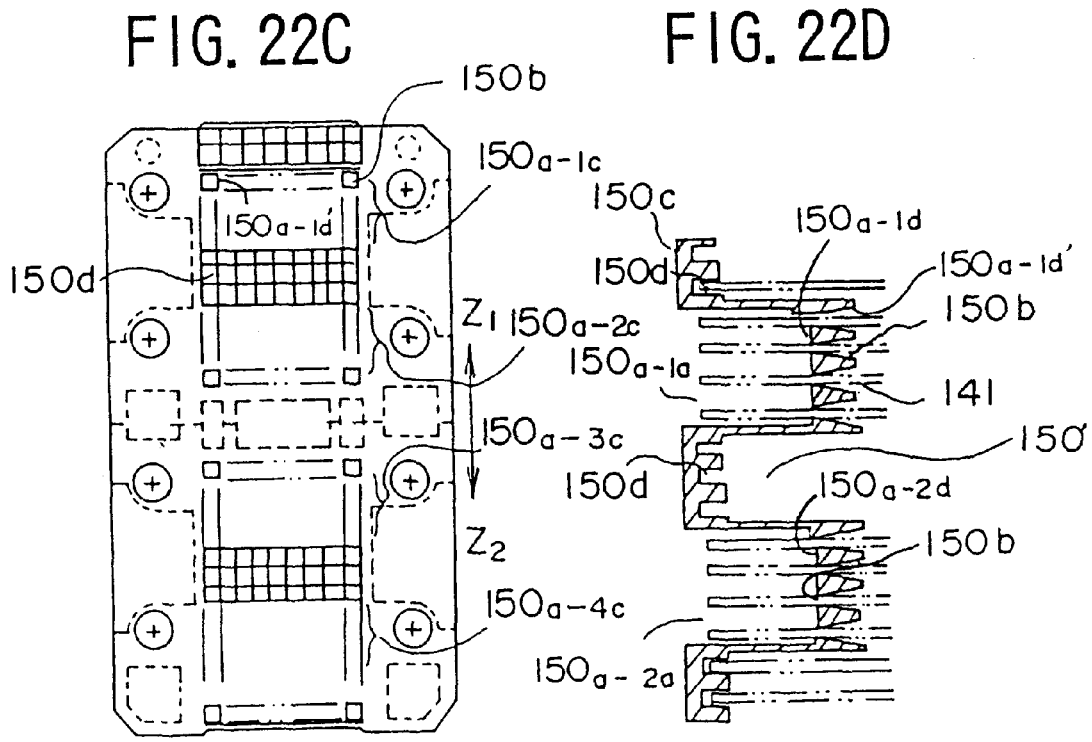

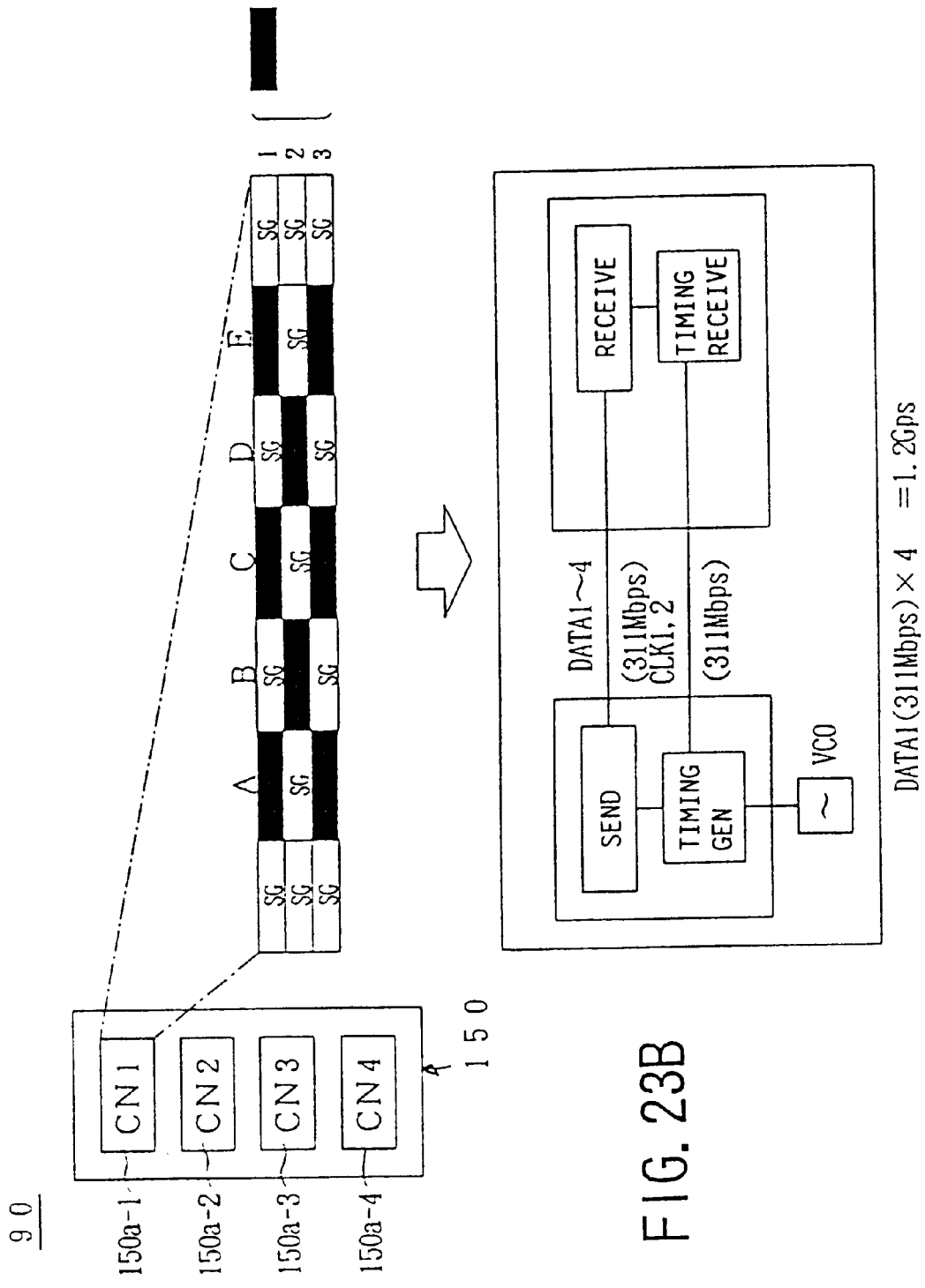

FIG. 34A
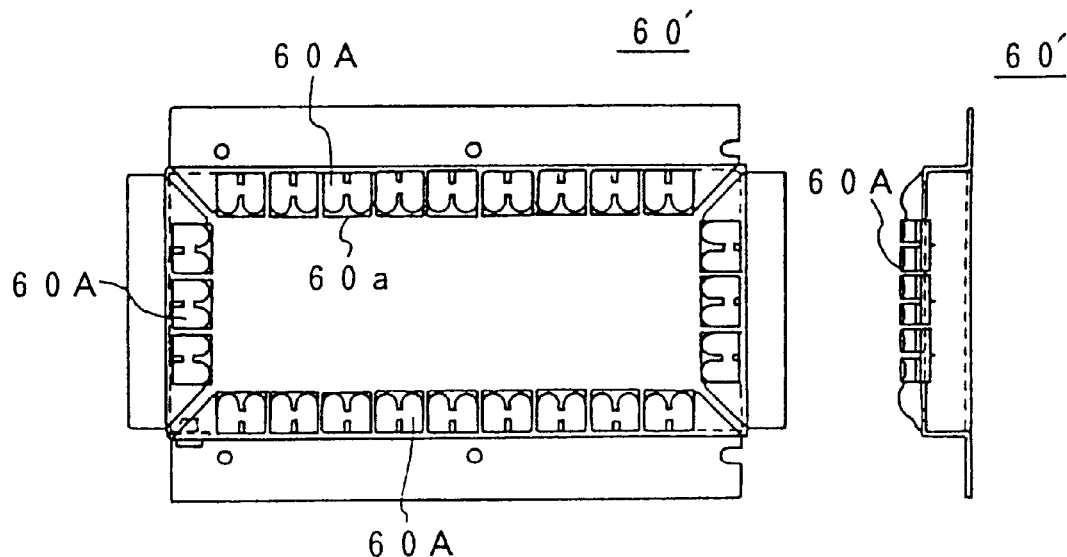
FIG. 34B
FIG. 34C
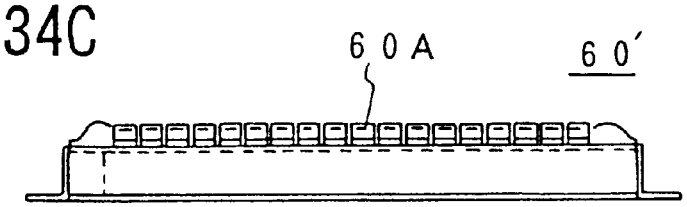
FIG. 34D
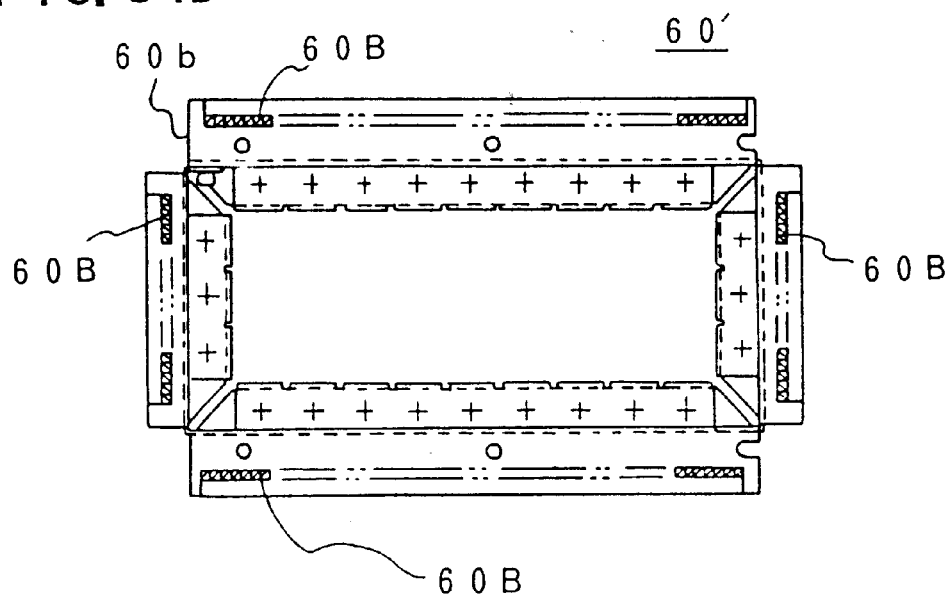

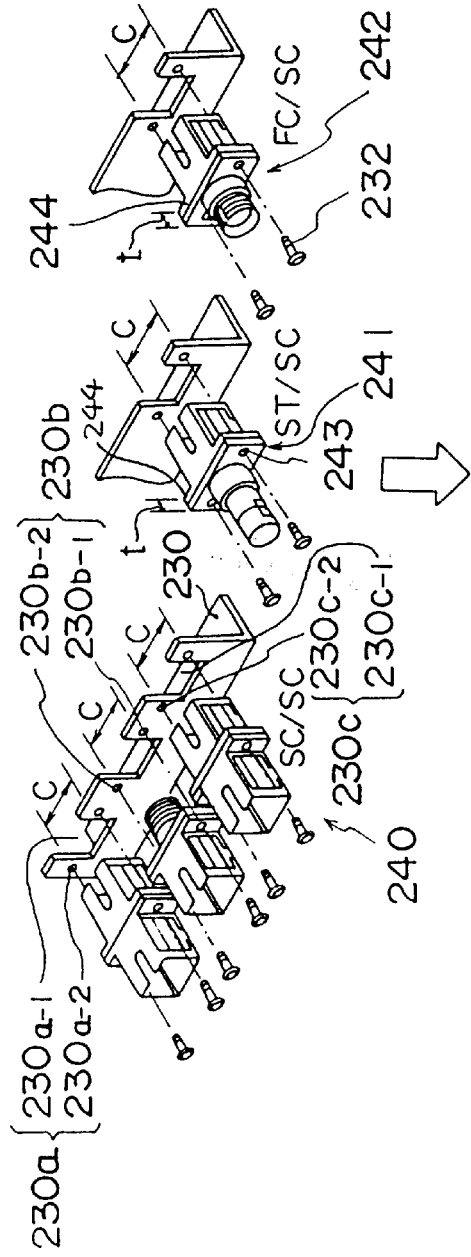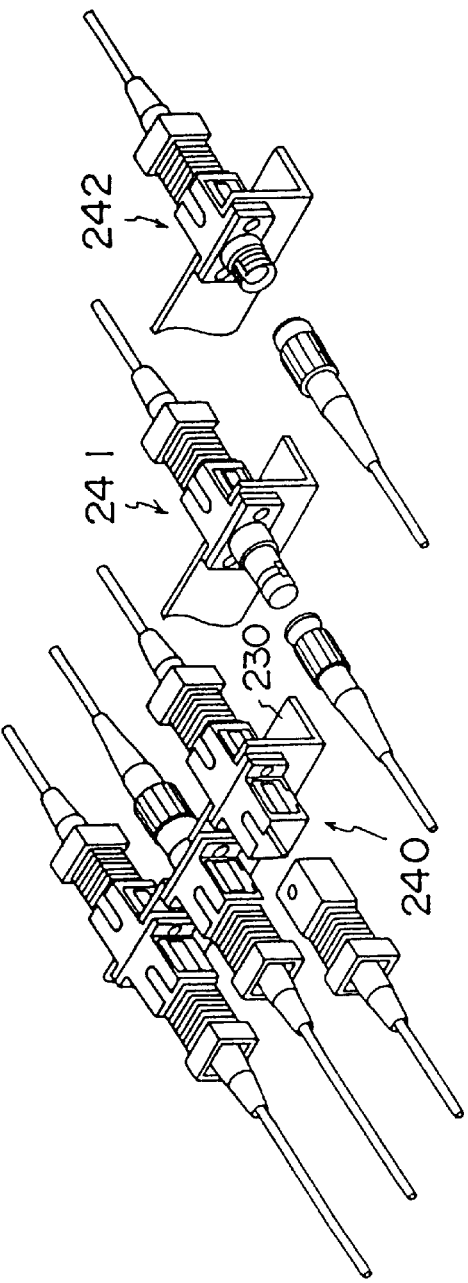

OPTICAL TELECOMMUNICATION APPARATUS FOR USE IN AN OPTICAL RING NETWORK

BACKGROUND OF THE INVENTION

The present invention generally relates to the art of optical telecommunications and more particularly to an optical telecommunication apparatus for use in a node forming a part of an optical ring network.

FIG. 1 shows a typical example of a two-fiber bidirectional-line-switched-ring (2F-BLSR) network 10 that is used commonly in current optical telecommunication networks.

Referring to FIG. 1, the 2F-BLSR network 10 includes nodes $11_1$–$11_4$ connected with each other by an optical fiber link, wherein the nodes $11_1$–$11_4$ are connected each other successively in a counterclockwise direction by a first optical link called a work link Wk and a second, redundant optical link called a protect link P, wherein the protect link connects the nodes $11_1$–$11_4$ in a clockwise direction. Thus, the work link Wk carries optical signals traveling in the counter-clockwise direction in the ring 10, while the protect link P carries optical signals traveling in the ring 10 in the clockwise direction.

Thus, when there occurs a failure in the work link Wk, the ring network continues functioning properly by using the protect link P. For this purpose, each of the nodes $11_1$–$11_4$ includes a switch circuit as will be explained later.

FIG. 2 shows a typical example of a four-fiber bidirectional-line-switched-ring (4F-BLSR) network 20 that is proposed for enhancing the capability of the network to maintain a connection upon occurrence of a severe failure in the link.

Referring to FIG. 2, the 4F-BLSR network 20 includes nodes $21_1$–$21_4$ connected with each other by an optical fiber link, wherein the nodes $21_1$–$21_4$ are connected in the counter-clockwise direction by a work link Wk1 and a protect link P2 and further in the clockwise direction by a work link Wk2 and a protect link P1.

Thus, in the 4F-BLSR network 20, any failure occurred in the second work link Wk2 is immediately saved by using the protect link P1 as indicated in FIG. 3A. Similarly, any failure occurred in the work link Wk1 is immediately saved by using the protect link P2. Further, the 4F-BLSR network 20 is capable of saving the failure occurred in all of the links connecting a pair of mutually adjacent nodes such as the node $21_1$ and the node $21_4$, by forming a link between the nodes $21_1$ and $21_4$ by the first and second protect links P1 and P2 over the nodes $21_2$–$21_4$ as indicated in FIG. 3B.

FIG. 4 shows the construction of the node $11_1$ used in the 2F-BLSR system of FIG. 2 in the form of a block diagram. As other nodes $11_2$–$11_4$ have substantially the same construction, the description thereof will be omitted.

Referring to FIG. 4, the node $11_1$ includes a reception unit $(11A)_{WK}$ to which a high-speed multiplexed optical signal comes in from the node $11_4$ located at an East-side via the work link WK and another reception unit $(11A)_P$ to which a multiplexed optical signal is supplied from the node $11_2$ located at a West-side via the protect link P. The reception unit $(11A)_{WK}$ includes a photo reception device RC(1) for detection of the incoming optical signal and a demultiplexer device DM(1) for demultiplexing the multiplexed signal detected by the photoreception device RC(1) into individual signal components. Similarly, the reception unit $(11A)_P$ includes a photo reception device RC(2) corresponding to the photo reception device RC(1) and a demultiplexer device DM(2) corresponding to the demultiplexer device DM(1).

It should be noted that each of the photo reception devices RC(1) and RC(2) receives an optical transmission having a bit-rate of 1.2 Gbps, wherein the bit-rate of 1.2 Gbps corresponds to a transmission of 24 channels each channel having a bit-rate of 50 Mbps. Thus, the photo reception device RC(1) receives the optical transmission for the first twenty-four channels (CH1–CH24) while the photo reception device RC(2) receives the optical transmission for the second twenty-four channels (CH25–CH48).

The signals for the channels CH1–CH24 thus detected by the photo reception device RC(1) are then demultiplexed by the demultiplexer device DM(1) in the photo reception device RC(1), and the signals for the first twenty-four channels (CH1–CH24) thus demultiplexed are supplied to a first switch unit $(11B)_{WK}$ and further to a second switch unit $(11B)_P$. Similarly, the signals for the channels CH25–CH48 are demultiplexed by the demultiplexer device DM(2) and are supplied to the first switch unit $(11B)_{WK}$ as well as to the second switch unit $(11B)_P$.

The first and second switch units $(11B)_{WK}$ and $(11B)_P$, on the other hand, cooperate with each other and supply the signals of the first twenty-four channels (CH1–CH24) and the signals of the second twenty-four channels (CH25–CH48) selectively to one of first and second optical transmission units $(11C)_{WK}$ and $(11C)_P$ connected respectively to the work link Wk and the protect link P at a West-side of the node, wherein each of the optical transmission units $(11C)_{WK}$ and $(11C)_P$ includes a multiplexer devices MX(1) or MX(2) and a laser transmitter device TC(1) or TC(2).

Thus, when there is a failure in the work link Wk at the West-side of the node $11_1$ leading to the node $11_2$, the switch unit $(11B)_{WK}$ switches the path of the signals for the channels CH1–CH24, such that the signals of the channels CH1–CH24 are supplied from the photoreception unit (11A)$_{Wk}$ at the East-side to the optical transmission unit $(11C)_P$ also at the East-side. Thereby, the signals are transmitted from the node $11_1$ to the node $11_2$ via the protect link P over the nodes $11_4$ and $11_3$ consecutively. Simultaneously, the switch unit $(11B)_P$ switches the signal path such that the photoreception unit $(11A)_P$ and the optical transmission unit $(11C)_P$ are disconnected.

Further, each of the nodes $11_1$–$11_4$ includes an add/drop unit A/D in the switch unit $(11B)_{WK}$ or $(11B)_P$ as indicated in FIG. 4 for an add/drop control of optical signals in anticipation of connecting the node to an external optical network or link outside the 2F-BLSR network 10.

Conventionally, the apparatus of FIG. 4 has been used successfully in a node of an optical network in a state that the apparatus is accommodated in NEBS (Bellcore spec) standard open-rack frame structure typically having a height of 2100 mm (7 feet), a width of 660 mm and a depth of 305 mm (12 inches) as indicated in FIGS. 5A or 5B, wherein both of FIG. 5A and FIG. 5B show a frame 30 or 30' for a front-side loading of devices. In the frame 30 of FIG. 5A, it should be noted that the cables, provided along one or both of the side pillars, are connected to the corresponding devices on the frame 30 at a rear side thereof as indicated in FIG. 6A. In the frame 30' of FIG. 5B, on the other hand, the cables are connected to the corresponding devices at a front side thereof as indicated in FIG. 6B.

As the size of the frame is thus limited, it is necessary to reduce the size of the devices loaded on the frame as much as possible. The optical telecommunication apparatus of FIG. 4 is no exception.

As long as the optical telecommunication apparatus on the frame is used to handle the optical bit-stream of 2.4 Gbps, 1.2 Gbps for the work channels CH1–CH24 and 1.2 Gbps for the protect channels CH25–CH48, no problem occurs. The apparatus of FIG. 4 can be formed by merely connecting the various units by a limited number of coaxial cables. The apparatus thus assembled easily fits into the standard frame of FIGS. 5A or 5B.

When the bit-rate of the incoming optical signals is increased, however, there arises various difficulties as noted below.

FIG. 7 shows an example of the circuit in which the telecommunication circuit of FIG. 4 is expanded in a straightforward manner so as to handle the optical transmission of 9.6 Gbps in total, 4.8 Gbps of which are for the work channel and 4.8 Gbps of which are for the protect channel. In FIG. 7, those parts corresponding to the parts described already with reference to FIG. 4 are designated by the same reference numerals and the description thereof will be omitted.

Referring to FIG. 7, it should be noted that the incoming multiplexed optical signal on the work link Wk now includes 1–96 channels each carrying optical signals with a bit-rate of 50 Mbps. In correspondence to this, the circuit of FIG. 7 uses four switch devices MM1–MM4 for the switch unit $(11B)_{Wk}$ each capable of handling signals of 24 channels or 1.2 Gbps bit-rate. In all, the switch unit $(11B)_{Wk}$ of the apparatus of FIG. 7 is capable of handling 4.8 Gbps bit-rate signals. Thus, the switch device MM1 handles the channels 1–24 for the work channel or the channels 97–120 for the protect channel, the switch device MM2 handles the channels 25–48 for the work channel or the channels 121–144, the switch device MM3 handles the channels 49–72 for the work channel or the channels 145–168 for the protect channel, and the switch device MM4 handles the channels 73–96 for the work channel or the channels 169–192 for the protect channel.

In FIG. 7, it should be noted that there are another four switch devices MM5–MM8 for the switch unit $(11B)_P$ of the protect link, wherein the switch devices MM5–MM8 have a similar construction to the switch devices MM1–MM4. Thus, the number of wirings for the circuit of FIG. 7 becomes, although not illustrated in FIG. 7, four times as large as that of the circuit of FIG. 4, and interconnection of various units by way of coaxial cables becomes difficult. This is particularly true when the overall size of the apparatus has to be adapted so as to fit into the standard frame of FIGS. 5A or 5B.

FIG. 8 shows an example of the telecommunication apparatus in which the apparatus of FIG. 4 is expanded in a straightforward manner so as to be capable of forming a 4F-BLSR network.

Referring to FIG. 8 showing the constitution of the node 21 of FIG. 4 as an example, the apparatus includes two series of circuits somewhat similar to the circuit of FIG. 7 respectively at the east side and the west side, such that the high-speed multiplexed optical signals on the work link Wk1 and the protect link P2 are received respectively by a photoreception unit $(21A)_{Wk1}$ and a photoreception unit $(21A)_{P2}$ at the east side of the node 21. Similarly, the high-speed optical signals on the work link Wk2 and the protect link P1 are received respectively by a photoreception unit $(21A)_{Wk2}$ and $(21A)_{P1}$ at the west side of the node 21. Similarly as before, each of the photoreception units includes a photoreception device designated as RC(1) or RC(2) and a demultiplexer device designated as DM(1) or DM(2).

Each of the photoreception units $(21A)_{Wk1}$, $(21A)_{Wk2}$, $(21A)_{P1}$ and $(21A)_{P2}$ supplies an output signal corresponding to the incoming high-speed optical signal to corresponding one of switch units $(21B)_{Wk1}$, $(21B)_{Wk2}$, $(21B)_{P1}$ and $(21B)_{P2}$, wherein each of the switch units $(21B)_{Wk1}$, $(21B)_{P1}$, $(21B)_{Wk2}$ and $(21B)_{P2}$ includes four switch circuits. The switch unit $(21B)_{Wk1}$ includes the switch devices MM1–MM4, while the switch unit $(21B)_{P2}$ includes the switch devices MM5–MM8, wherein each of the switch devices MM1–MM8 handles signals of 48 channels. For example, the switch device MM1 of the switch unit $(21B)_{Wk1}$ handles the signals of the channels 1 through 24 supplied from the photoreception unit $(21A)_{Wk1}$ as well as the signals of the channels 1–24 supplied from the photoreception unit $(21A)_{P2}$ at a first switch element SW and further the signals of the channels 1–24 supplied from the photoreception unit $(21A)_{Wk2}$ and the signals of the channels 1–24 supplied from the photoreception unit $(21A)_{P1}$ at a second switch element also designated by SW. Similarly, the switch device MM2 handles the channels 25–48 and the channels 25–48, the switch device MM3 handles the channels 49–72 and the channels 49–72, and the switch device MM4 handles the channels 73–96 and the channels 73–96. The other switch units $(21B)_{P2}$, $(21B)_{Wk2}$ and $(21B)_{P1}$ have a similar construction.

Further, each of the switch units $(21B)_{Wk1}$–$(21B)_{P2}$ is connected to each of optical transmission units $(21C)_{Wk2}$ and $(21C)_{P1}$ at the west side as well as to each of optical transmission units $(21C)_{Wk1}$ and $(21C)_{P2}$ at the east side.

Thus, in the normal operational mode of the 4F-BLSR system shown in FIG. 2, the switch units $(21B)_{Wk1}$–$(21B)_{P2}$ forward the optical signals incoming to the east side via the work link Wk1 and the protect link P2 of the east side respectively to the work link Wk1 and the protect link P2 of the west side and further the optical signals incoming to the west side via the work link Wk2 and the protect link P1 of the west side respectively to the work link Wk2 and the protect link P1 of the east side. When there occurs a failure in the link, the switch units $(21B)_{Wk1}$–$(21B)_{P2}$ switches the path of the optical signals as indicated in FIGS. 3A or 3B. Thus, the work link Wk1 may become the work link Wk2 and the protective link P1 may become the protect link P2, or vice versa, depending upon the switching in the switch units $(21B)_{Wk1}$–$(21B)_{P2}$.

It should be noted that the construction of FIG. 8 requires a very complex wiring between various units. Thus, it becomes extremely difficult or totally impossible to assemble the apparatus of FIG. 8 with a size such that the apparatus is accommodated in the standard open-rack frame shown in FIGS. 6A or 6B, as long as the interconnection is achieved by way of coaxial cables.

Further, there are customers who wish to continue operating the 2F-BLSR system with the construction of FIG. 7 for the optical telecommunication apparatus while opening the possibility of constructing the 4F-BLSR system in the future. In such a case, it is desired not to discard the existing optical telecommunication apparatus when constructing the 4F-BLSR system but to upgrade the existing optical telecommunication apparatus.

As to the first problem, it is well known that the complexity of wiring is successfully eliminated by using a printed circuit board. However, use of a printed circuit board in such a GHz system inevitably causes a problem of extensive electromagnetic emission. In order to avoid this problem, a shielding structure has to be devised in combination with the printed circuit board.

As to the second problem, it is necessary to form the optical telecommunication apparatus with a size such that two of the optical telecommunication apparatuses, each used for forming a 2F-BLSR system, are accommodated in the standard open-rack frame in order to form a 4F-BLSR system. In relation to this, it should be noted that each of the optical telecommunication apparatus has to have a shielding such that the node can be operated in the state equipped with only one of the optical telecommunication apparatuses while the half of the open-rack frame is empty.

Further, the optical telecommunication apparatus should be configured so as to allow an interconnection with another optical telecommunication apparatus to form a telecommunication apparatus for the 4F-BLSR system.

In addition, it is desired to provide an optical compensation device inside the open-rack frame in order to compensate for the dispersion of optical signals caused during the transmission through the optical fibers forming the optical link.

SUMMARY OF THE INVENTION

Accordingly, it is a general object of the present invention to provide a novel and useful optical telecommunication apparatus wherein the foregoing problems are eliminated.

Another and more specific object of the present invention is to provide an optical telecommunication apparatus capable of forming a node of a 2F-BLSR system as well as a node of a 4F-BLSR system and having a size suitable for accommodation in a standard open-rack frame.

Another object of the present invention is to provide an optical telecommunication apparatus having an improved shielding structure.

Another object of the present invention is to provide an optical telecommunication apparatus that includes an optical compensation device inside the body of the optical telecommunication apparatus.

Another object of the present invention is to provide an optical telecommunication unit, comprising:
   a shielded case having a front opening, said shielded case having a size such that two of said shielded cases can be accommodated with a vertical alignment in a standard open-rack frame having a height of about 2100 mm, a width of 660 mm and a depth of about 305 mm;
   a rear panel closing a rear opening of said shielded case;
   an interconnection pattern provided on said rear panel;
   a plurality of plug-in connectors provided on said rear panel at an inner side thereof in electrical connection with said interconnection pattern;
   an optical telecommunication apparatus carrying a plug-in connector, said optical telecommunication apparatus being provided such on said rear panel such that said plug-in connector of said optical telecommunication apparatus establishes a removal engagement with a corresponding plug-in connector on said rear panel;
   a plurality of interface connectors provided on said rear panel, each of said interface connectors including a plurality of interconnection pins studded on said rear panel in electrical contact to said interconnection pattern and a protective shroud provided on an outer side of said rear panel so as to surround said interconnection pins, said interconnection pins extending outwardly from said rear panel in each of said interface connectors for accepting an external connector, said protective shroud being adapted for guiding said external connector for insertion to and removal away from said interface connector; and
   a rear cover provided on said shielded case so as to cover said rear panel, said rear cover carrying a plurality of openings for exposing said interface connectors;
   said rear cover being adapted for carrying a shield cover plate at an outer side thereof for shielding one or more of said openings.

Another object of the present invention is to provide an optical telecommunication terminal for use in a two-fiber bidirectional-line-switched ring network, comprising:
   an open-rack frame; and
   an optical telecommunication unit accommodated in said open-rack frame, said optical telecommunication unit comprising:
      a shielded case having a front opening, said shielded case having a size such that two of said shielded cases can be accommodated with a vertical alignment in said open-rack frame;
      a rear panel closing a rear opening of said shielded case;
      an interconnection pattern provided on said rear panel;
      a plurality of plug-in connectors provided on said rear panel at an inner side thereof in electrical connection with said interconnection pattern;
      an optical telecommunication apparatus carrying a plug-in connector, said optical telecommunication apparatus being provided such that said plug-in connector of said optical telecommunication apparatus establishes a removal engagement with a corresponding plug-in connector on said rear panel;
      a plurality of interface connectors provided on said rear panel, each of said interface connectors including a plurality of interconnection pins studded on said rear panel in electrical contact to said interconnection pattern and a protective shroud provided on an outer side of said rear panel so as to surround said interconnection pins, said interconnection pins extending outwardly from said rear panel in each of said interface connectors for accepting an external connector, said protective shroud being adapted for guiding said external connector for insertion to and removal away from said interface connector;
      a rear cover provided on said shielded case so as to cover said rear panel, said rear cover carrying a plurality of openings for exposing said interface connectors; and
      a shield cover plate provided on said rear cover at an outer side thereof for shielding said openings;
      said optical telecommunication apparatus being connected optically to said incoming optical fiber cable and said outgoing optical fiber cable of said work channel and said incoming optical fiber cable and said outgoing optical fiber cable of said protect channel.

Another object of the present invention is to provide an optical telecommunication terminal for use in a four-fiber bidirectional-line-switched ring network, comprising:
   an open-rack frame;
   a first optical telecommunication unit accommodated in said open-rack frame;
   a second optical telecommunication unit accommodated in said open-rack frame in a vertical alignment with said first optical telecommunication unit;
   each of said first and second optical telecommunication units comprising:
      a shielded case having a front opening, said shielded case having a size such that two of said shielded cases can be accommodated with a vertical alignment in said open-rack frame;

a rear panel closing a rear opening of said shielded case;

an interconnection pattern provided on said rear panel;

a plurality of plug-in connectors provided on said rear panel at an inner side thereof in electrical connection with said interconnection pattern;

an optical telecommunication apparatus carrying a plug-in connector, said optical telecommunication apparatus being provided such on said rear panel such that said plug-in connector of said optical telecommunication apparatus establishes a removal engagement with a corresponding plug-in connector on said rear panel;

a plurality of interface connectors provided on said rear panel, each of said interface connectors including a plurality of interconnection pins studded on said rear panel in electrical contact to said interconnection pattern and a protective shroud provided on an outer side of said rear panel so as to surround said interconnection pins, said interconnection pins extending outwardly from said rear panel in each of said interface connectors for accepting an external connector, said protective shroud being adapted for guiding said external connector for insertion to and removal away from said interface connector;

a rear cover provided on said shielded case so as to cover said rear panel, said rear cover carrying a plurality of openings for exposing said interface connectors; and said rear cover being adapted for carrying a shield cover plate at an outer side thereof for shielding one or more of said openings;

said optical telecommunication apparatus of said first optical telecommunication unit being connected to an optical fiber cable of a first incoming work channel and an optical fiber cable of a first incoming protect channel and further to an optical fiber cable of a first outgoing work channel and an optical fiber cable of a first outgoing protect channel;

said optical telecommunication apparatus of said second optical telecommunication unit being connected to an optical fiber cable of a second incoming work channel and an optical fiber cable of a second incoming protect channel and further to an optical fiber cable of a second outgoing work channel and an optical fiber cable of a second outgoing protect channel;

wherein said optical telecommunication terminal further includes a coaxial cable carrying a first connector and a second connector at respective ends thereof such that said first connector is removably connected to an interface connector of said first telecommunication apparatus and said second connector is removably connected to an interface connector of said second telecommunication apparatus.

Another object of the present invention is to provide an optical regenerative station for use in a four-fiber bidirectional-line-switched ring network, comprising:

an open-rack frame;

a first optical telecommunication unit accommodated in said open-rack frame;

a second optical telecommunication unit accommodated in said open-rack frame in a vertical alignment with said first optical telecommunication unit;

each of said first and second optical telecommunication units comprising:

a shielded case having a front opening, said shielded case having a size such that two of said shielded cases can be accommodated with a vertical alignment in said open-rack frame;

a rear panel closing a rear opening of said shielded case;

an interconnection pattern provided on said rear panel;

a plurality of plug-in connectors provided on said rear panel at an inner side thereof in electrical connection with said interconnection pattern;

an optical telecommunication apparatus carrying a plurality of plug-in connectors, said optical telecommunication apparatus being provided such on said rear panel such that said plug-in connectors of said optical telecommunication apparatus establish a removal engagement with corresponding plug-in connectors on said rear panel:

a plurality of interface connectors provided on said rear panel, each of said interface connectors including a plurality of interconnection pins studded on said rear panel in electrical contact to said interconnection pattern and a protective shroud provided on an outer side of said rear panel so as to surround said interconnection pins, said interconnection pins extending outwardly from said rear panel in each of said interface connectors for accepting an external connector, said protective shroud being adapted for guiding said external connector for insertion to and removal away from said interface connector;

a rear cover provided on said shielded case so as to cover said rear panel, said rear cover carrying a plurality of openings for exposing said interface connectors; and said rear cover being adapted to carry a shield cover plate at an outer side thereof for shielding one or more of said openings;

said optical telecommunication apparatus of said first optical telecommunication unit being connected to an optical fiber cable of a first incoming work channel and an optical fiber cable of a first incoming protect channel and further to an optical fiber cable of a first outgoing work channel and an optical fiber cable of a first outgoing protect channel;

said optical telecommunication apparatus of said second optical telecommunication unit being connected to an optical fiber cable of a second incoming work channel and an optical fiber cable of a second incoming protect channel and further to an optical fiber cable of a second outgoing work channel and an optical fiber cable of a second outgoing protect channel;

wherein said optical telecommunication terminal further includes a first coaxial cable and a second coaxial cable, said first coaxial cable carrying a first connector and a second connector at respective ends thereof such that said first connector is removably connected to an interface connector of said first telecommunication apparatus and said second connector is removably connected to another interface connector of said first telecommunication apparatus, said second coaxial cable carrying a third connector and a fourth connector at respective ends thereof such that said third connector is removably connected to an interface connector of said second telecommunication apparatus and said fourth connector is removably connected to another interface connector of said second telecommunication apparatus;

each of said first and second optical telecommunication units carrying a shield cover plate on said rear cover so as to cover one or more of said openings to which no coaxial cable is inserted.

According to the present invention, it is possible to form the body of the optical telecommunication unit, which is capable of handling an optical transmission with a bit rate of about 5 Gbits or more for each of the work and protect channels, to be small enough to fit in a standard size open-rack frame used commonly in a node of an optical network, as a result of use of the rear panel for carrying interconnection in the form of a multilayered interconnection pattern. By providing a rear cover and closing the unused openings by a shield cover plate, it is possible to eliminate the leakage of electromagnetic emission outside the body of the optical telecommunication unit. Further, by providing a shield block on the rear side of the rear panel so as to surround the power connector pins as well as the shunt capacitors, the problem of electromagnetic emission through the power cable is successfully eliminated. The optical telecommunication unit of the present invention can be used either as a terminal of a 2F-BLSR system or a terminal of a 4F-BLSR system or a regenerative station of a 4F-BLSR, by merely changing the connection of the coaxial cable at the interface connectors provided on the rear panel, without modifying the internal construction of the optical telecommunication unit.

Other objects and further features of the present invention will become apparent from the following detailed description when read in conjunction with the attached drawings.

BRIEF DESCRIPTION OF THE DRAWINGS

FIGS. 6A and 6B are diagrams showing the standard open-rack frames in the state that the open-rack frames support various units forming the terminal thereon;

FIG. 14 is a diagram showing the rear side of the optical telecommunication unit of FIG. 9 in an oblique view in the state that a rear cover thereof is removed;

FIGS. 22A–22D are diagrams showing a part of the interface connector in detail;

FIGS. 23A and 23B are diagrams showing the pin arrangement of the interface connector;

FIGS. 34A–34D are diagrams showing a modification of the power supply structure of FIG. 28;

FIGS. 44A–44F are diagrams showing the construction of optical adaptors used in the optical transmission unit of FIG. 42;

DETAILED DESCRIPTION OF THE PREFERRED EMBODIMENTS

Figure 9:
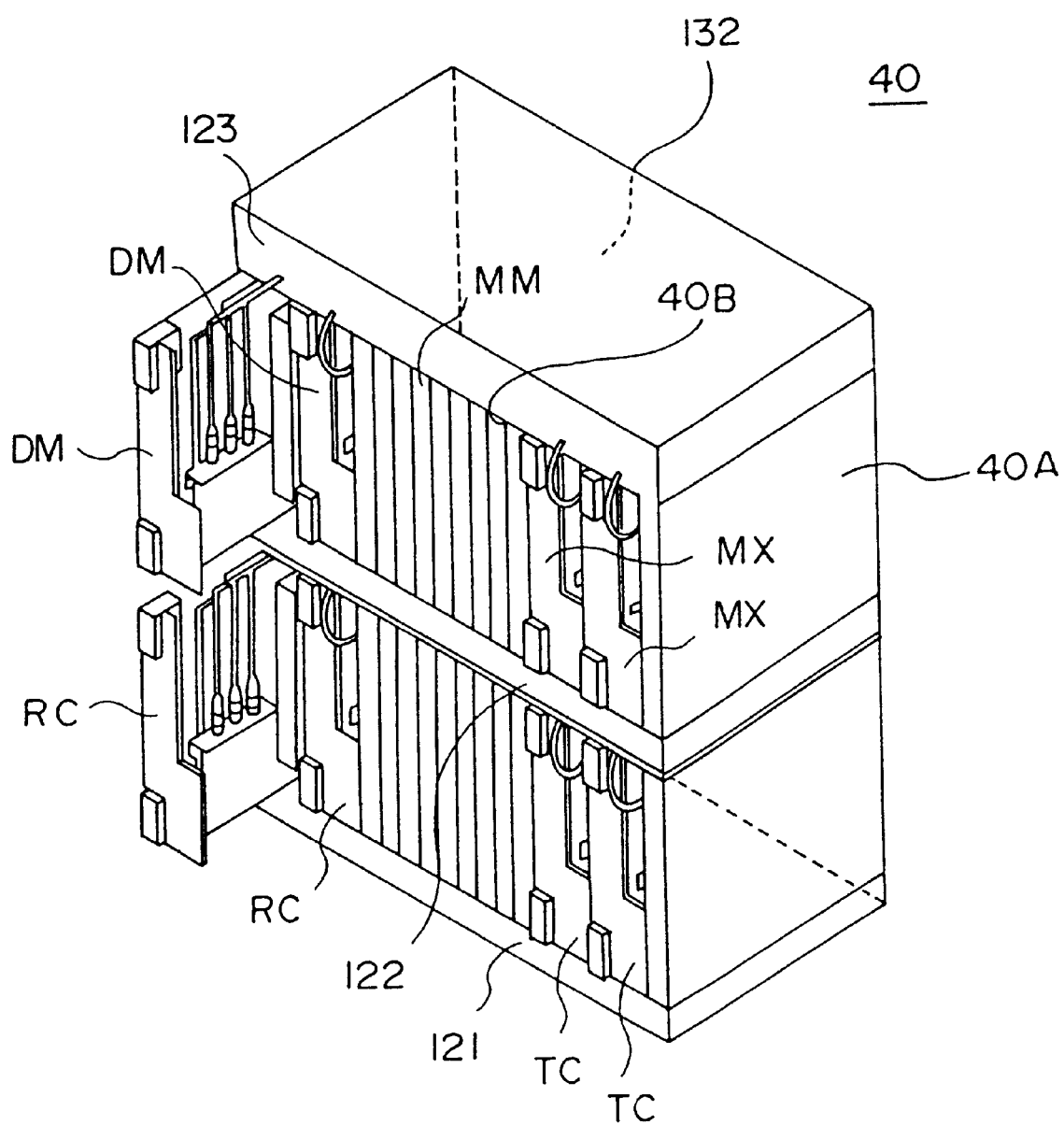
FIG. 9 is a diagram showing an optical telecommunication unit according to a first embodiment of the present invention in a front oblique view.

FIG. 9 shows the appearance of an optical telecommunication unit 40 according to a first embodiment of the present invention in a front oblique view.

Referring to FIG. 9, the optical telecommunication unit 40 is formed in a shield case 40A having a front opening 40B and a rear panel 132, and various plug-in units such as a photoreception device RC, a demultiplexing device DM, switch device MM, a multiplexer device MX and a optical transmission device TC are provided inside the shield case 40A in the form of printed circuit boards. As will be described later, the rear panel 132 carries plug-in connectors on the inner surface thereof, and the foregoing various plug-in units are inserted into the respective, corresponding plug-in connectors.

As indicated in FIG. 9, the various plug-in units RC–TC are arranged in the form of a lower shelf and an upper shelf, in which the photoreception device RC and the optical transmission device TC are arranged in the lower shelf while the demultiplexing device DM, the switch device MM and the multiplexing device MX are arranged in the upper shelf.

Underneath the lower shelf, there is provided a lower blower device 121 for cooling the plug-in units of the lower shelf, and an upper blower device 122 is provided between the lower shelf and the upper shelf for cooling the plug-in units in the upper shelf. Further, an optical terminal device 123 is provided above the upper shelf for optical connection of the photoreception device RC and optical transmission device TC with external optical cables.

In order to allow flexible use of the optical telecommunication unit 40 in various optical telecommunication facilities including a 2F-BLSR terminal, a 4F-BLSR terminal and a regenerative station, the optical telecommunication unit 40 carries a plurality of interface connectors 90 on the rear panel 132.

Figure 10:
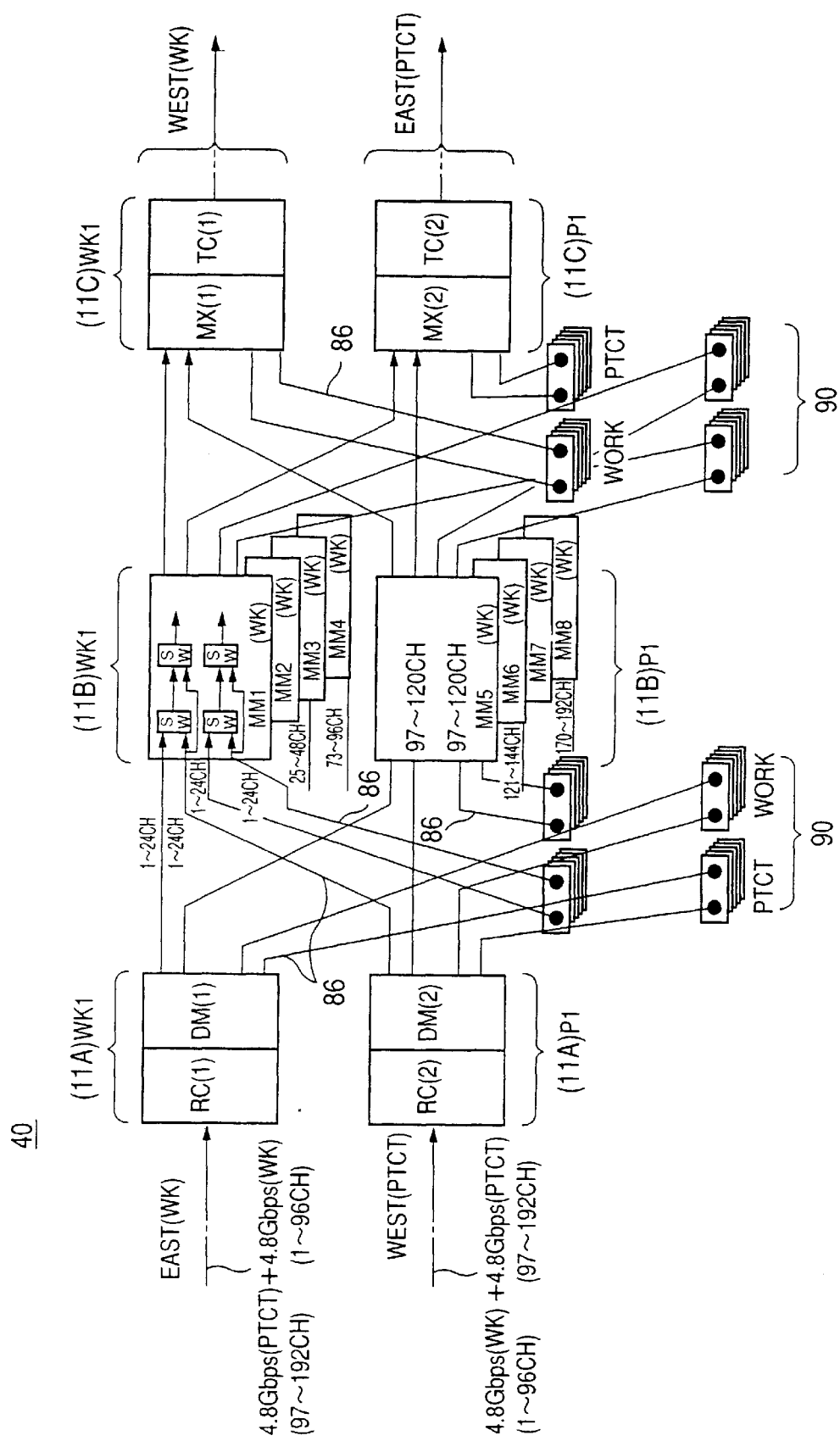
FIG. 10 is a block diagram showing the construction of the optical telecommunication unit of FIG. 9.
Figure 11:
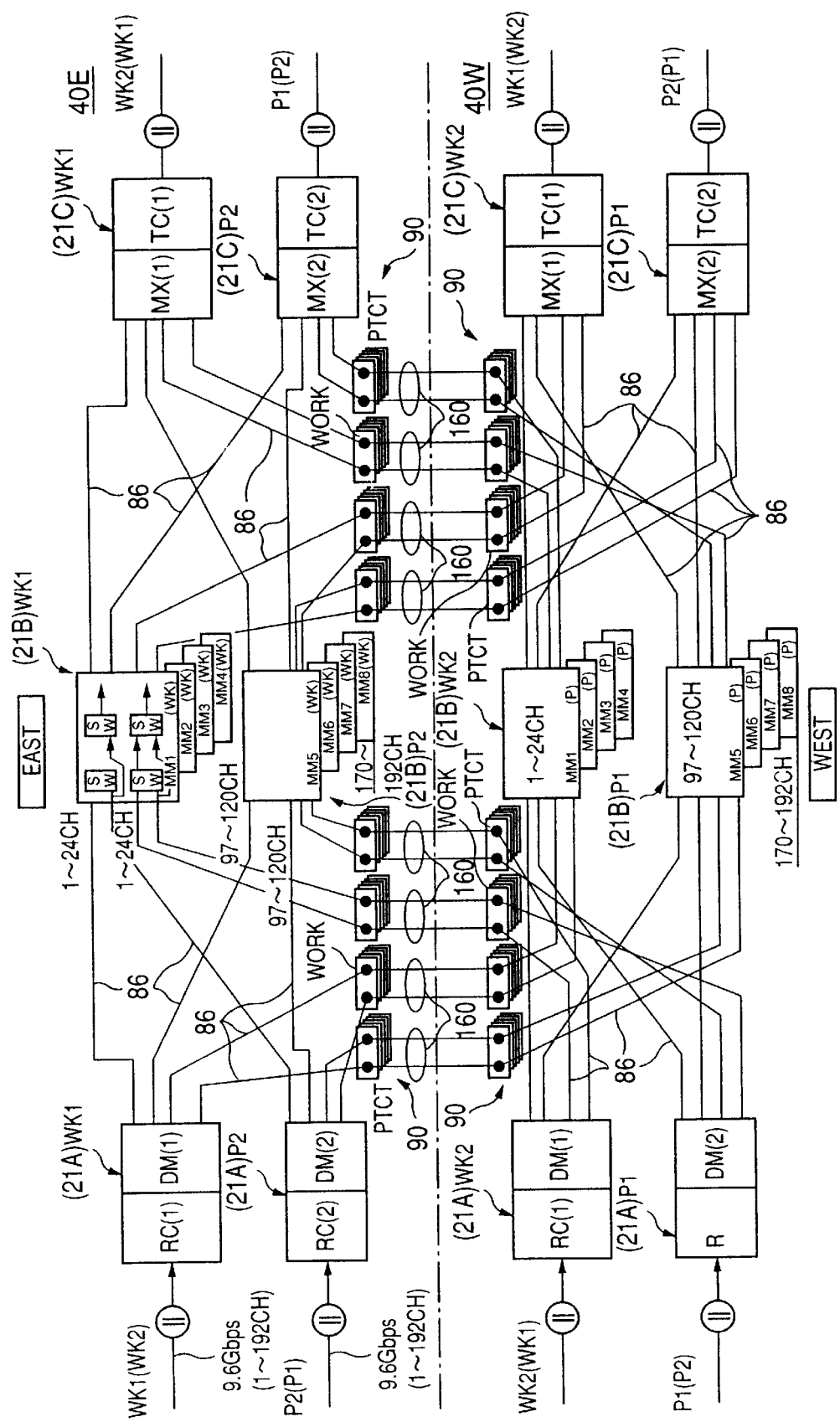
FIG. 11 is a block diagram showing the construction of a 4F-BLSR optical terminal constructed by using the optical telecommunication unit of FIG. 9.
Figure 12:
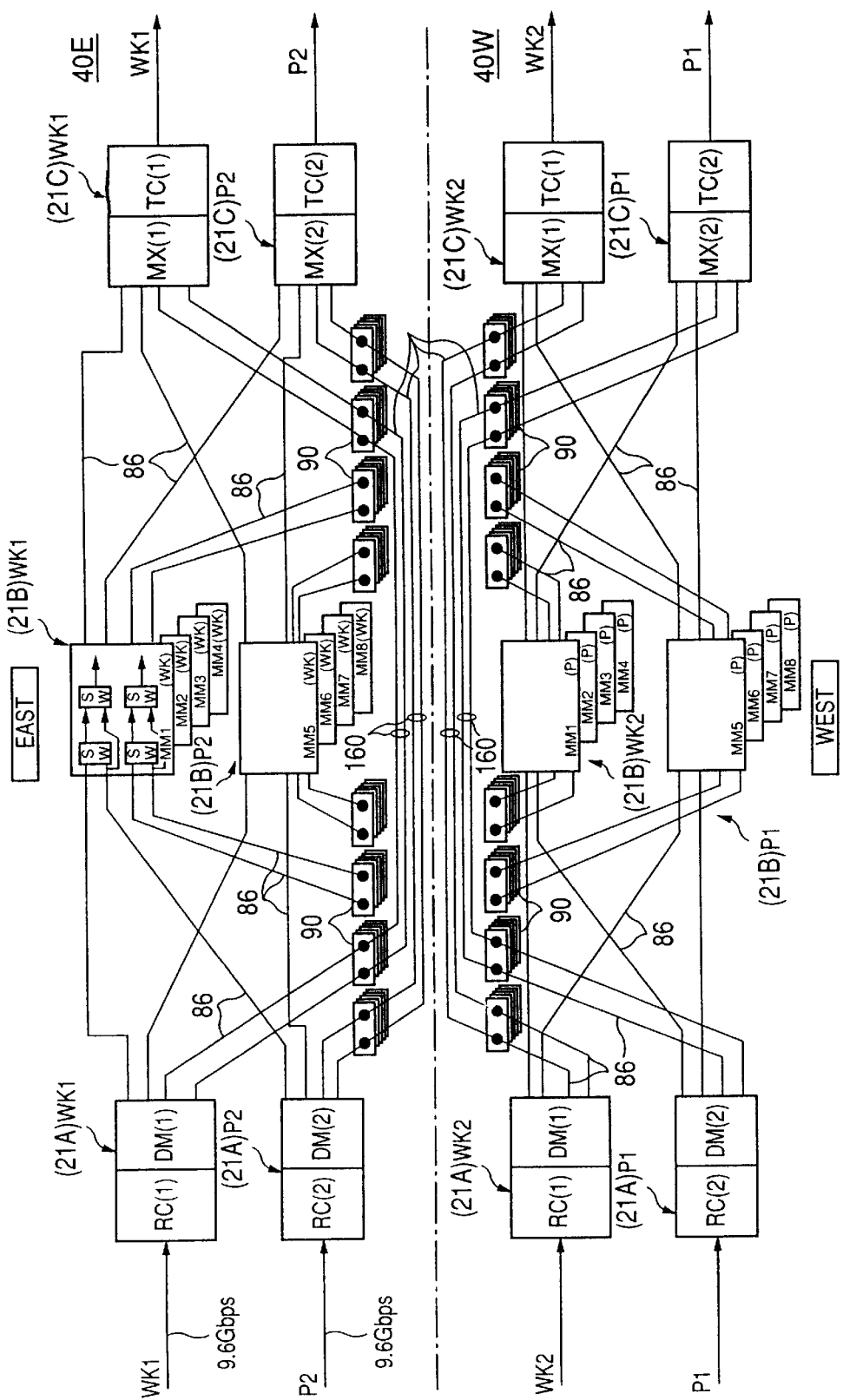
FIG. 12 is a block diagram showing the construction of a 4F-BLSR optical relay station constructed by using the optical telecommunication unit of FIG. 9.

FIGS. 10–12 show examples of the optical telecommunication facilities that are formed by using the optical telecommunication unit 40 of FIG. 9, wherein FIG. 10 shows an example of a 2F-BLSR terminal, FIG. 11 shows an example of a 4F-BLSR terminal and FIG. 12 shows an example of a regenerative station.

Figure 7:
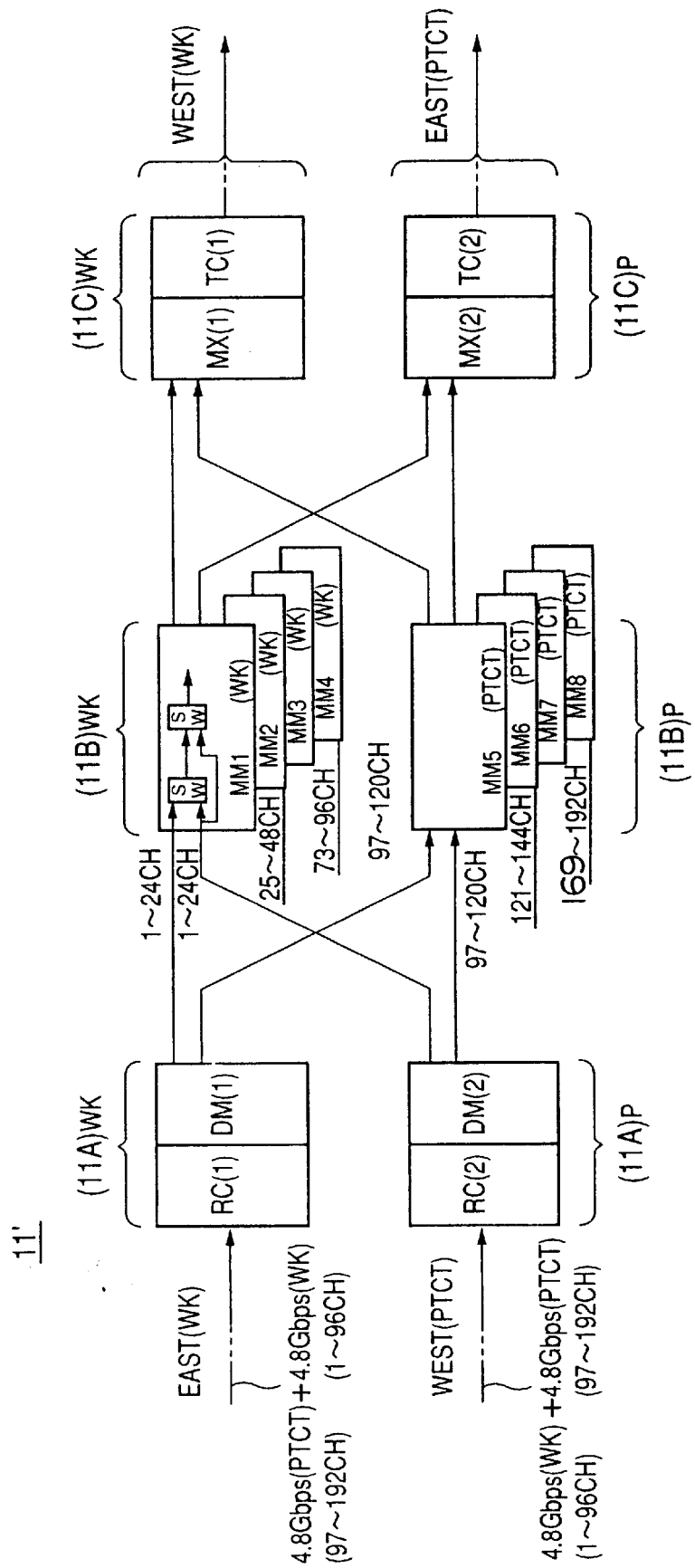
FIG. 7 is a block diagram explaining the problems that are encountered when the construction of FIG. 4 is expanded in a straightforward manner to form a 2F-BLSR terminal for a 4.8 Gbps optical traffic.
Figure 8:
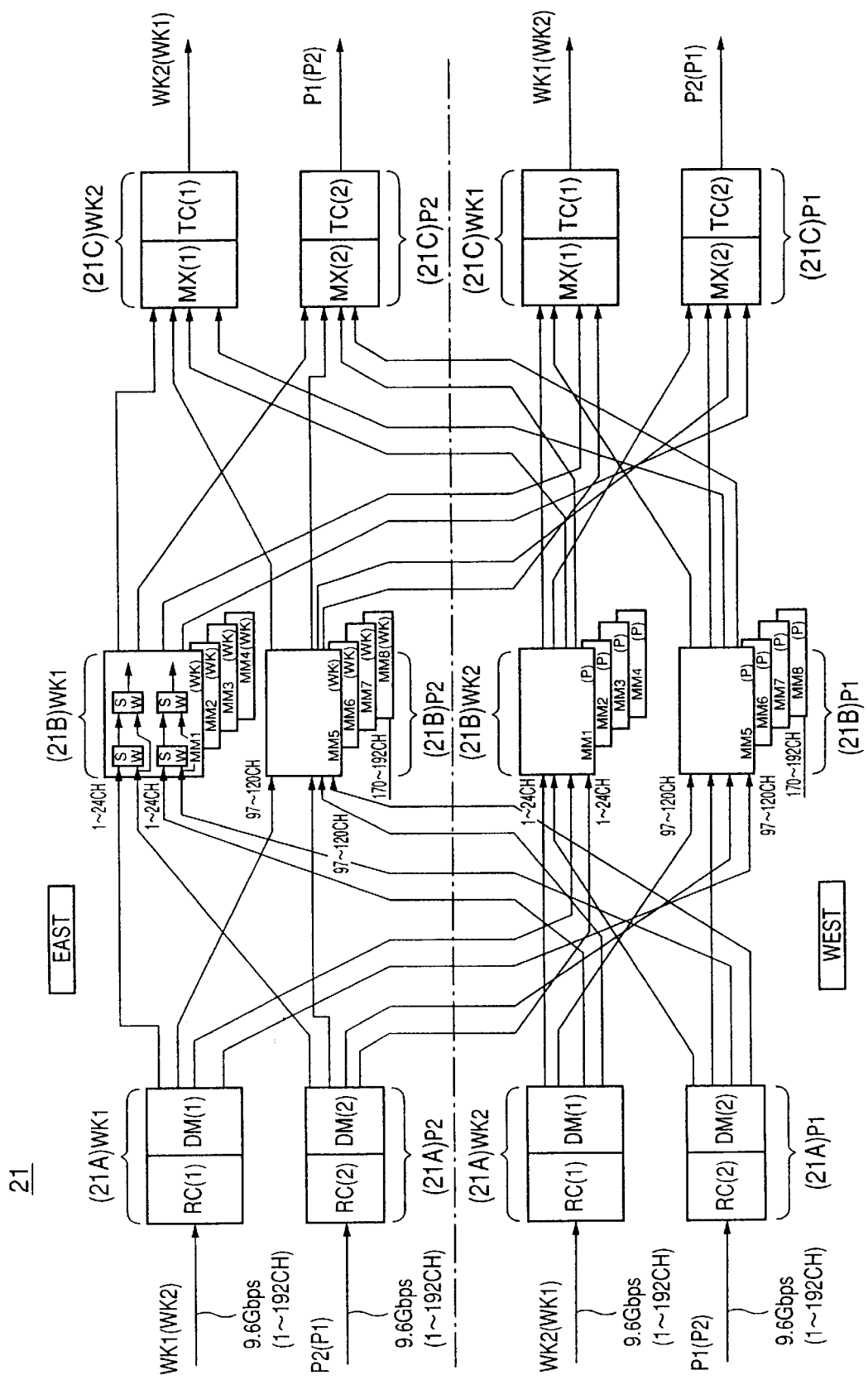
FIG. 8 is a block diagram explaining the problems that are encountered when the construction of FIG. 4 is expanded in a straightforward manner to form a 4F-BLSR terminal for a 9.6 Gbps optical traffic.

Referring to FIG. 10, it should be noted that the optical telecommunication unit 40 includes, in addition to the construction of FIG. 7, an interconnection pattern 86, provided on the rear panel 132, such that the interconnection pattern 86 connects the various units to respective interface connectors 90 provided on the rear panel 132. Further, the connection corresponding to that of FIG. 7 is provided also in the form of an interconnection pattern provided on the rear panel 132. As the interconnection pattern 86 is provided in the form of a multilayer interconnection structure provided on the rear panel 132, the problem of complex wiring explained with reference to FIG. 7 is successfully eliminated.

It should be noted that the rear panel 132 further carries thereon interface connectors 90 in electrical contact with the interconnection pattern 86 for external connection. As will be explained below with reference to FIGS. 11 and 12, it is possible to form various telecommunication apparatuses by connecting the optical telecommunication units 40 at the interface connectors 90 by way of coaxial cables. In the case of the 2F-BLSR system of FIG. 10, no connection is made to the interface connectors 90.

FIG. 11 shows an example of forming a terminal of a 4F-BLSR system by using two of the optical telecommunication apparatuses 40 of FIG. 9, one for an east side apparatus 40E and the other for a west side apparatus 40W.

Referring to FIG. 11, it will be noted that the interface connectors 90 of the east side apparatus 40E are connected to the corresponding interface connectors 90 of the west side apparatus 40W by means of shielded coaxial cables 160. Thus, the output of the photoreception unit $(21A)_{Wk1}$ for the channels 1–24 is supplied not only to the switch units $(21B)_{Wk1}$ and $(21B)_{P2}$ but also to the switch units $(21B)_{Wk2}$ and $(21B)_{P1}$ via the interface connectors 90 and the shielded coaxial cables 160. Similarly, the output of the photoreception unit $(21A)_{P2}$ for the channels 97–120 is supplied not only to the switch units $(21B)_{Wk1}$ and $(21B)_{P2}$ but also to the switch units $(21B)_{Wk2}$ and $(21B)_{P1}$ via the interface connectors 90 and the shielded coaxial cables 160. Further, the output of the photoreception unit $(21A)_{Wk2}$ for the channels 1–24 is supplied not only to the switch units $(21B)_{Wk2}$ and $(21B)_{P1}$ but also to the switch units $(21B)_{Wk1}$ and $(21B)_{P2}$ via the interface connectors 90 and the shielded coaxial cables 160. Similarly, the output of the photoreception unit $(21A)_{P1}$ for the channels 97–120 is supplied not only to the switch units $(21B)_{Wk2}$ and $(21B)_{P1}$ but also to the switch units $(21B)_{Wk1}$ and $(21B)_{P2}$ via the interface connectors 90 and the shielded coaxial cables 160.

Figure 1:
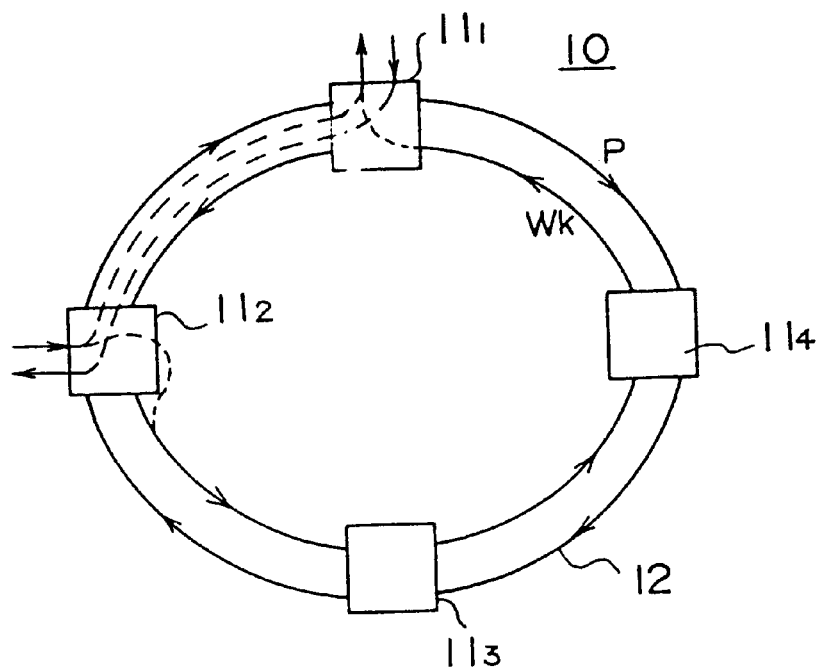
FIG. 1 is a diagram showing the construction of a conventional 2F-BLSR optical telecommunication network.
Figure 2:
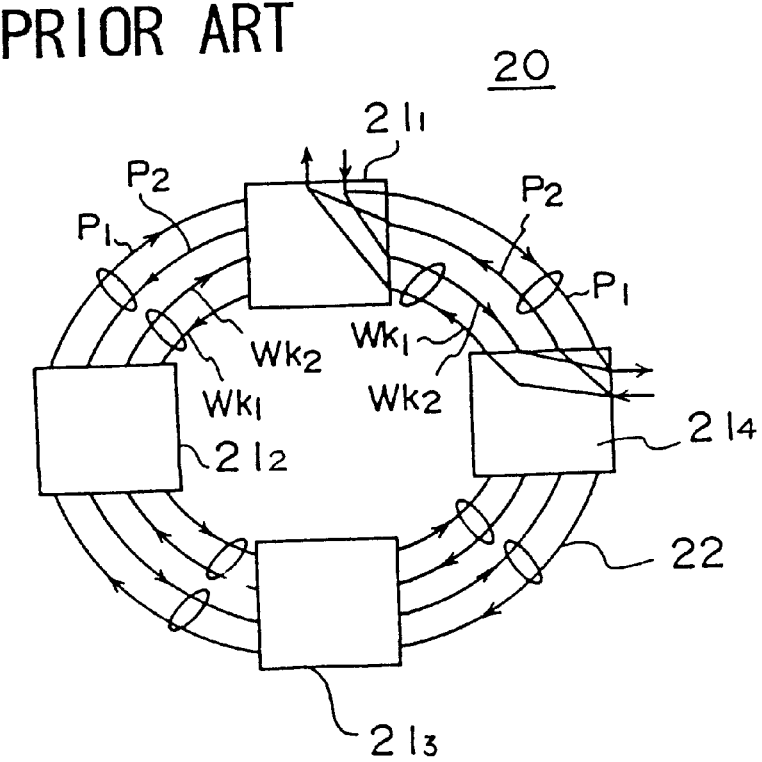
FIG. 2 is a diagram showing the construction of a conventional 4F-BLSR optical telecommunication network.
Figure 3A:
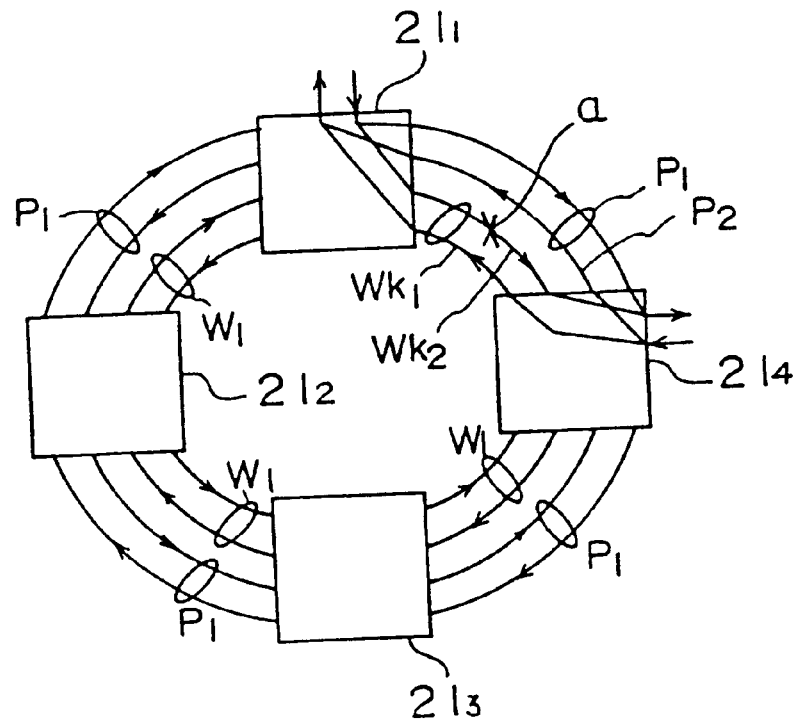
FIGS. 3A and 3B are diagrams showing the 4F-BLSR optical telecommunication network in a defective state.
Figure 3B:
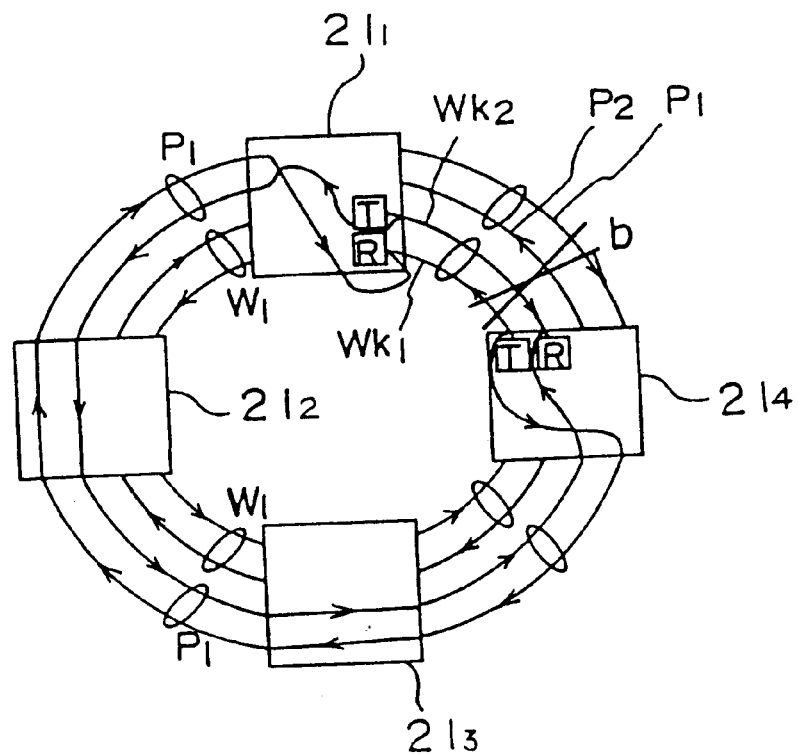
Figure 4:
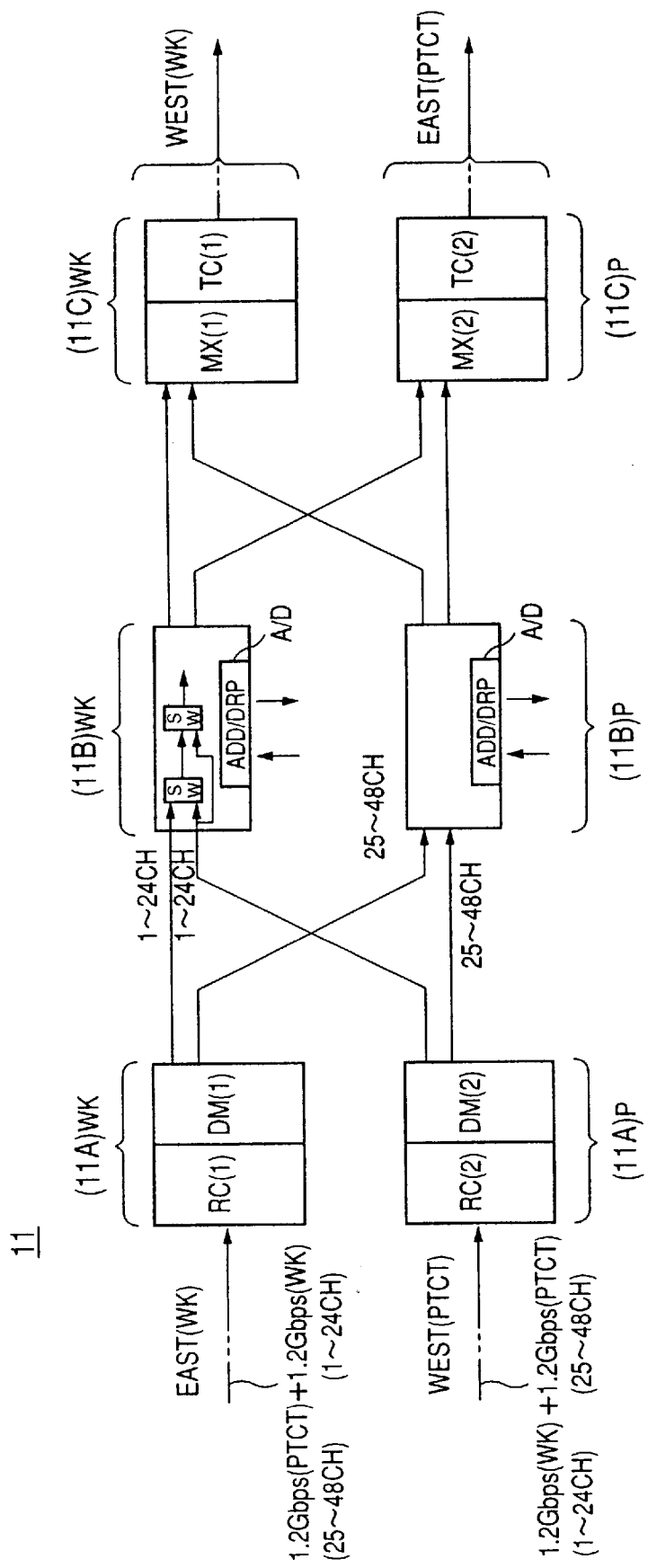
FIG. 4 is a block diagram showing the construction of an optical terminal used conventionally in a 2F-BLSR optical network.

Thus, by setting the switch units $(21B)_{Wk1}$–$(21B)_{P2}$ appropriately, the terminal of FIG. 11 can be set either to function as a terminal of a normal, defect-free 4F-BLSR network as shown in FIG. 2 or a terminal of a defective network shown in FIG. 3A or 3B.

FIG. 12 shows the construction of a regenerative station used in a 4F-BLSR system.

Referring to FIG. 12, it will be noted that two of the optical telecommunication apparatuses 40 are provided in the regenerative station similarly to the 4F-BLSR terminal of FIG. 11, wherein two of the interface connectors 90 of the east side apparatus are connected to the other two connectors 90 also of the east side apparatus 40E such that the output of the photoreception unit $(21A)_{Wk1}$ is forwarded directly to the optical transmission unit $(21C)_{Wk2}$, the output of the photoreception unit $(21A)_{P2}$ is forwarded directly to the optical transmission unit $(21C)_{P1}$. Similarly, two of the interface connectors 90 of the west side apparatus are connected to the other two connectors 90 also of the west side apparatus 40W such that the output of the photoreception unit $(21A)_{Wk2}$ is forwarded directly to the optical transmission unit $(21C)_{Wk1}$ and the output of the photoreception unit $(21A)_{P1}$ is forwarded directly to the optical transmission unit $(21C)_{P2}$.

Figure 13B:
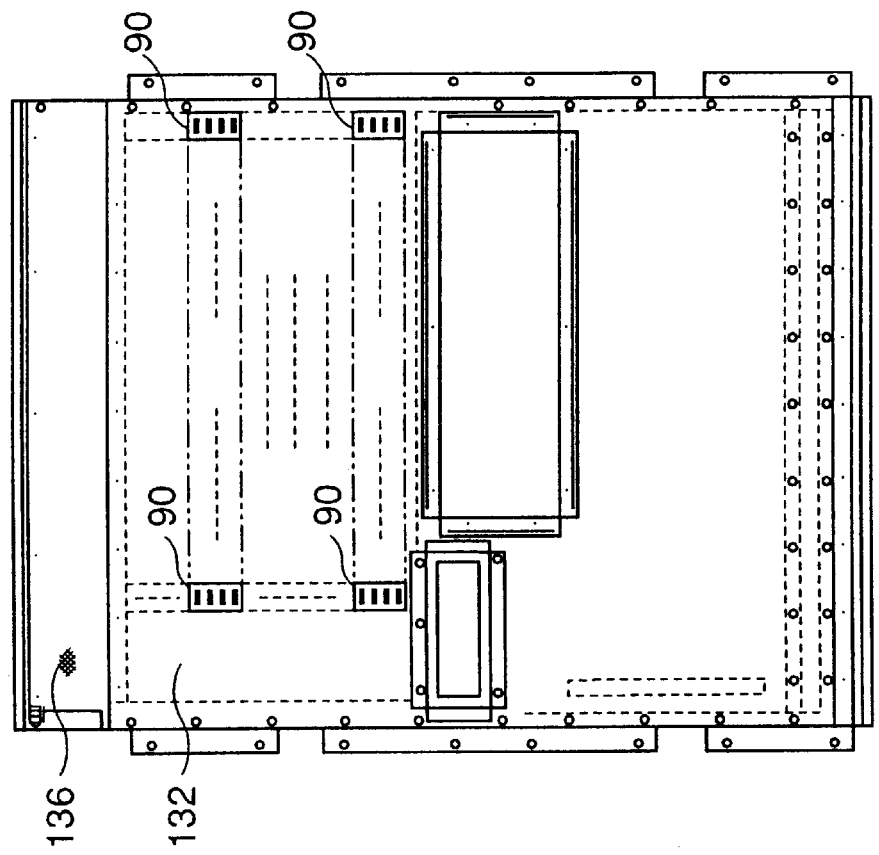
FIGS. 13A and 13B show a front side and a rear side of the optical telecommunication unit of FIG. 9.
Figure 13A:
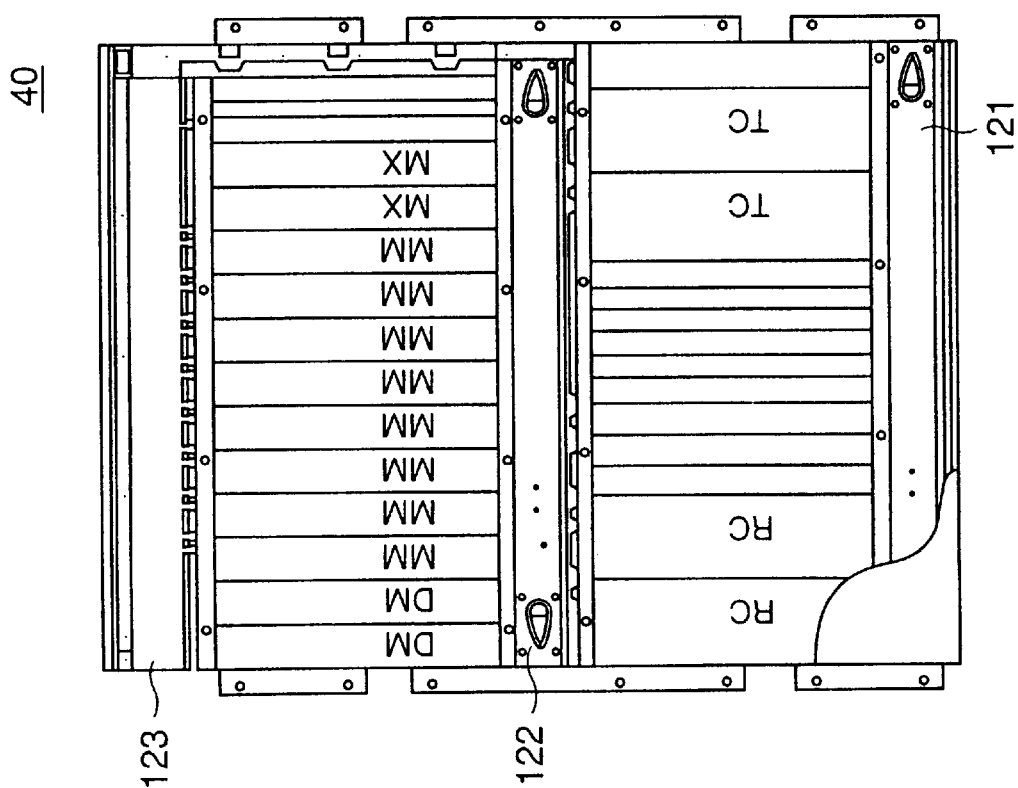

FIGS. 13A and 13B show the appearance of the optical telecommunication unit 40 respectively in a front view and a rear view, wherein the rear view of FIG. 13B represents the unit 40 in the state that a rear cover thereof is removed from the upper unit 40.

Referring to FIG. 13A, it will be noted that the plug-in units DM, MM and MX are arranged in the upper shelf while the plug-in units RC and TC are arranged in the lower shelf, in conformity with the oblique view of FIG. 9.

On the other hand, the rear view of FIG. 13B indicates the exposed rear panel 132 and the interface connectors 90 arranged in rows and columns on the rear panel 132. Further, FIG. 13B indicates a meshed opening for the blower unit 122 for exhausting the cooling air.

FIG. 14 shows the insertion of the plug-in units into corresponding plug-in connectors provided on the rear panel 132 of the unit 40.

Referring to FIG. 14, the rear panel 132 forms a part of the shielded case 40A and carries, on an inner side thereof, plug-in connectors 140, wherein each of the plug-in connectors 140 engage with a corresponding plug-in connector 142 provided on an edge of the plug-in units such as MX, TC, and the like, upon a full insertion of the plug-in units into the shielded case 40A. In the illustrated example, each of the plug-in connectors 140 forms also the interface connector 90, while this is not a necessary requirement and the interface connectors 90 may be provided away form the plug-in connectors 140.

Figure 15:
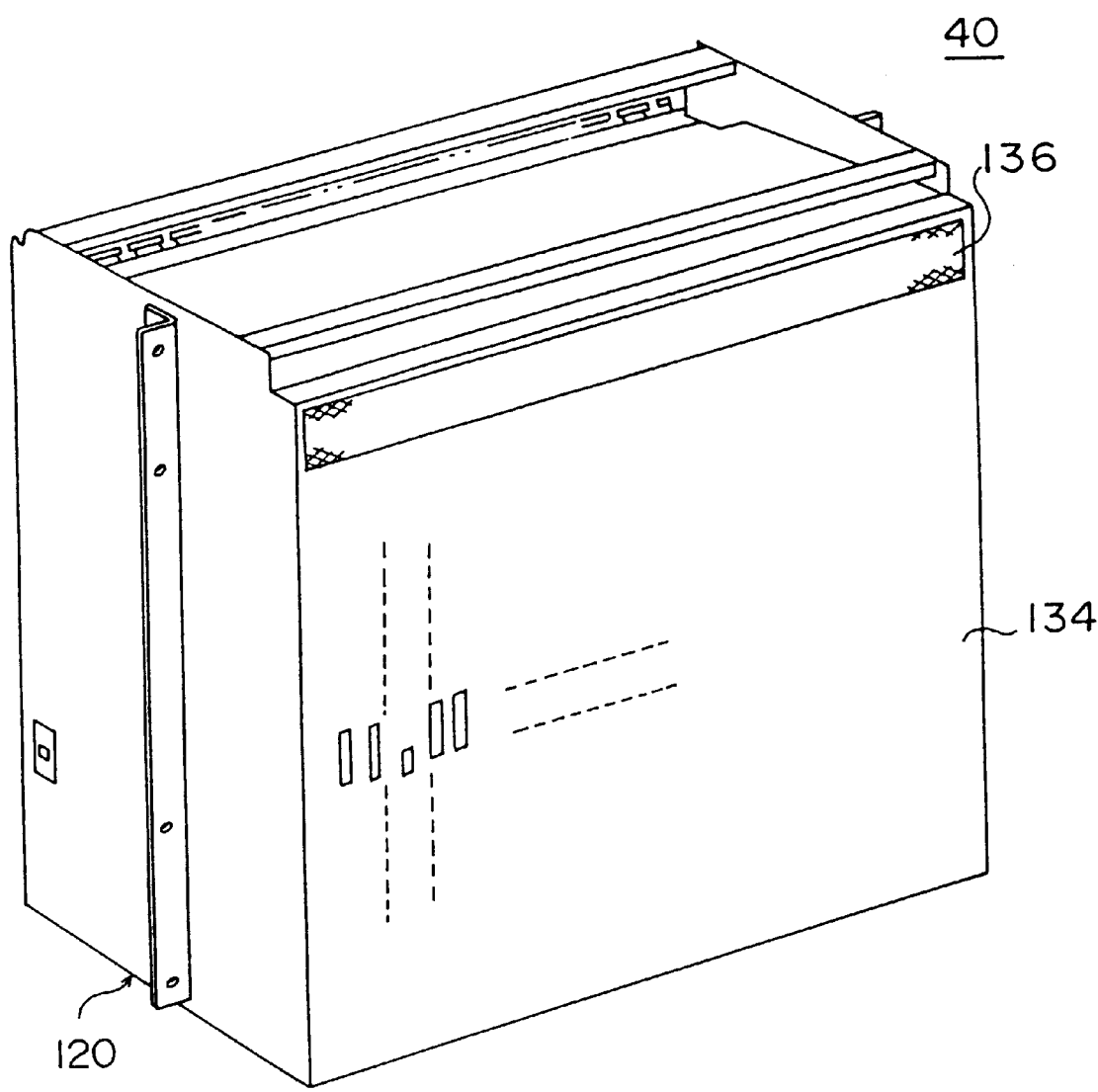
FIG. 15 is a diagram showing the ear side of the optical telecommunication unit of FIG. 9 in an oblique view in the state that the rear cover is provided.

FIG. 15 shows the rear side of the optical telecommunication unit 40 in the state that the rear panel 132 is covered by a rear cover 136. As indicated, the rear cover 136 carries thereon a plurality of openings in correspondence to the interface connectors 90.

Figure 16:
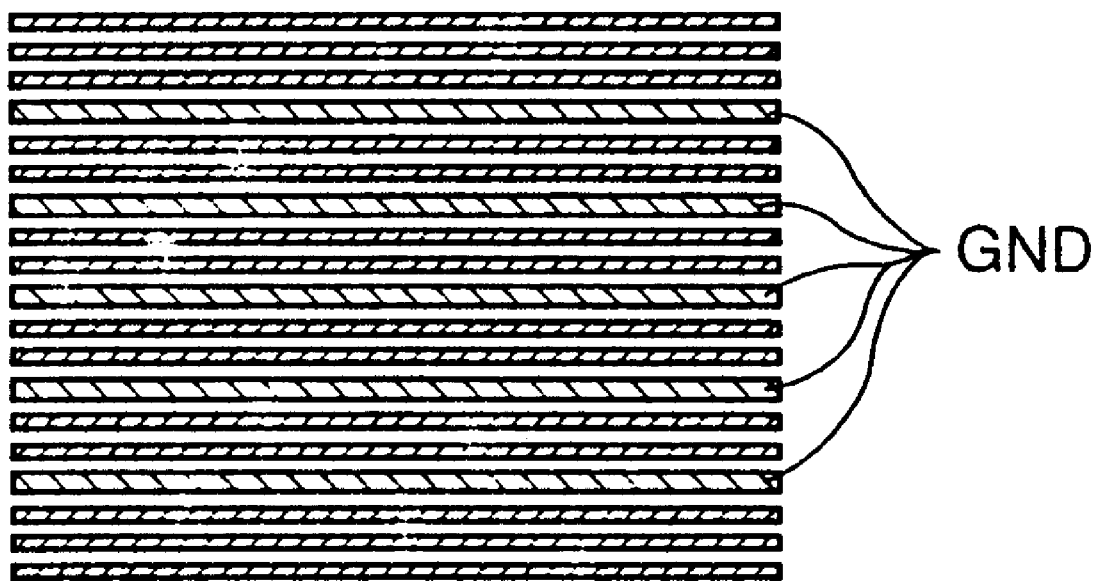
FIG. 16 is a diagram showing a cross section of a rear panel of the optical telecommunication unit of FIG. 9.

FIG. 16 shows a cross-section of the rear panel 132.

Figure 17:
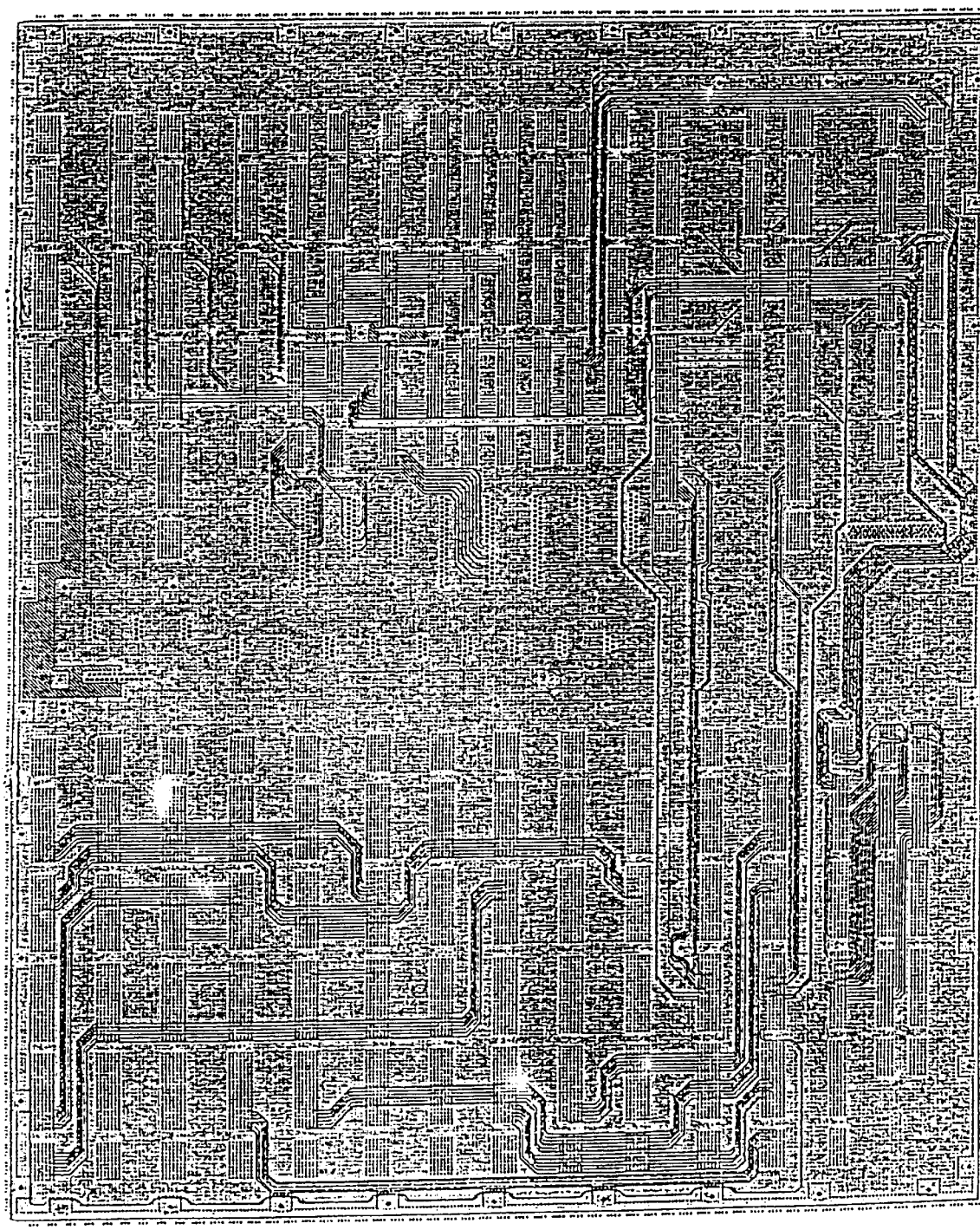
FIG. 17 is a diagram showing an example of an interconnection pattern provided on the rear panel of the telecommunication unit of FIG. 9.
Figure 18:
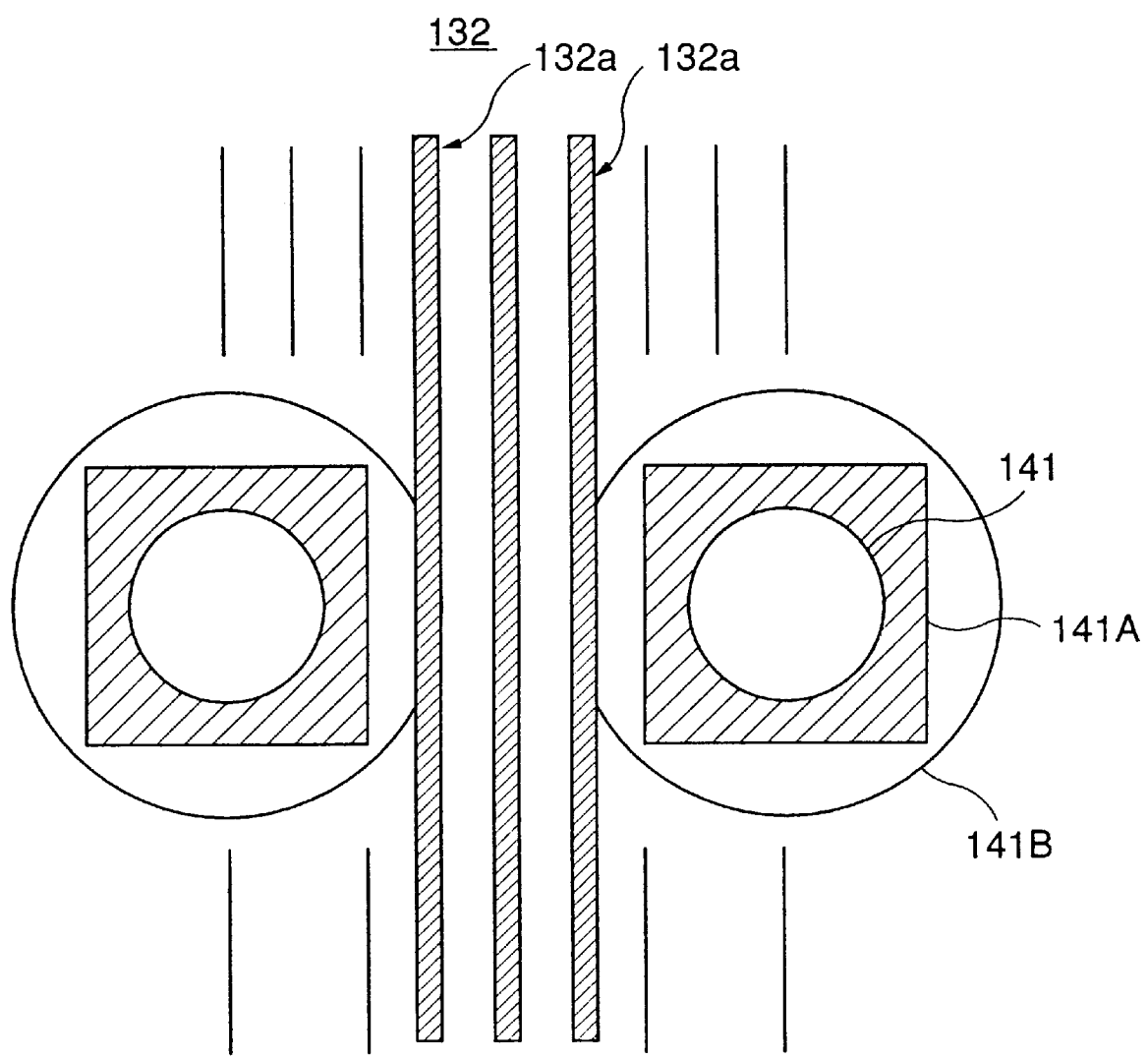
FIG. 18 is a diagram showing the details of the interconnection pattern of FIG. 17.

Referring to FIG. 16, the rear panel 132 is actually formed by stacking a plurality of layers including a plurality of conductor plates GND used for grounding and impedance matching. Each of the layers carry a conductor pattern such as the one indicated in FIG. 17 as a typical example, wherein a part of the conductor pattern is indicated in FIG. 18 with an enlarged scale. In the cross section of FIG. 16, it should be noted that the uppermost layers on the both sides of the rear panel 132 form a continuous conductor plane.

Referring to FIG. 18, the conductor pattern includes a plurality of conductor stripes 132a extending generally parallel to each other, wherein it should be noted that a conductor stud 141 is press-fit to the rear panel 132 in contact with the conductor stripe 132a to form the foregoing interface connectors 90. In order to ensure an electrical contact between the stud 141 and the conductor stripe 132a, there is provided a conductor land 141A so as to surround the stud 141, wherein the land 141A in turn is provided on a circular insulating land 141B provided on the rear panel 132.

Figure 19:
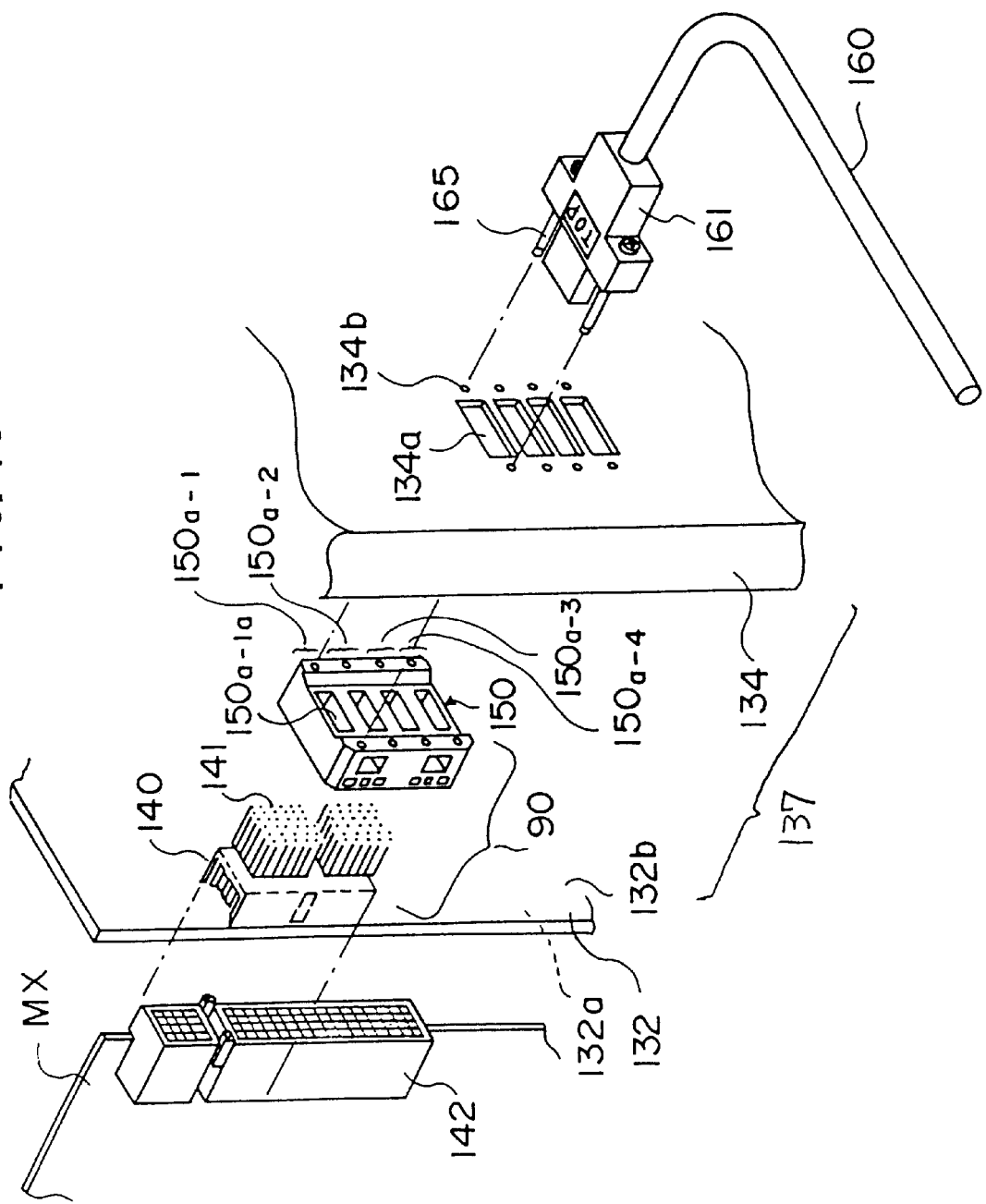
FIG. 19 is a diagram showing an interface connector used in the optical telecommunication unit of FIG. 9.

FIG. 19 shows the details of mounting a plug-in unit on the rear panel 132 and further the connection of the coaxial cable 160 to the interface connector 90.

Referring to FIG. 19, the studs 141 penetrate from a rear surface 132b to a front surface 132a of the rear panel 132, and the plug-in connector 142 of the plug-in unit, MX in the illustrated example, engages with the studs 141 protruding toward the front side from the rear panel 132. The protruding studs 141 thereby form the plug-in connector 142 at the front side of the rear panel 132.

On the rear surface 132b of the rear panel 132, a protective shroud 150 is provided for protecting the studs 141 extending away from the rear panel 132, wherein the protective shroud 150 is divided into a plurality of socket regions $150a_{-1}$–$150a_{-4}$ each includes a guide slot such as a slot $150a_{-1a}$ for accepting a connector plug 161 provided at an end of the shielded coaxial cable 160.

Further, there is provided a conductive rear cover 134 on the rear side of the rear panel 132 such that the foregoing shroud 150 intervenes between the rear panel 132 and the rear cover 134. Thereby, there is defined a shielded space 137 between the rear panel 132 and the rear cover 134. It should be noted that the rear surface 132b, as well as the front surface 132a, of the rear panel 132 is covered continuously by a conductor plane except for the part where the connector 90 or 141, or other interconnection structure is provided. The rear cover 134 is provided with openings 134a in correspondence to each of the guide slots such as the guide slot $150a_{-1a}$ for allowing the insertion of the connector plug 161 into the interface connector 90. Further, the rear cover 134 includes holes 134b for insertion of mounting screws 165, wherein the mounting screws 165 are inserted into corresponding screw holes of the shroud 150 for firmly mounting the connector plug 161 upon the interface connector 90.

Figure 20:
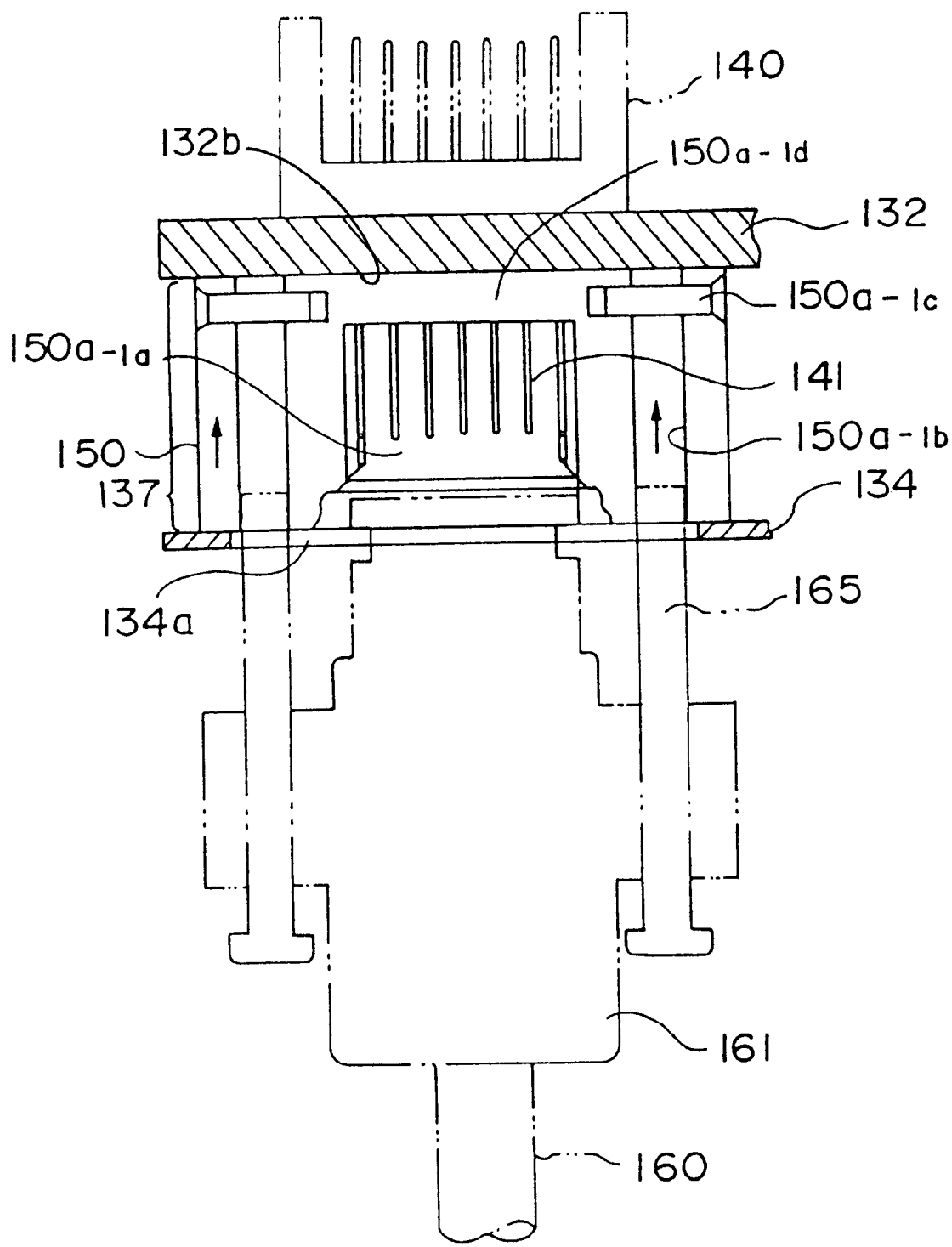
FIG. 20 is a diagram showing a part of the interface connector in an enlarged view.

FIG. 20 shows the details of the interface connector 90, particularly the shroud 150 thereof.

Referring to FIG. 20, the shroud 150 includes a base member $150a_{-1d}$ in which the foregoing guide slot $150a_{-1a}$ is formed such that the base member $150a_{-1d}$ establishes an intimate contact with the rear surface 132b of the rear panel 132. The conductor studs 141 are provided on the bottom or innermost end of the guide slot $150a_{-1a}$ to which the connector plug 161 is inserted, wherein the guide slot $150a_{-1a}$ forms a rectangular inlet opening at the outermost part for guiding the inserted plug 160 to the guide slot $150a_{-1a}$. In addition, the shroud 150 is formed with a screw hole $150a_{-1b}$ for accepting the mounting screws 165, wherein the shroud 150 further includes therein nuts $150a_{-1c}$ for engagement with the mounting screw 165 inserted to the screw hole $150a_{-1b}$. It should be noted that the nuts $150a_{-1c}$ are embedded in the base member $150a_{-1d}$ of the shroud 150.

Figure 21A:
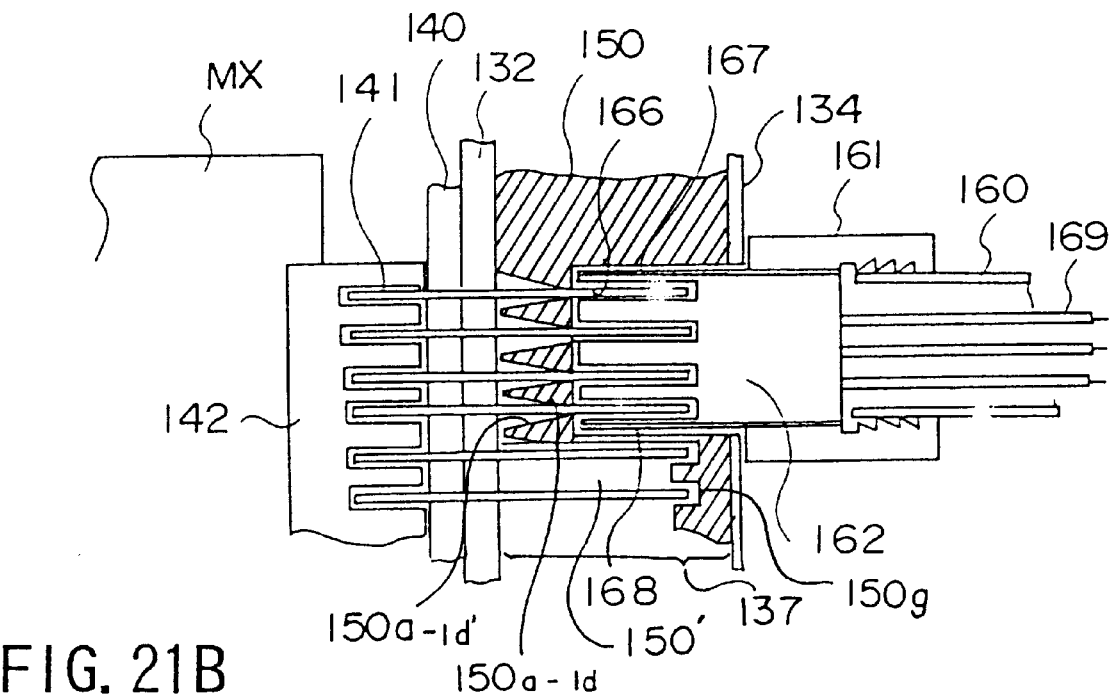
FIGS. 21A and 21B are diagrams showing a part of the interface connector in detail.
Figure 21B:
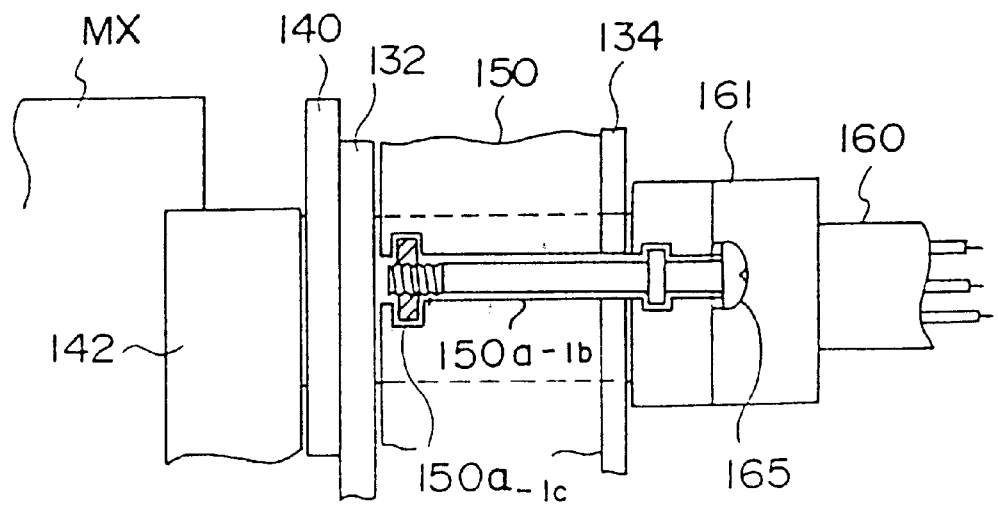

FIGS. 21A and 21B show the engagement of the connector plug 161 with the interface connector 90, wherein FIG. 21A represents the engagement of the connector plug 161 with the conductor studs 141 of the interface connector 90 while FIG. 21B shows the engagement of the mounting screw 165 with the nut $150a_{-1c}$ in the protective shroud 150.

Referring to FIG. 21A, it should be noted that the connector plug 161 includes a plug head 162 in which a plurality of depressions 166 are formed for accepting therein the conductor studs 141 when the plug head 162 enters the guide slot $150a_{-1a}$. Further, a shield plate 167 and another shield plate 168 are provided respectively on the top side and bottom side of the plug head 162. The shield cable 160 includes therein a plurality of insulated wires 169 respectively in correspondence to electrode contacts provided in the depressions 166 for electrical contact with the studs 141.

In FIG. 21A, it should be noted that the base member 150$a_{-1d}$ of the protective shroud 150 includes, at the bottom part thereof, a plurality of conical cavities 150$a_{-1d}$ such that the each of the conductive studs 141 is supported at the top part of the conical cavity. Further, the shroud 150 includes, adjacent to the part where the guide slot 150$a_{-1a}$ is formed, a hollow space 150' through which the studs 141 which are not for connection with the connector plug 161 extend. Thereby, the studs 141 are accepted in corresponding depressions 150g formed on an opposing wall forming a part of the shroud 150.

It should be noted that the foregoing construction of FIGS. 21A and 21B applies not only to the socket region 150$a_{-1}$ but also to the other socket regions 150$a_{-2}$–150$a_{-4}$.

FIG. 21B shows the screwing-up of the connector plug 161 by way of the mounting screw 165. As indicated in FIG. 21B, the mounting screw 165 is inserted into the hole 150$a_{-1b}$, and a thread at an end of the screw 165 engages with the nut 150$a_{-1c}$ embedded in the shroud 150.

FIGS. 22A–22D show the protective shroud 150 in the state that the protective shroud 150 is removed from the rear panel 132, wherein FIG. 22A shows a front view while FIG. 22B shows a side view. Further, FIG. 22B shows a rear view while FIG. 23D shows a cross sectional view taken along a line XID—XID of FIG. 22S.

Referring to FIG. 22A, it will be noted that the protective shroud 150 includes an array of apertures 150b (see FIG. 22D) that are formed in correspondence to the studs 141 wherein each aperture 150b is provided on the tip end of the conical cavity 150$a_{-1d}$'. By forming the apertures 150b as such, it is possible to guide the studs 141 exposed on the rear side of the panel 132 when the protective shroud 150 is mounted upon the rear surface 132b of the panel 132. As indicated in the rear view of FIG. 22C, each of the conical cavities 150$a_{-1d}$' has a pyramidal form having a square base. Further, the side view of FIG. 22B indicates that there is formed a depression 150e on the circumferential wall of the protective shroud 150 for engagement with a tool so as to allow a removal of the protective shroud 150 away from the rear panel 132 for repair work and the like.

FIG. 23A shows the arrangement of the studs 141 in the socket region 150$_{a-1}$ of the interface connector 90, wherein it should be noted that the stud arrangement of FIG. 23A applies also to the socket regions 150$a_{-2}$–150$a_{-4}$.

Referring to FIG. 23A, the studs 141 each forming a pin in the socket region 150$a_{-1}$ are arranged in a three-row and seven-column formation, wherein the pins designated as SG are used for a signal ground. On the other hand, six of the eight pins designated by solid black are used for carrying data signals DATA1–DATA4 and further clocks CLK1 and CLK2 each having a bit rate of 311 Mbps as indicated in FIG. 23B. The remaining two pins are used for alarm signals.

It should be noted that FIG. 23B shows the signals that are carried by coaxial cable 160 connected to the socket area 150$a_{-1}$ of the interface connector 90. Thus, the coaxial cable 160 is used to sustain, in addition to the bit stream with a total bit rate of 622 Mbps for the clocks CLK1 and CLK2, the bit stream with a total bit rate of 1.2 Gbps for the data signals DATA1–DATA4. By using all of the socket areas 150$a_{-1}$–150$a_{-4}$, a bit stream of 4.8 Gbps is sustained for the data signals.

Figure 24:
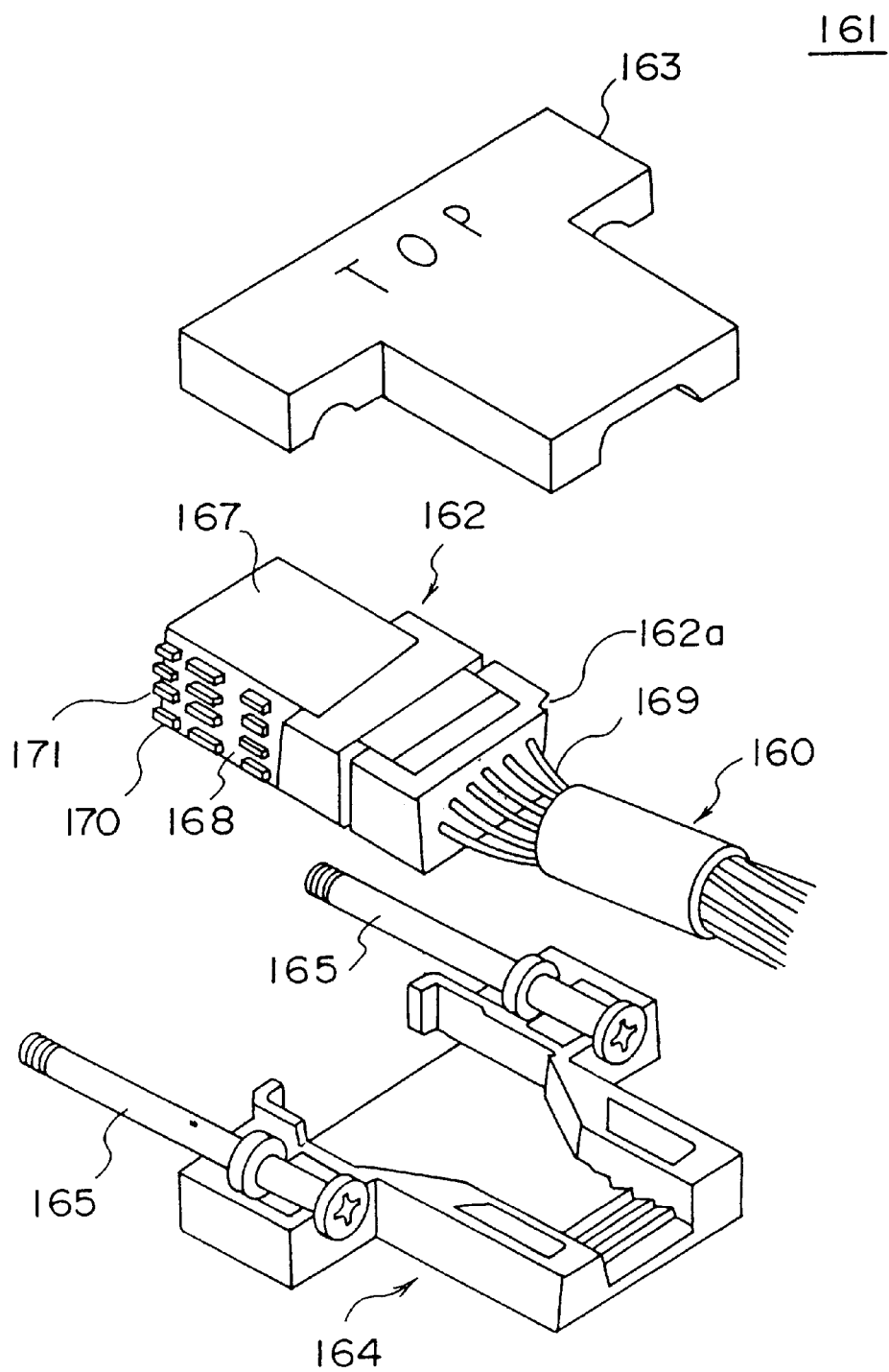
FIG. 24 is a diagram showing the construction of a connector plug cooperating with the interface connector in an exploded view.

FIG. 24 shows the details of the connector plug 161 in an exploded view.

Referring to FIG. 24, the connector plug 161 includes, in addition to the connector head 162 described already, a top cover 163 and a bottom cover 164, wherein the bottom cover 164 carries the mounting screws 165. In order to eliminate erroneous assembly of the connector plug 161, the plug head 162 carries a projection 162a that fits only with a corresponding depression formed on the top cover 163. Further, the plug head 162 carries, on the lateral side thereof, projecting ribs 170 and 171 such that the ribs 170 have a height larger than a height of the ribs 171.

Figure 25A:
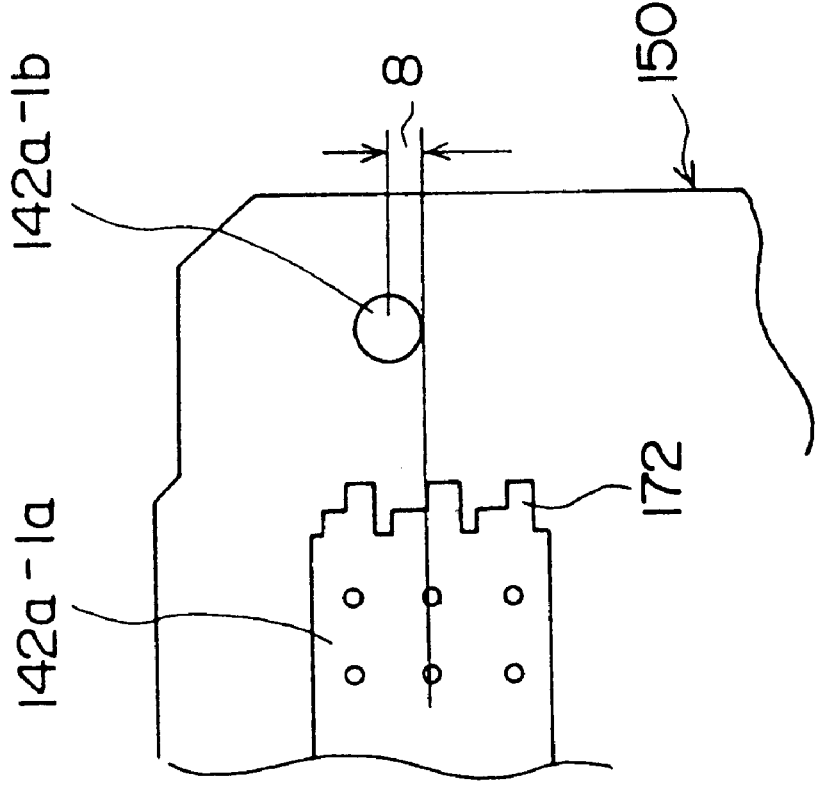
FIGS. 25A and 25B show the details of the connector plug of FIG. 24.
Figure 25B:
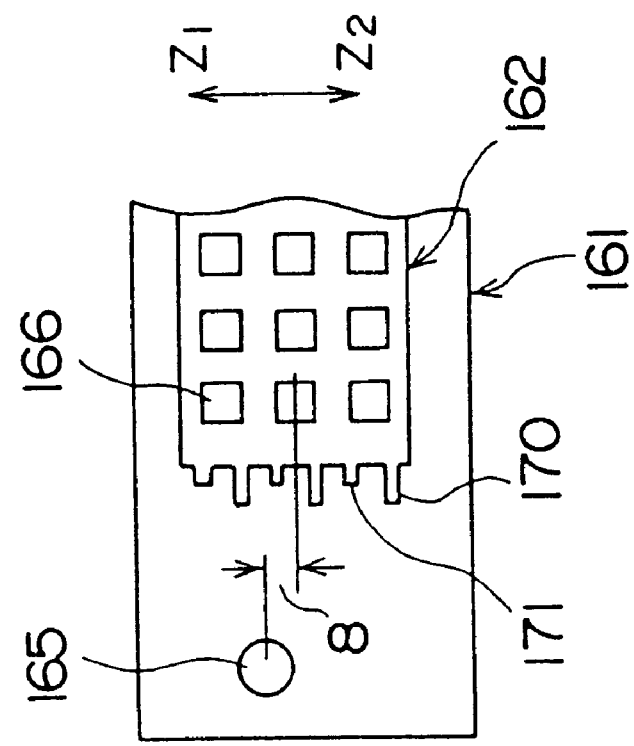

In correspondence to the foregoing ribs 170 and 171, the protective shroud 150 is formed with corresponding grooves 172 for engagement with the ribs 170 and 171 as indicated in FIGS. 25A and 25B, wherein it becomes possible to eliminate the erroneous, upside-down insertion of the connector plug 161 into the shroud 150 by forming the ribs 170 and 171 and hence the grooves 172 to be laterally asymmetric.

Figure 26:
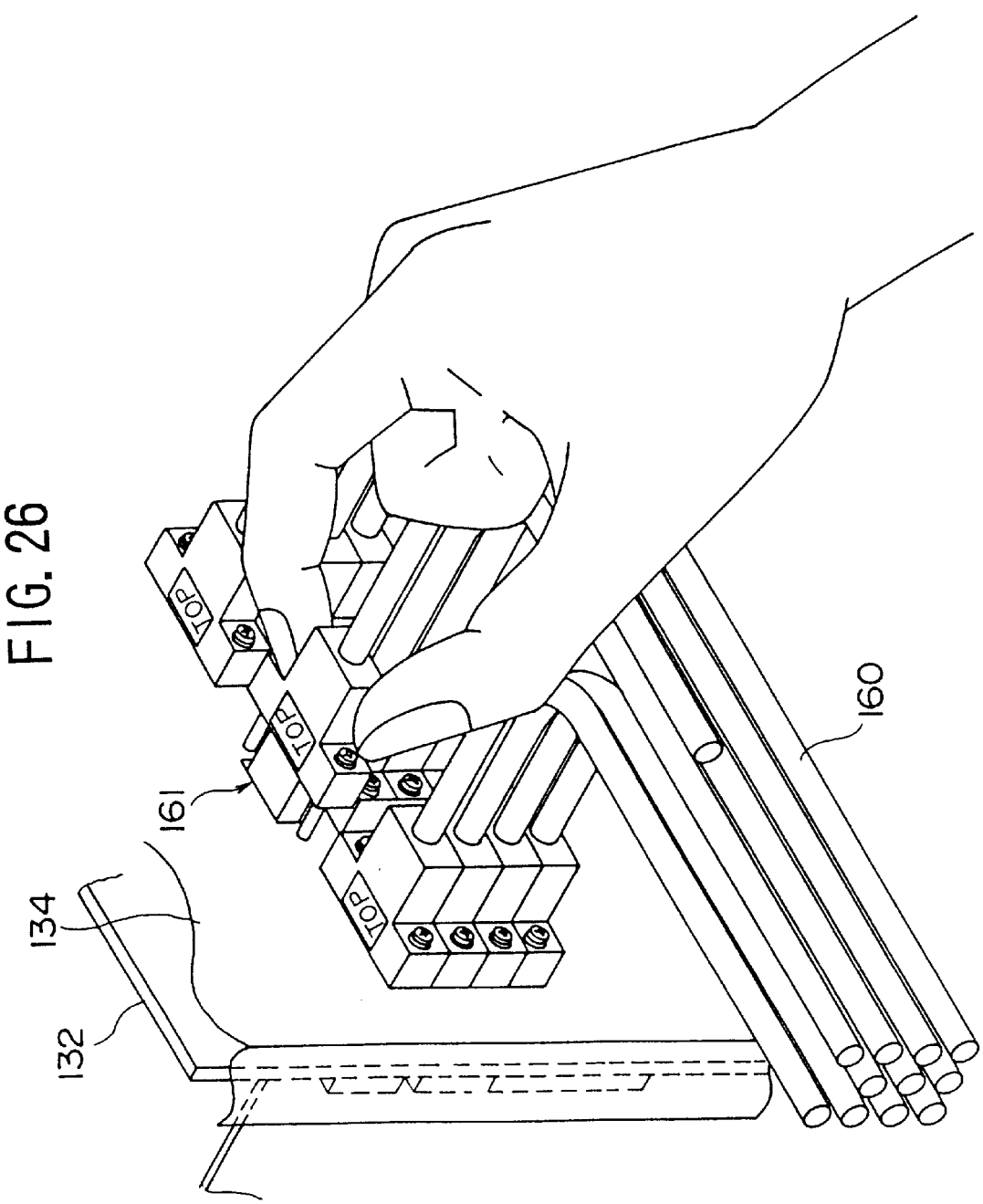
FIG. 26 is a diagram showing a coaxial cable to the interface connector of FIG. 19.

FIG. 26 shows the state that the plugs 161 are properly inserted into corresponding interface connectors 90 via the openings 134a formed on the rear cover 134 (see FIG. 19). Thereby, each of the plugs 161 engages with the rear cover 134 with an intimate contact after screwing up of the mounting screws 165, and the leak of electromagnetic emission via an imperfectly closed opening is successfully eliminated.

Figure 27:
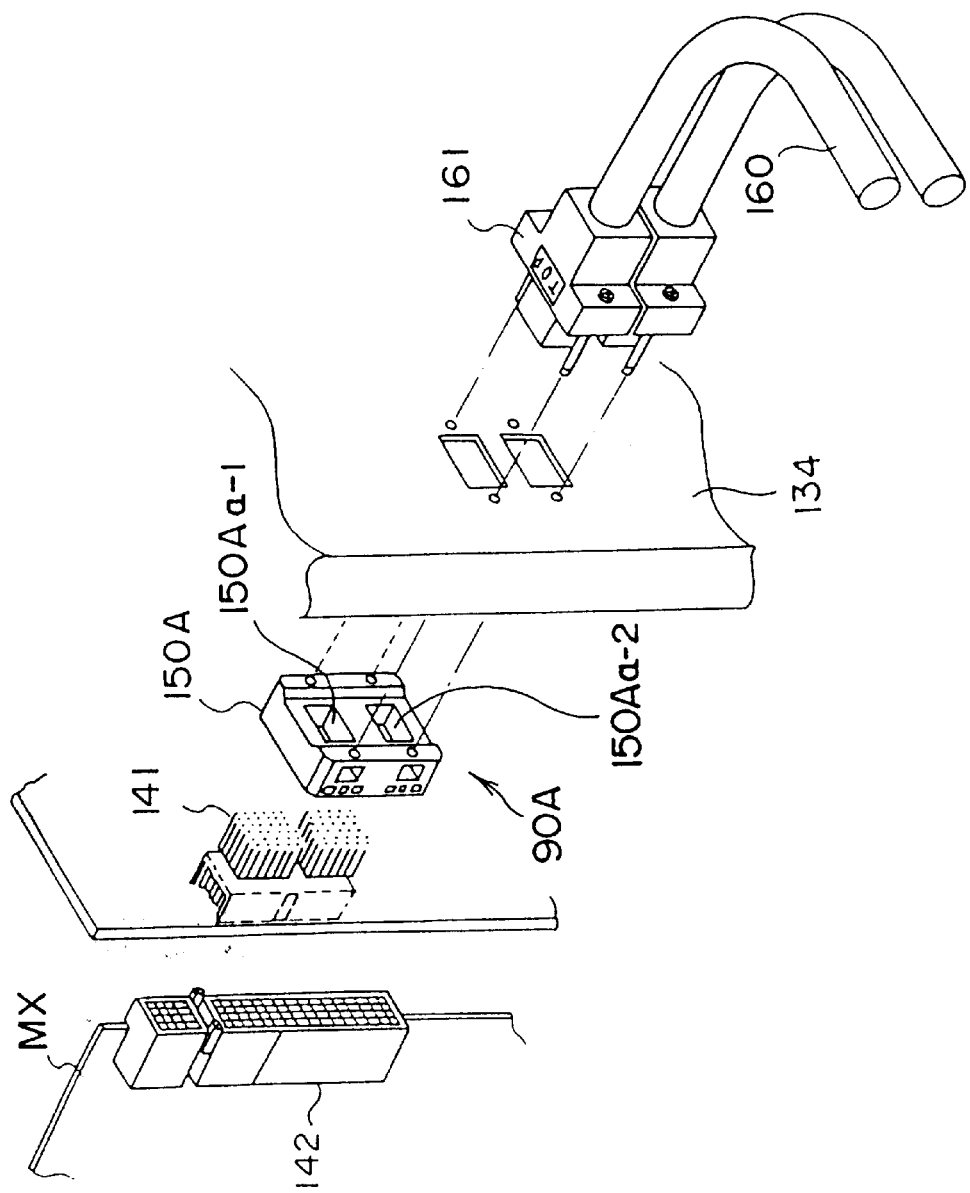
FIG. 27 is a diagram showing a modification of the interface connector of FIG. 19.

FIG. 27 shows an interface connector 90A according to a modification of the interface connector 90 wherein the interface connector 90A uses a protective shroud 150A that includes only two guide slots 150A$a_{-1}$ and 150A$a_{-2}$. In correspondence to this, there are two connector plugs 161 inserted to the interface connector 90A in a vertical alignment.

Figure 28:
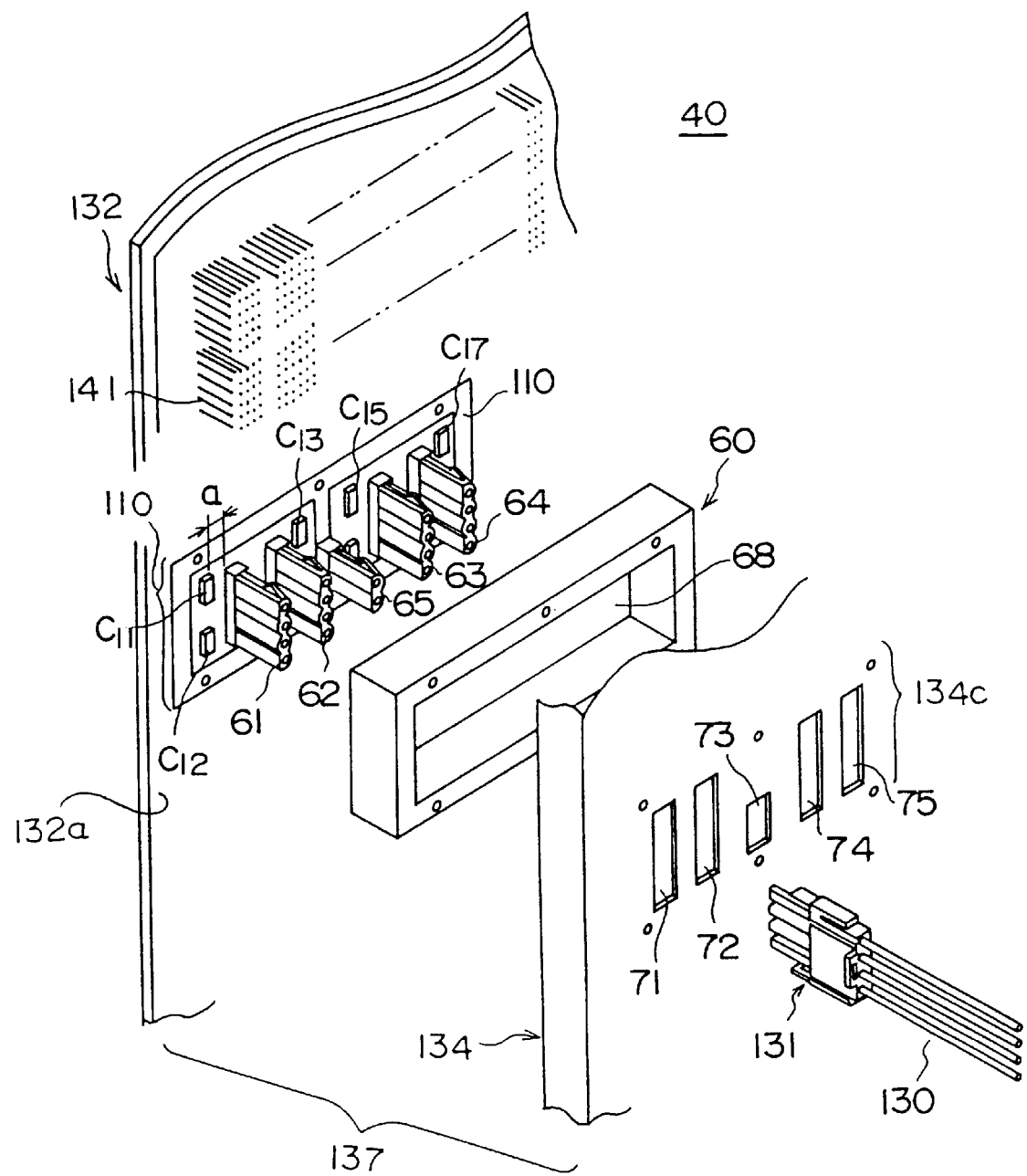
FIG. 28 is a diagram showing the construction of a power supply structure used in the optical telecommunication unit according to a second embodiment of the present invention.

FIG. 28 shows a power supply structure 110 used in the optical telecommunication unit 40 according to a second embodiment of the present invention, wherein those parts described previously are designated by the same reference numerals and the description thereof will be omitted.

Referring to FIG. 28, the power supply structure 110 includes a conductive region 110A provided on the rear surface 132a so as to surround power conductor pins 61–64, wherein the power conductor pins 61 form a vertically aligned pin array in the area surrounded by the conductive region 110A. Similarly, the power conductor pins 62–64 form respective vertically aligned pin arrays in the area surrounded by the conductive region 110A.

Further, the power supply structure of FIG. 28 includes a shunt capacitor in the vicinity of each of the vertically aligned power conductor pins. For example, capacitors C11 and C12 are provided in the vicinity of the vertically aligned pins 61, capacitors C13 and C14 are provided in the vicinity of the vertically aligned pins 62, capacitors C15 and C16 are provided in the vicinity of the vertically aligned pins 63, and capacitors C17 and C18 are provided in the vicinity of the vertically aligned pins 64, wherein the pins C14, C16 and C17 cannot be seen in the perspective illustration of FIG. 28.

Further, a shield block 60 including a shielded space 68 therein is mounted upon the conductive region 110A such that the shield block 60 surrounds the power conductor pins 61–64 as well as the capacitors C11–C18 inside the shielded space 68 therein. Further, the rear cover 134 is mounted upon the rear panel 132 thus carrying the shield block 60, wherein the shield block 60 connects the rear panel 132 and the rear cover 134 in the space 137 between the rear panel 132 and the rear cover 134. The rear cover 134 carries openings 71, 72, 73, 74 and 75 in a region 134c thereof corresponding to the power supply structure 110 respectively in correspondence to the conductor pins 61–64 for allowing insertion of a power connector plug 131 provided at an end of a power supply cable 130.

Figure 29:
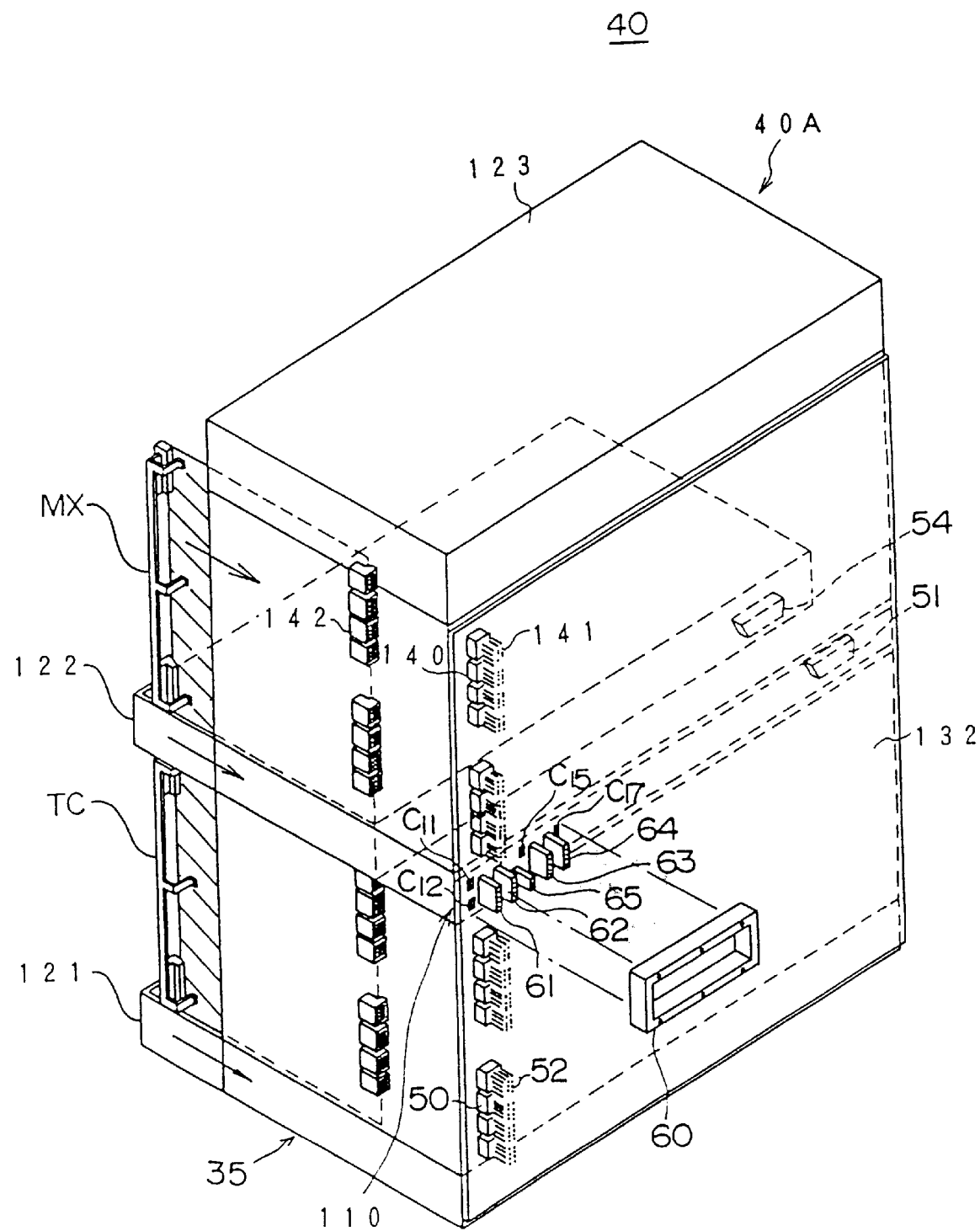
FIG. 29 is a diagram showing the power supply structure on the optical telecommunication unit in the state that the rear cover thereof is removed.

FIG. 29 shows the overall view of the optical telecommunication unit 40 including the power supply structure 110 in the state that the rear cover 134 is removed.

Referring to FIG. 29, it will be noted that the power supply structure 110 is provided at a vertically central part of the rear panel 132 corresponding to the height of the blower unit 122. In order to avoid mechanical deformation of the power supply structure 110 at the time of insertion of the blower unit 122 into the shielded case 40A as indicated by an arrow in FIG. 29, the blower unit 122 carries a connector 54 for engagement with a corresponding connector provided on the rear panel 132 with a substantial distance from the part of the rear panel 132 where the power supply structure 110 is provided.

Figure 30:
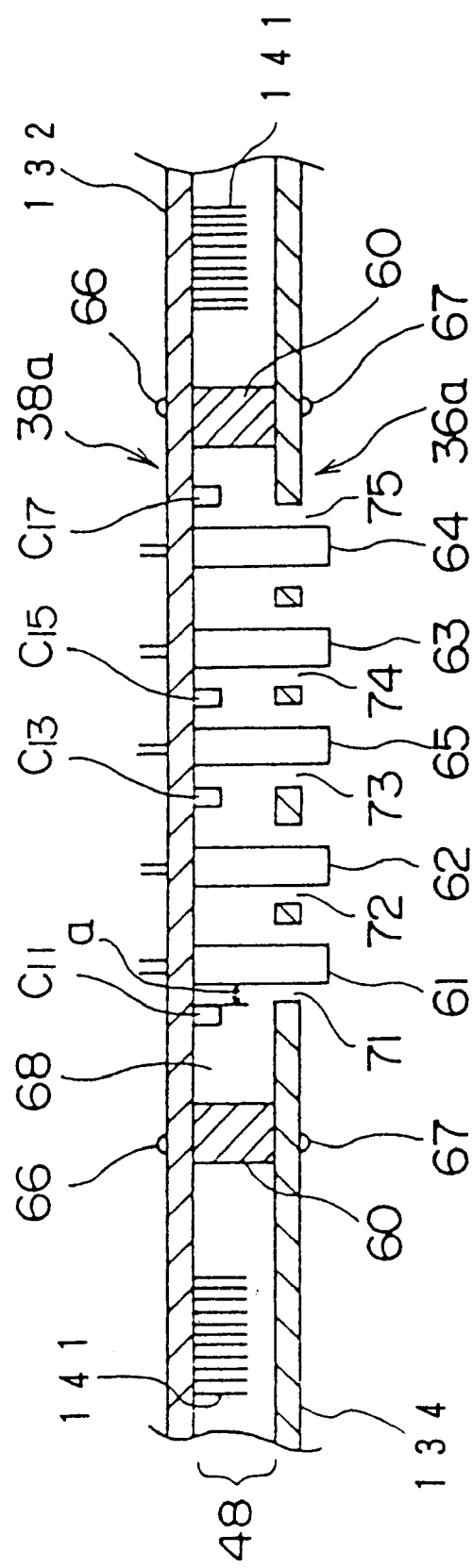
FIG. 30 is a diagram showing the construction of the power supply structure of FIG. 28 in a cross sectional view.

FIG. 30 shows the arrangement of the power connector pins 61–64 in the power supply structure 110 in detail.

Referring to FIG. 30, the pins 61–64 project beyond the rear panel 134 in the corresponding openings 71–75, and the shield block 60 mounted upon the rear panel 132 by means of screws 66 and further upon the rear cover 134 by means of screws 67.

Figure 31:
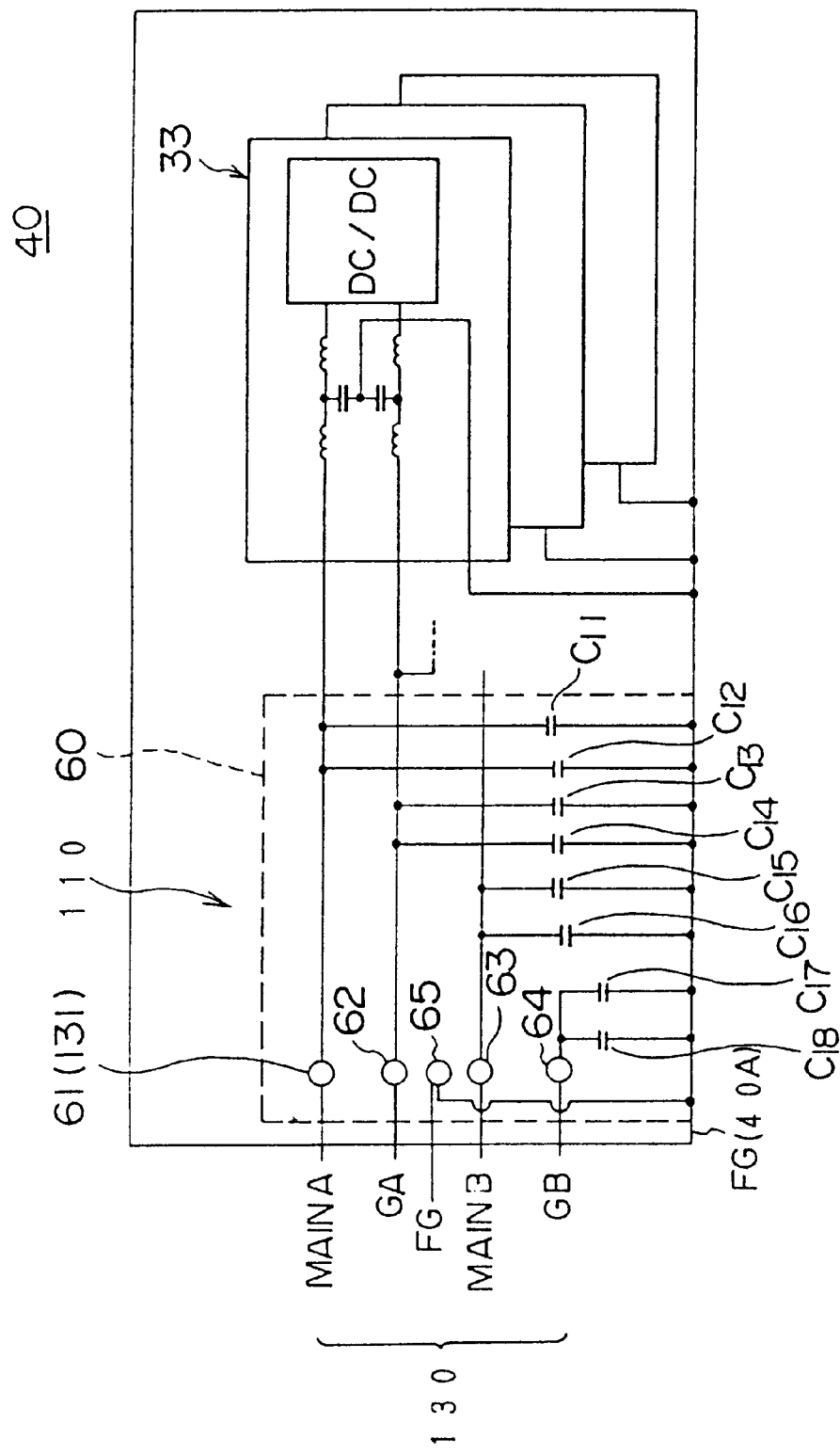
FIG. 31 is a circuit diagram of the power supply structure of FIG. 28.

Further, the rear panel 132 carries the capacitors C11–C18 on the rear surface 132a thereof by using a surface mounting technology, wherein only the capacitors C11, C13, C15 and C17 are illustrated. As indicated in the circuit diagram of FIG. 31, the capacitors C11–C12 are used to shunt the high frequency components from the power supply line 130, wherein the capacitors C11 and C12 are used to shunt a main A power line connected to the pin 61, the capacitors C13 and C14 are used to shunt a main A ground line connected to the pin 62, the capacitors C15 and C16 are used to shunt a main B power line connected to the pin 63 and the capacitors C17 and C18 are used to shunt a main B ground line connected to the pin 64. The pin 65 is a frame ground pin connected to the shield block 60 as well as to the shielded case 40A itself. As indicated in FIG. 31, the electric power thus supplied to the pins 61–64 is further supplied to various plug-in units in the case 40A represented collectively by a numeral 33.

In order to effectively eliminate the electromagnetic emission from the power line 130 such that no electromagnetic emission leaks outside the optical telecommunication unit 40 via the power line 130, the present embodiment provides the capacitors C11–C18 as close as possible to the corresponding power conductor pins 61–64 by mounting the capacitors on the conductor pattern provided on the rear surface 132a of the rear panel 132. For example, a distance a between the capacitor C11 and the pin 61 is set to be smaller than about 10 mm. By providing the capacitors adjacent to the pins on the same rear side of the rear panel 132, the problem of electromagnetic emission from a lead wire used conventionally for connecting the lead and a shunt capacitor is successfully eliminated. Further, by surrounding the power supply structure 110 continuously by the shield block 60, the electromagnetic emission is successfully confined in the space 68 of the power supply structure 110.

Figure 32A:
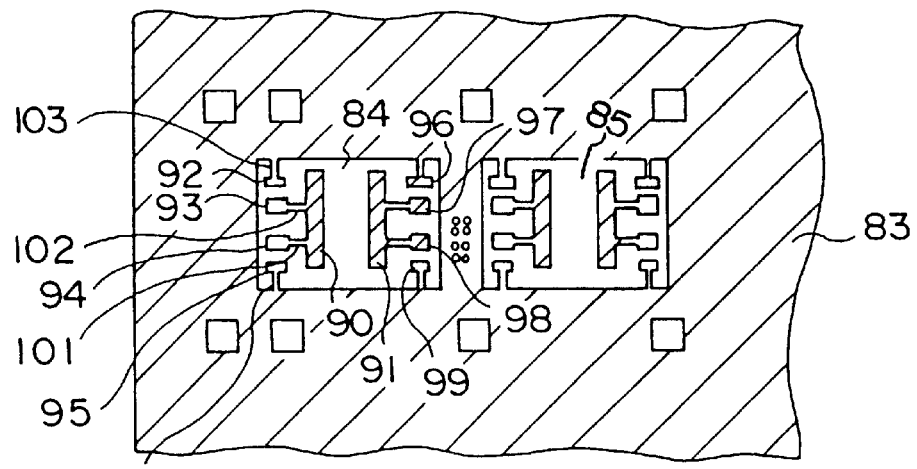
FIGS. 32A–32C are diagrams showing the process of forming the power supply structure of FIG. 28.
Figure 32B:
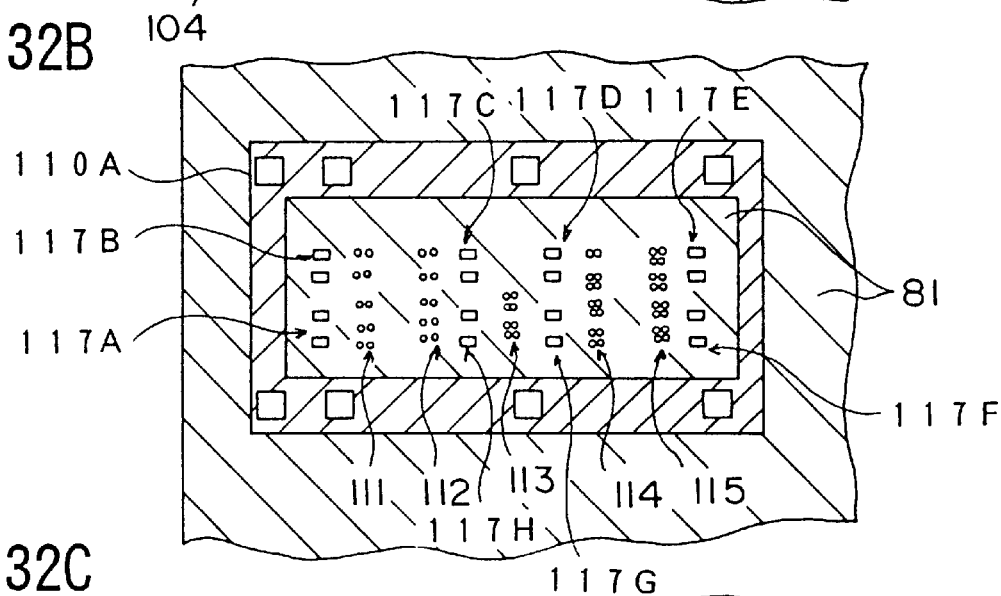
Figure 32C:
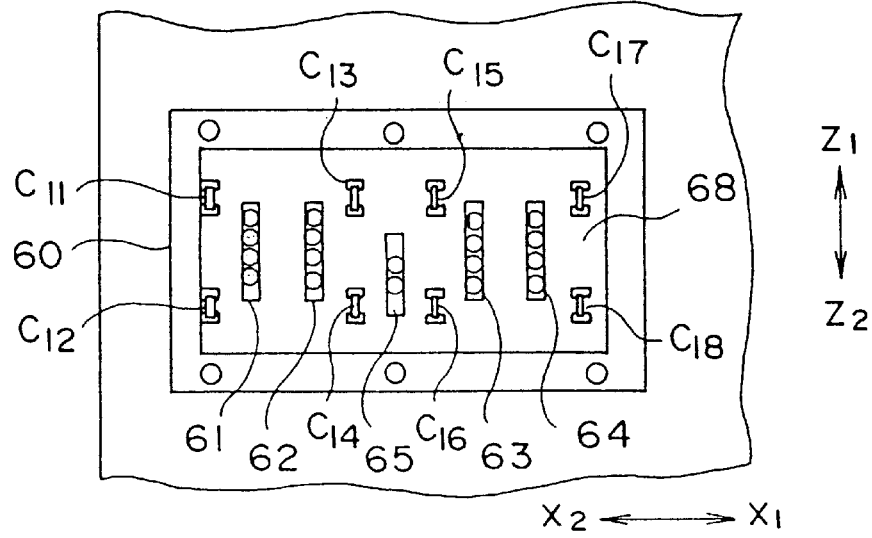

FIGS. 32A–32C show the process of forming a conductor pattern for the power supply structure 110 on the rear surface 132a of the rear panel 132.

Referring to FIG. 32A, a continuous conductor plane 83 forming the outermost layer of the multilayered rear panel 132 is patterned to form two, mutually adjacent windows 84 and 85, wherein an isolated conductor strip pattern 90 for the power conductor pins 61 and another isolated conductor strip pattern 91 for the power conductor pins 62 are formed in the windows 84. The strip pattern 90 is formed to includes pad regions 93 and 94 in continuation to the strip pattern 90 by respective bridging conductor patterns for the capacitors C11 and C12. Similarly, the strip pattern 91 includes pad regions 97 and 98 in continuation to the strip pattern 91 by respective bridging conductor patterns for the capacitors C13 and C14. Further, a pad region 92 is formed adjacent to the pad region 93 in continuation to the surrounding conductor plane 83, a pad region 95 is formed adjacent to the pad region 94 in continuation to the surrounding conductor pattern 83. Similarly, the pad regions 96 and 99 are formed respectively adjacent to the pad regions 97 and 98. Further, substantially the same patterns are formed in the window 85.

Next, in the step of FIG. 32B, a resist mask 81 is applied to the pattern of FIG. 32A such that the resist mask 81 exposes the area on which the shield block 60 is to be mounted as well as the pad regions 92–99 and further the regions of the strip patterns 90 and 91 for the part where the power conductor pins 61–64 are to be inserted as indicated in FIG. 32B by openings 111–115 and 117A–117H, and a solder paste is applied to the part thus exposed. The resist mask 81 further exposes the region where the ground pins 65 are to be inserted at openings 113.

Further, in the step of FIG. 32C, the shield block 60 is attached, the power conductor pins 61–64 and the ground pins 65 are press-fit into the rear panel 132 at respective predetermined locations, and the capacitors C11–C18 are attached so as to bridge across the adjacent pad regions. By causing a reflow in the solder paste in the state of FIG. 32C, the power supply structure 110 is completed.

Figure 33:
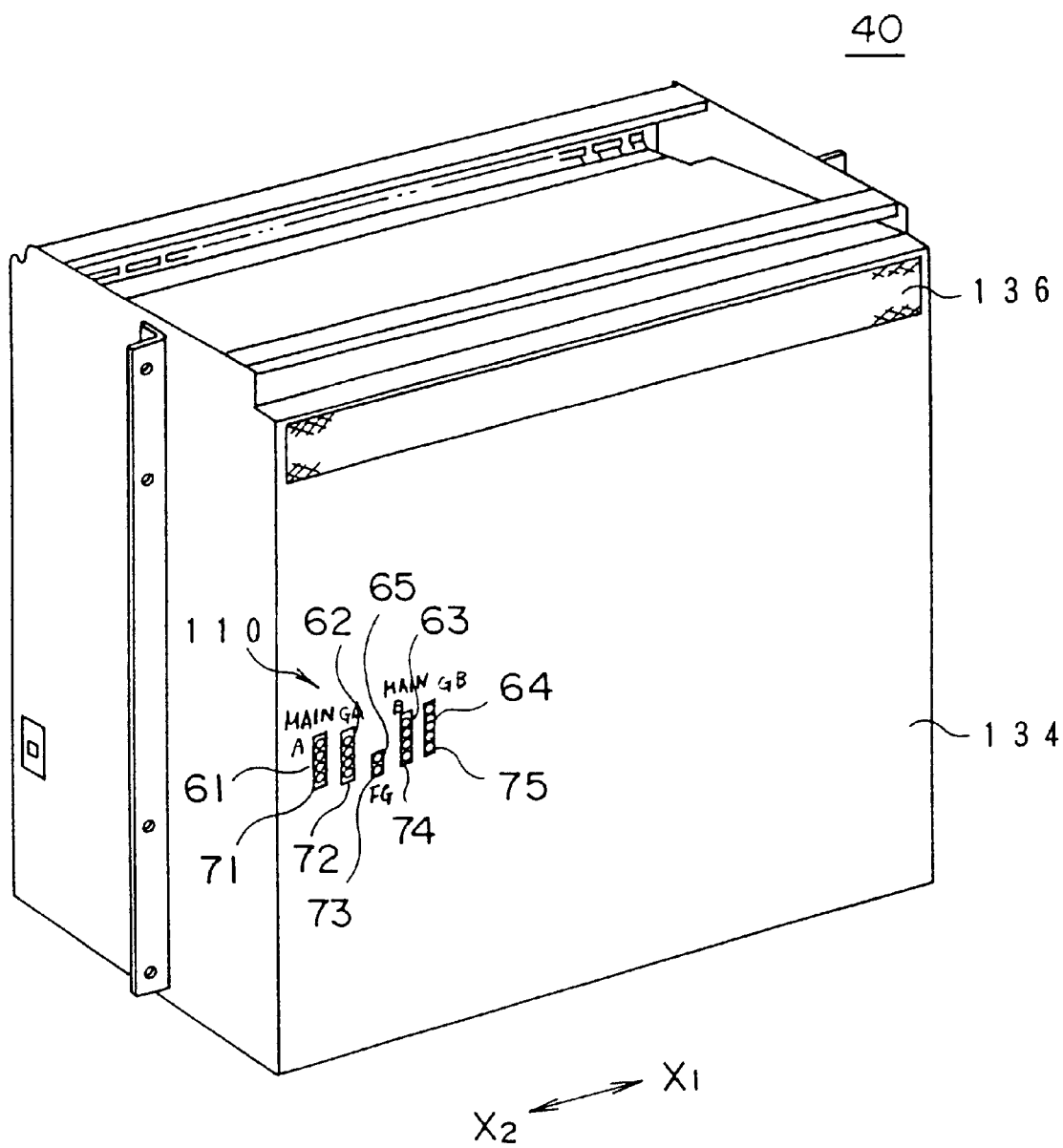
FIG. 33 is a diagram showing the power supply structure on the rear side of the optical telecommunication unit in the state that the rear cover is provided.

FIG. 33 shows the rear side of the optical telecommunication unit 40 in the state in which the rear cover 134 is provided.

It will be seen that the power conductor pins 61 for the main A power line are aligned vertically in the opening 71, the pins 62 for the main A ground line are aligned vertically in the opening 72, the pins 65 for the frame ground are aligned vertically in the opening 73, the pins 63 for the main B power line are aligned vertically in the opening 63, and the pins 64 for the main B ground line are aligned vertically in the opening 75.

FIGS. 34A–34D show a shield block 60' according to a modification of the shield block 60, wherein FIG. 34A shows the shield block 60' in a front view while FIG. 34B shows the shield block 60' in an end view. Further, FIG. 34C shows the shield block 60' in a side view while FIG. 34D shows the shield block 60' in a rear view.

Referring to the drawings, the shield block 60' is formed of a metal plate and carries, along a top flange part 60a thereof, a number of leaf springs 60A. Further, the shield block 60' includes a bottom flange part 60b, wherein the bottom flange part 60b carries, on a rear side thereof, a number of leaf springs 60B. The leaf springs 60A on the top flange part 60a engage with the rear panel 134 and the leaf springs 60B of the bottom flange part 60b engage with the rear panel 132. Thus, a reliable electric contact is guaranteed between the shield block 60' and the rear panel 132 and between the shield block 60' and the rear cover 134, by merely urging the rear panel 134 toward the rear panel 132, and a reliable shielding is achieved inside the space defined by the shield block 60'.

Figure 35:
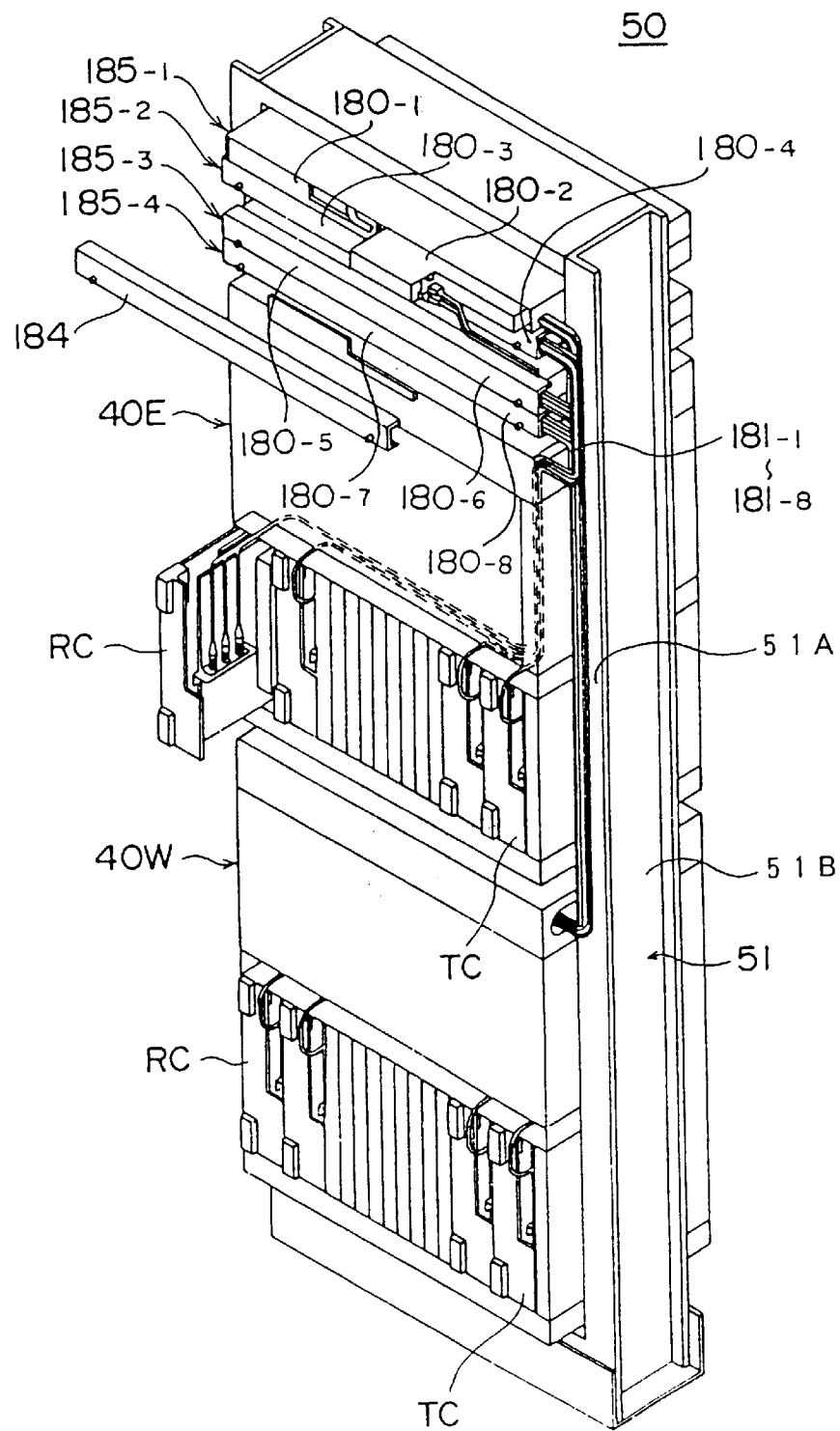
FIG. 35 is a diagram showing the construction of a 4F-BLSR telecommunication terminal according to a third embodiment of the present invention in a front oblique view.
Figure 36:
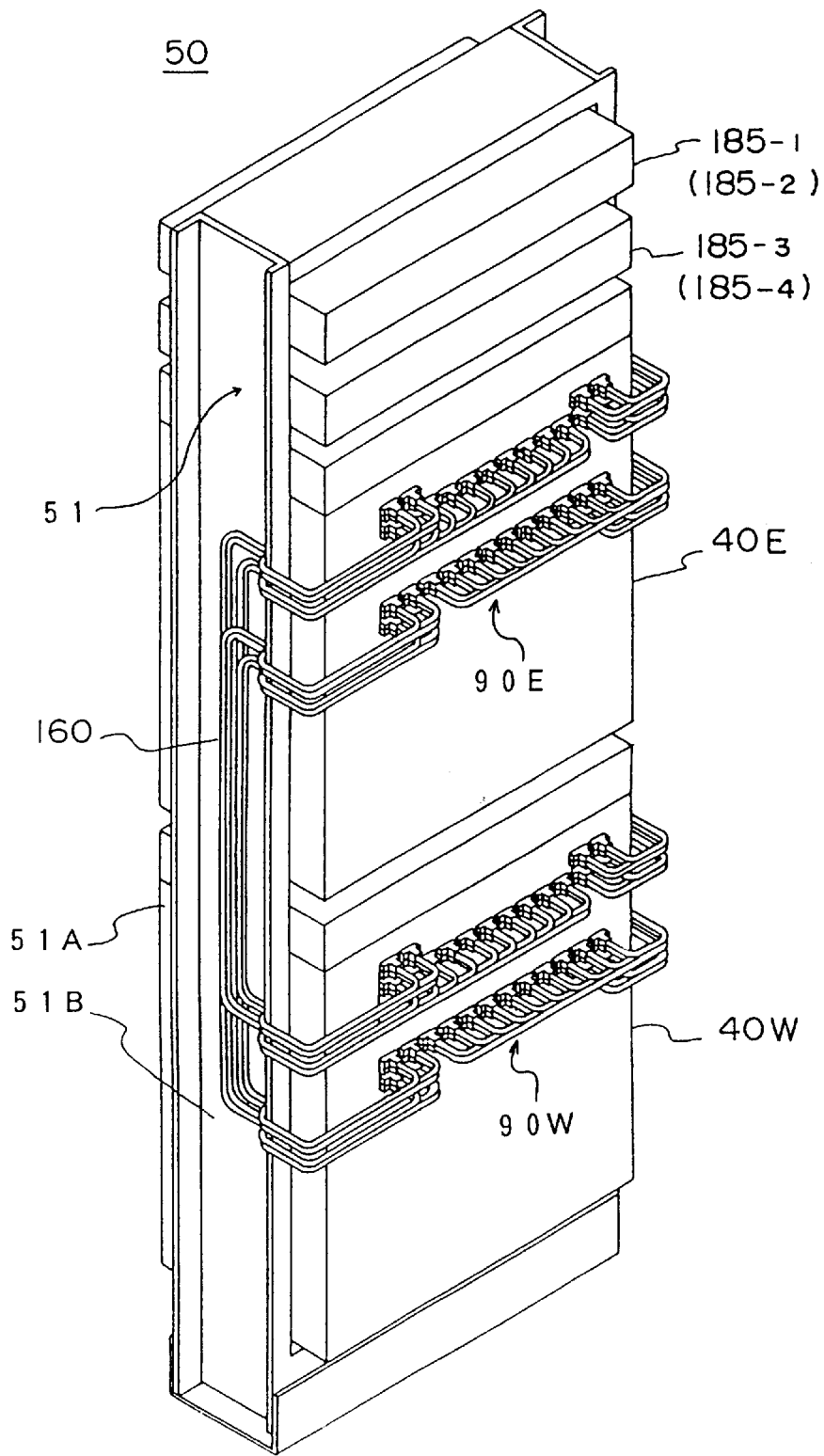
FIG. 36 is a diagram showing the 4F-BLSR terminal of FIG. 35 in a rear oblique view.

FIGS. 35 and 36 show a 4F-BLSR optical telecommunication terminal 50 formed of the optical telecommunication unit 40 according to a third embodiment of the present invention in a oblique view wherein FIG. 35 shows the terminal 50 from a front direction while FIG. 36 shows the same terminal 50 from a rear direction.

Figure 5A:
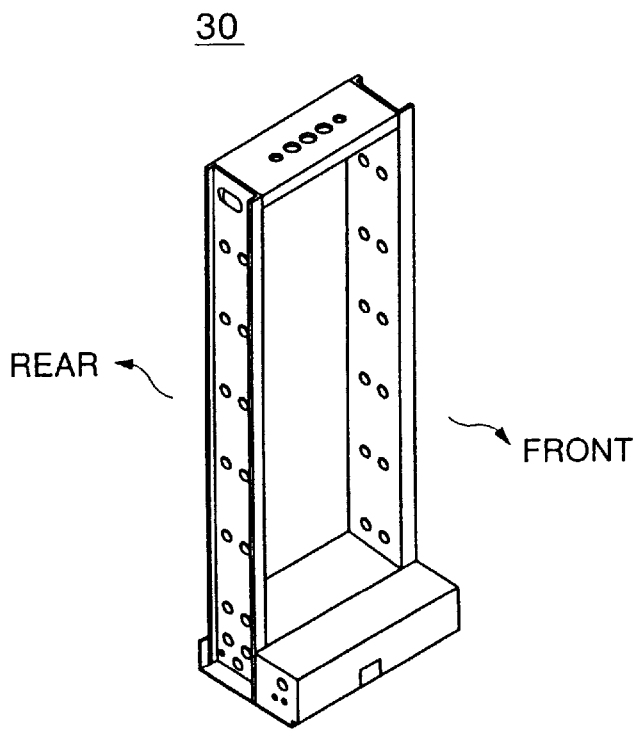
FIGS. 5A and 5B are diagrams showing standard open-rack frames used conventionally in terminals of an optical telecommunication network.
Figure 5B:
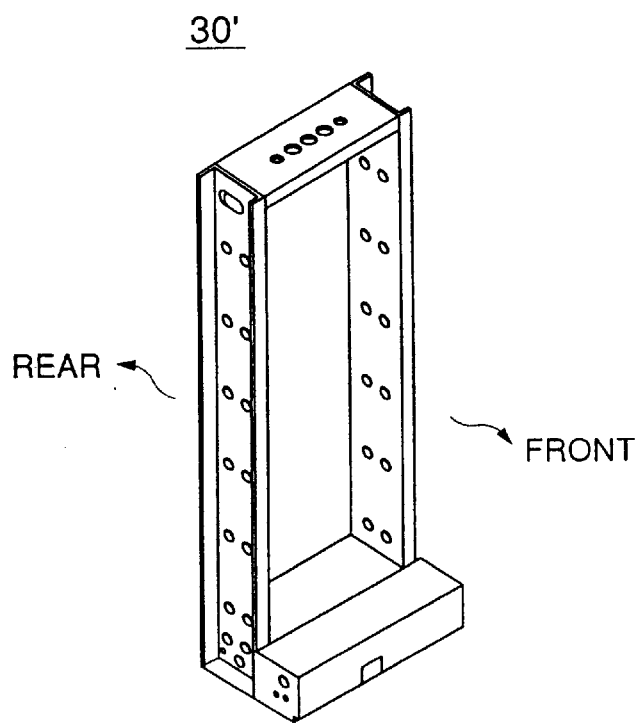

Referring to FIG. 35, the optical telecommunication terminal 50 includes a standard seven-feed open-rack frame 51 corresponding to the frame 30 of FIG. 5A or the frame 30' of FIG. 5B, wherein the open-rack frame 51 holds therein a first optical telecommunication unit 40E and a second optical telecommunication unit 40W, each having a construction identical to the construction of the optical telecommunication unit 40, in a vertical alignment.

Further, the terminal 50 includes, also in the open-rack frame 51, dispersion compensation devices $180_{-1}$–$180_{-8}$ for compensating for the dispersion of optical signals or pulses transmitted through the optical fiber cables for the incoming work channels (Wk1, Wk2) and incoming protect channels (P1, P2) as well as through the optical fiber cables for the outgoing work channels (Wk1, Wk2) and outgoing protect channels (P1, P2). It should be noted that two of the laterally adjacent optical compensation devices form together an optical compensation assembly. Thus, the dispersion compensation devices $180_{-1}$ and $180_{-2}$ form a dispersion compensation assembly $185_{-1}$, the dispersion compensation devices $180_{-3}$ and $180_{-4}$ form a dispersion compensation assembly $185_{-2}$, the dispersion compensation devices $180_{-5}$ and $180_{-6}$ form a dispersion compensation assembly $185_{-3}$, and the dispersion compensation devices $180_{-7}$ and $180_{-8}$ form a dispersion compensation assembly $185_{-4}$, The construction of the optical compensation device will be described later. Each of the optical compensation assemblies $185_{-1}$–$185_{-4}$ includes a protective cover plate 184 at a front side thereof.

Referring to FIG. 35, it will be noted that the open-rack frame 51 carries optical fiber cables $181_{-1}$–$181_{-8}$ corresponding to the foregoing incoming and outgoing optical fibers, on a front side of a front flange part 51A, and the optical fiber cables $181_{-1}$–$181_{-8}$ extend along the foregoing flange part 51A to the photoreception unit RC or the optical transmission unit TC of the optical telecommunication unit 40E or the optical telecommunication unit 40W.

Further, FIG. 36 shows that the optical telecommunication unit 40E exposes the interface connectors 90E each corresponding to the interface connector 90 described previously, wherein each of the interface connectors 90E is connected to a corresponding interface connector 90W exposed at the side of the optical telecommunication unit 40W by way of the shielded coaxial cable 160. The interface connector 90W also corresponds to the interface connector 90 described previously.

In the case of the 4F-BLSR terminal, all of the interface connectors 90E and 90W are plugged in with the plug-in connectors 161 at the end of the coaxial cables 160, and the coaxial cables 160 extend along a side pillar 51B of the open-rack frame 51 vertically between the optical telecommunication unit 40E and the optical telecommunication unit 40W. As there is no interface connectors 90E or 90W remaining in the exposed state, no electromagnetic emission occurs through an exposed interface connector. Further, the problem of electromagnetic emission through power cables is successfully eliminated as described already with reference to the power supply structure 110.

Figure 37:
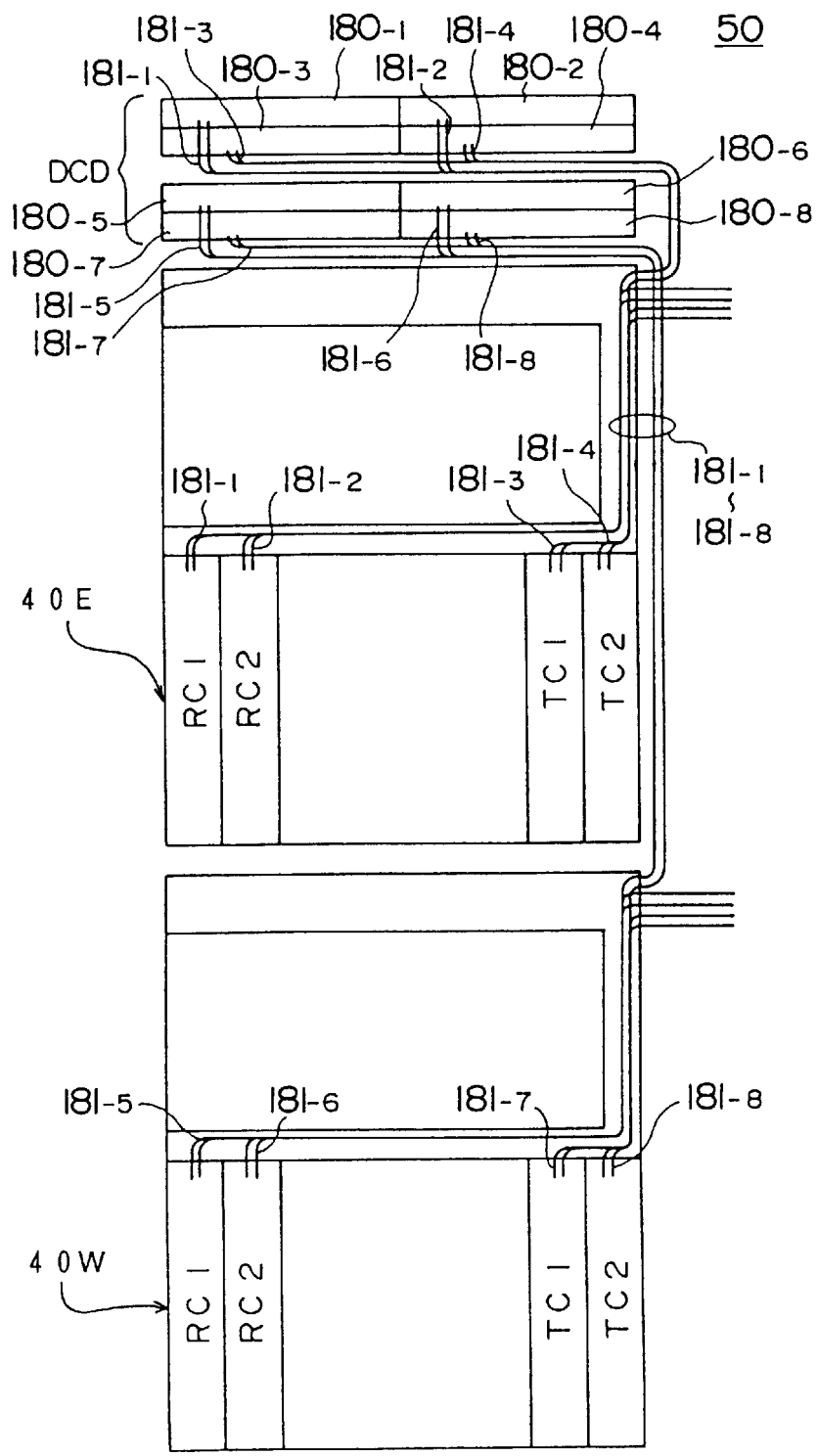
FIG. 37 is a diagram showing the arrangement of optical fibers in the optical telecommunication terminal of FIG. 35.

FIG. 37 shows the connection of the optical fiber cables $181_{-1}$–$180_{-8}$ in the optical terminal 50.

Referring to FIG. 37, the optical fiber cable $181_{-1}$ connects the dispersion compensation device $180_{-1}$ to the photoreception device RC1 of the optical telecommunication unit 40E, the optical fiber cable $181_{-2}$ connects the dispersion compensation device $180_{-2}$ to the photoreception device RC2 of the optical telecommunication unit 40E, the optical fiber cable $181_{-3}$ connects the dispersion compensation device $180_{-3}$ to the optical transmission device TC1 of the optical telecommunication unit 40E, and the optical fiber cable $181_{-4}$ connects the dispersion compensation device $180_{-4}$ to the optical transmission device TC2 of the optical telecommunication unit 40E. Similarly, the optical fiber cable $181_{-5}$ connects the dispersion compensation device $180_{-5}$ to the photoreception device RC1 of the optical telecommunication unit 40W, the optical fiber cable $181_{-6}$ connects the dispersion compensation device $180_{-6}$ to the photoreception device RC2 of the optical telecommunication unit 40W, the optical fiber cable $181_{-7}$ connects the dispersion compensation device $180_{-7}$ to the optical transmission device TC1 of the optical telecommunication unit 40W, and the optical fiber cable $181_{-8}$ connects the dispersion compensation device $180_{-8}$ to the optical transmission device TC2 of the optical telecommunication unit 40W.

Figure 38:
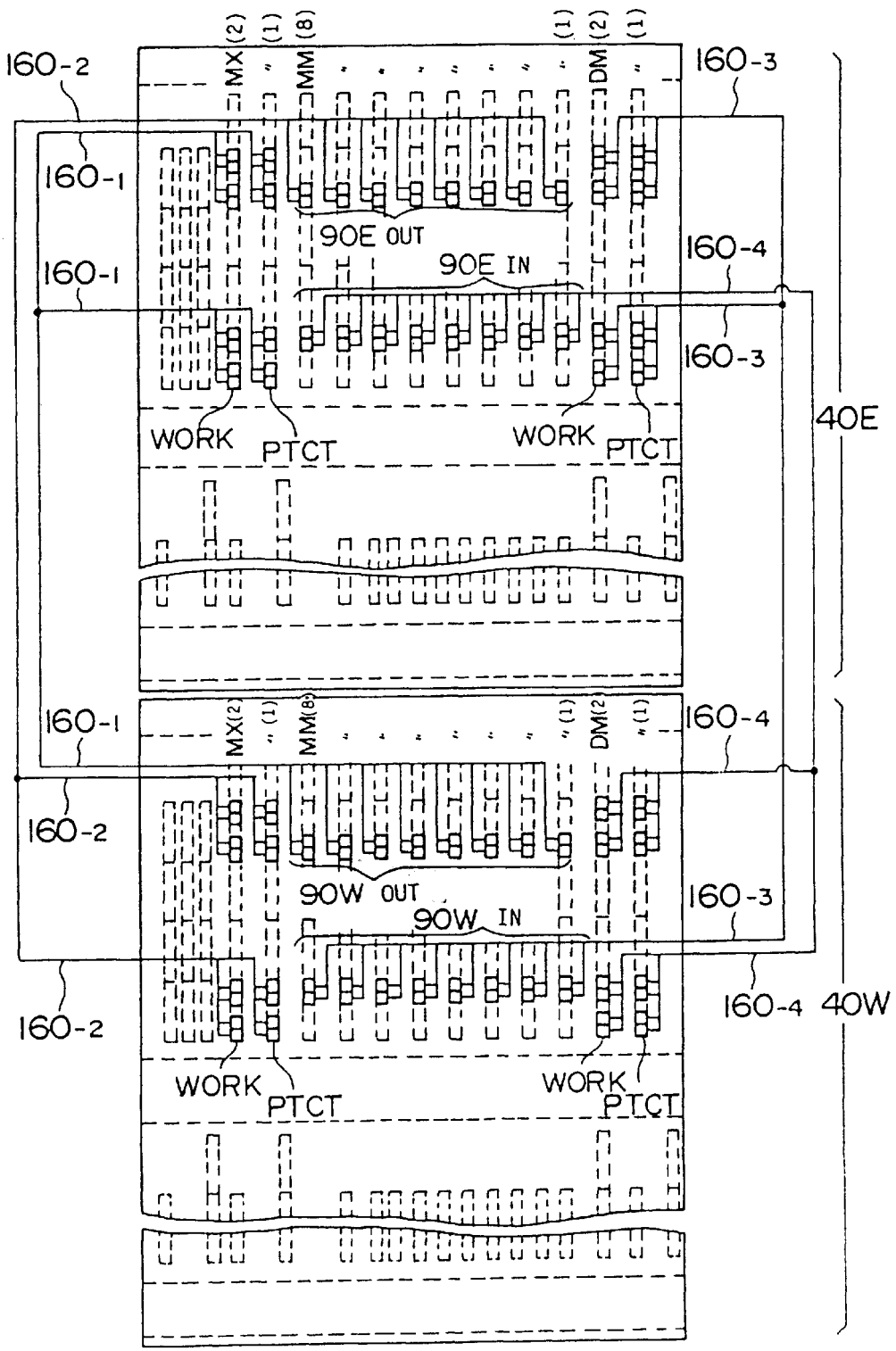
FIG. 38 is a diagram showing the arrangement of coaxial cables in the optical telecommunication terminal of FIG. 35.

FIG. 38 shows the connection of the coaxial cables 160 for realizing the interconnection shown in FIG. 11 with reference to the construction of the 4F-BLSR terminal.

Referring to FIG. 38 in comparison with FIG. 11, coaxial cables $160_{-3}$ included in the aforementioned coaxial cables 160 are used for connecting the outputs of the demultiplexing devices DM(1) and DM(2) forming the photoreception units $(21A)_{Wk1}$ and $(21A)_{P1}$ of the east side unit 40E to the corresponding switch devices MM1–MM8 forming the switch units $(21B)_{Wk2}$ and $(21B)_{P1}$ of the west side unit 40W via interface connectors $90E_{OUT}$ and $90W_{IN}$. Similarly, coaxial cables $160_{-4}$ included in the coaxial cables 160 are used for connecting the outputs of the demultiplexing devices DM(1) and DM(2) forming the photoreception units $(21A)_{Wk2}$ and $(21A)_{P2}$ of the west side unit 40W to the corresponding switch devices MM1–MM8 forming the switch units $(21B)_{Wk1}$ and $(21B)_{P2}$ of the east side unit 40E via interface connectors $90W_{OUT}$ and $90E_{IN}$. Further, coaxial cables $160_{-1}$ included in the coaxial cables 160 are used for connecting the outputs of the switch devices MM1–MM8 forming the switch devices $(21B)_{Wk1}$ and $(21B)_{P2}$ of the east side optical telecommunication unit 40E to the multiplexing devices MX(1) and MX(2) forming the optical transmission devices $(21C)_{Wk2}$ and $(21C)_{P1}$ of the west side optical telecommunication unit 40W via interface connectors $90E_{OUT}$ and $90W_{IN}$. Further, coaxial cables $160_{-2}$ included in the coaxial cables 160 are used for connecting the outputs of the switch devices MM1–MM8 forming the switch units $(21B)_{Wk2}$ and $(21B)_{P1}$ of the west side optical telecommunication unit 40W to the multiplexing devices MX(1) and MX(2) forming the optical transmission units $(21C)_{Wk1}$ and $(21C)_{P2}$ of the east side optical telecommunication unit 40E via interface connectors $90W_{OUT}$ and $90E_{IN}$. The interface connectors $90E_{IN}$, $90E_{OUT}$, $90W_{IN}$ and $90E_{OUT}$ form the aforementioned interface connectors 90.

As a result of the interconnection indicated in FIG. 38, the 4F-BLSR terminal 50 can switch the optical signals as explained with reference to FIG. 3A or 3B upon occurrence of a failure in the optical network.

Figure 39B:
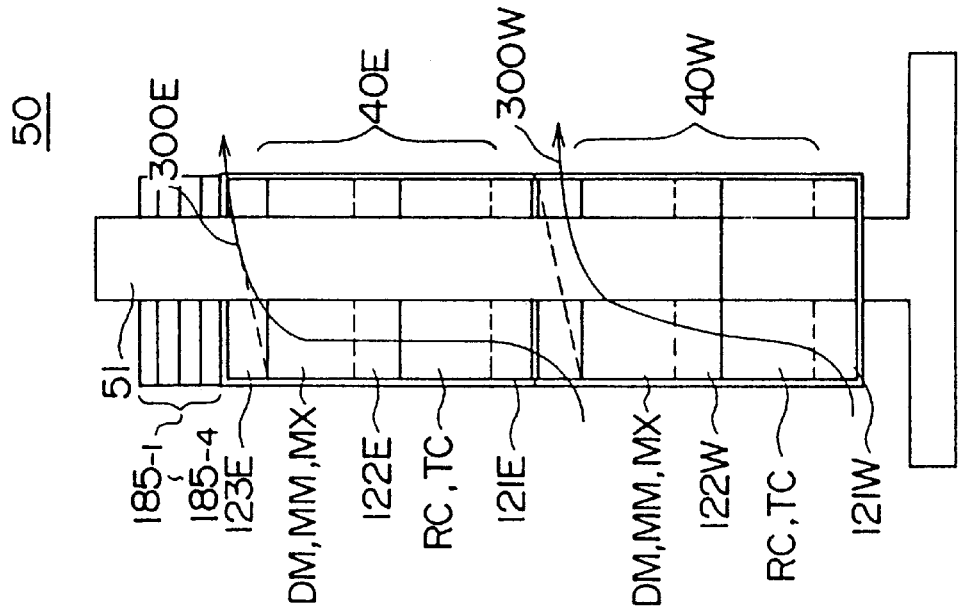
FIGS. 39A nad 39B are diagrams showing the cooling of the optical telecommunication terminal of FIG. 35.
Figure 39A:
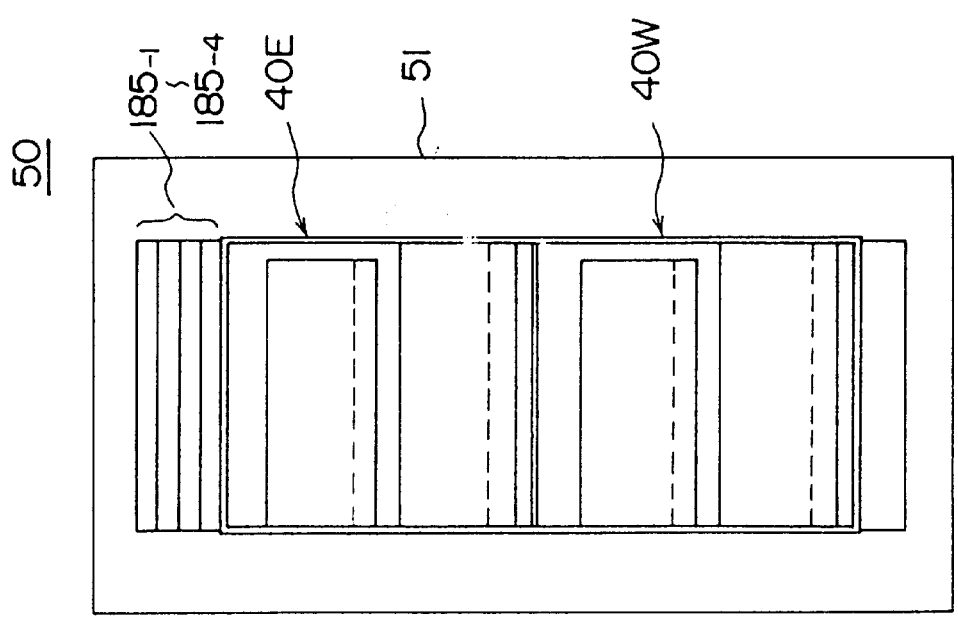

FIGS. 39A and 39B show the cooling of the 4F-BLSR terminal 50, wherein FIG. 39A shows a front view of the terminal while FIG. 39B shows a side view.

Referring to FIGS. 39A and 39B, the cooling of the terminal 50 is carried out separately for the optical telecommunication unit 40E and the optical telecommunication unit 40W respectively by a blower unit 121E, 122E and 121W, 122W each corresponding to the blower unit 122. Thereby, an efficient cooling is guaranteed for both of the optical telecommunication units 40E and 40W.

Figure 40:
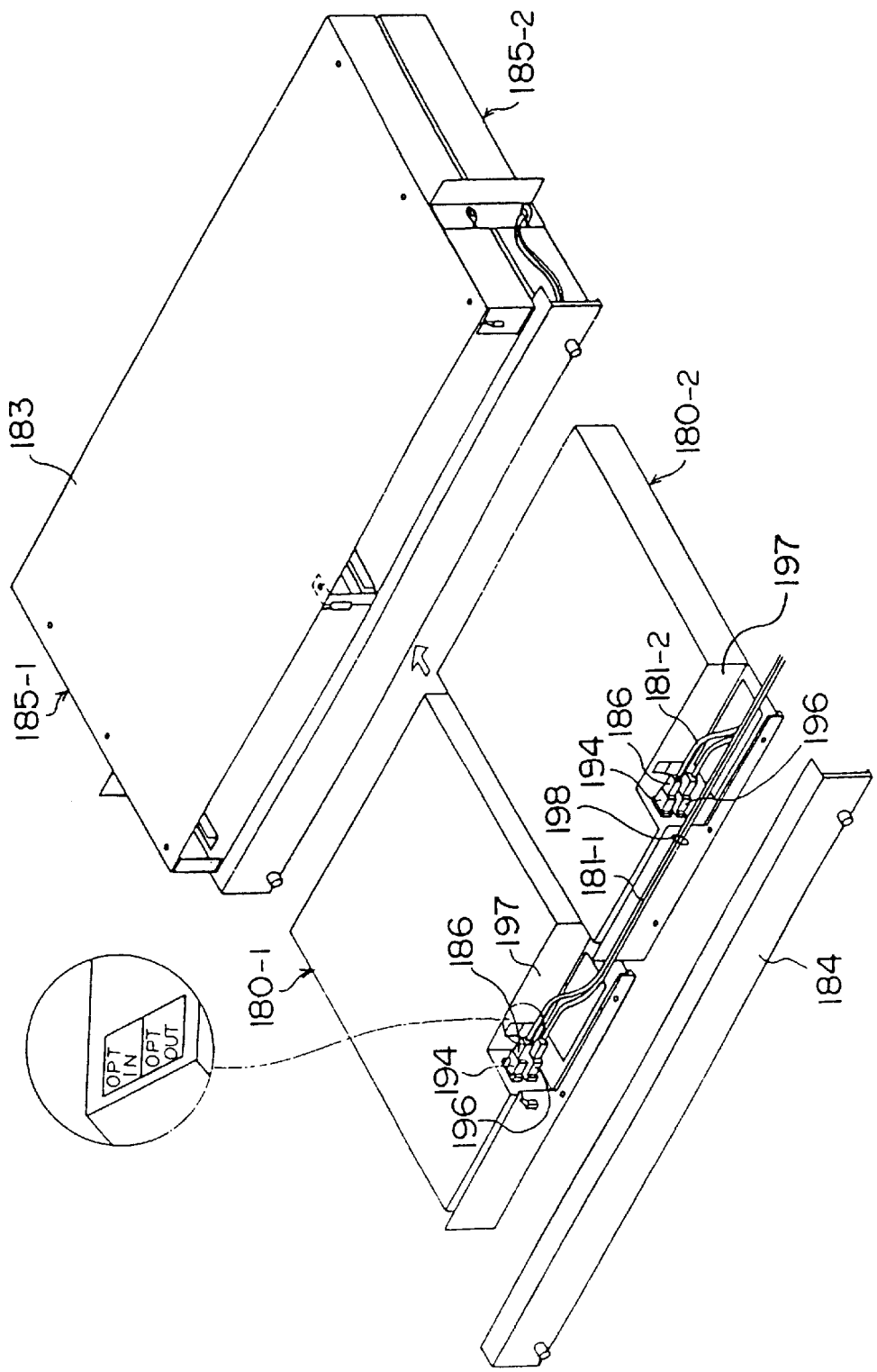
FIG. 40 is a diagram showing the construction of a dispersion compensating unit according to a fourth embodiment of the present invention in an exploded view.

FIG. 40 shows the dispersion compensating assembly $185_{-1}$ used in the optical telecommunication terminal 50 according to a fourth embodiment of the present invention in an exploded view.

Referring to FIG. 40, the dispersion compensating assembly $185_{-1}$ includes a case 183 provided on a similar case for the dispersion compensating assembly $185_{-2}$, and the dispersion compensating devices $180_{-1}$ and $180_{-2}$ are accommodated in the case 183 side by side. Further, a front cover 184 protects the dispersion compensating devices $180_{-1}$ and $180_{-2}$ held inside the case 183. As other dispersion compensating assemblies $185_{-2}$ $185_{-4}$ has substantially the same construction, description of the dispersion compensating assemblies $185_{-2}$–$185_{-4}$ will be omitted.

Each of the dispersion compensating devices $180_{-1}$ and $180_{-2}$, in turn, carries optical connectors 194 and 196 in a space 197 for engagement with corresponding optical connectors 186 provided at an end of an optical fiber cable $181_{-1}$ or $181_{-2}$. The upper connector 194 is used for receiving an optical signal from an external optical fiber cable and the lower connector 196 is used for outputting an optical signal to the optical fiber cable $181_{-1}$ or $181_{-2}$.

Figures 41A, 41B, 41C:
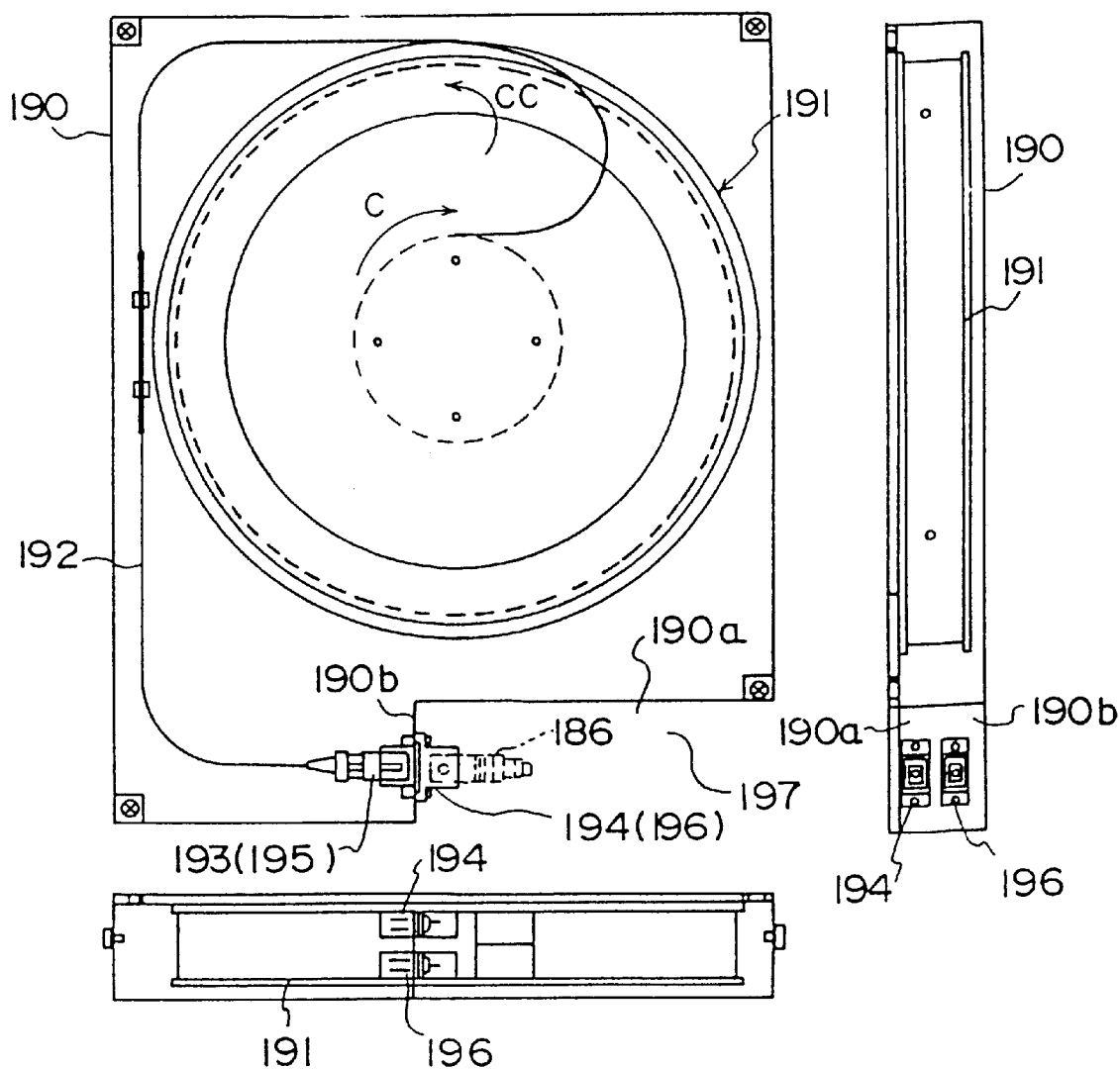
FIGS. 41A–41C are diagrams showing the interior of the dispersion compensating unit of FIG. 40 in a perspective view.

FIGS. 41A–41C show the internal construction of the dispersion compensating device $180_{-1}$ in a perspective view, wherein FIG. 41A shows the device from a top direction while FIGS. 41B and 41C show the device from two, mutually perpendicular lateral directions.

Referring to the drawings, the dispersion compensating device $180_{-1}$ includes a drum 191 or bobbin in a case 190 formed with a cutout part 190a defining the space 197 at a front part thereof, wherein the drum 191 carries a coil of a dispersion compensating optical fiber 192 such that a first end of the optical fiber 192 is connected to the upper optical connector 194 via a corresponding optical connector 193 and a second end of the optical fiber 192 is connected to the lower optical connector 196 via a corresponding optical connector 195. The dispersion compensating optical fiber 192 has a length of several ten kilometers, and the optical signal or pulse incident to the optical fiber 192 from an external optical fiber via the optical connectors 194 and 193 experiences a dispersion compensation effect as it travels through the optical fiber 192 before reaching the optical connector 195. Thereby, the diameter of the innermost part of the bobbin 191 is set such that the curvature of the optical fiber 192 does not cause unwanted deterioration in the optical signals transmitted therethrough.

By forming the cutout part 190a at the front side of the case 190, the fragile optical connectors 194 and 196 extend inside the foregoing space 197 in a direction parallel to the front edge of the case 190. In FIG. 41A, it should be noted that the optical connectors 194 and 196 are provided on a surface 196b defining the foregoing space 197 together with the cutout surface 190a. Thereby, the optical fiber cables connected to the connectors 194 and 196 are protected inside the space 197. Further, the problem of sharp bend of the optical fiber cables is avoided for the optical fiber cables connected to the optical connectors 194 and 196. See FIG. 40.

As other optical dispersion compensating devices $180_{-2}$–$180_{-8}$ have substantially the same construction, the description thereof will be omitted.

By providing the optical dispersion compensating devices $180_{-1}$–$180_{-8}$ inside the open-rack frame 51 in the form of a DCD unit as indicated in FIG. 37, the wiring of the optical fiber cables inside the optical telecommunication terminal 50 is simplified significantly.

Figure 42:
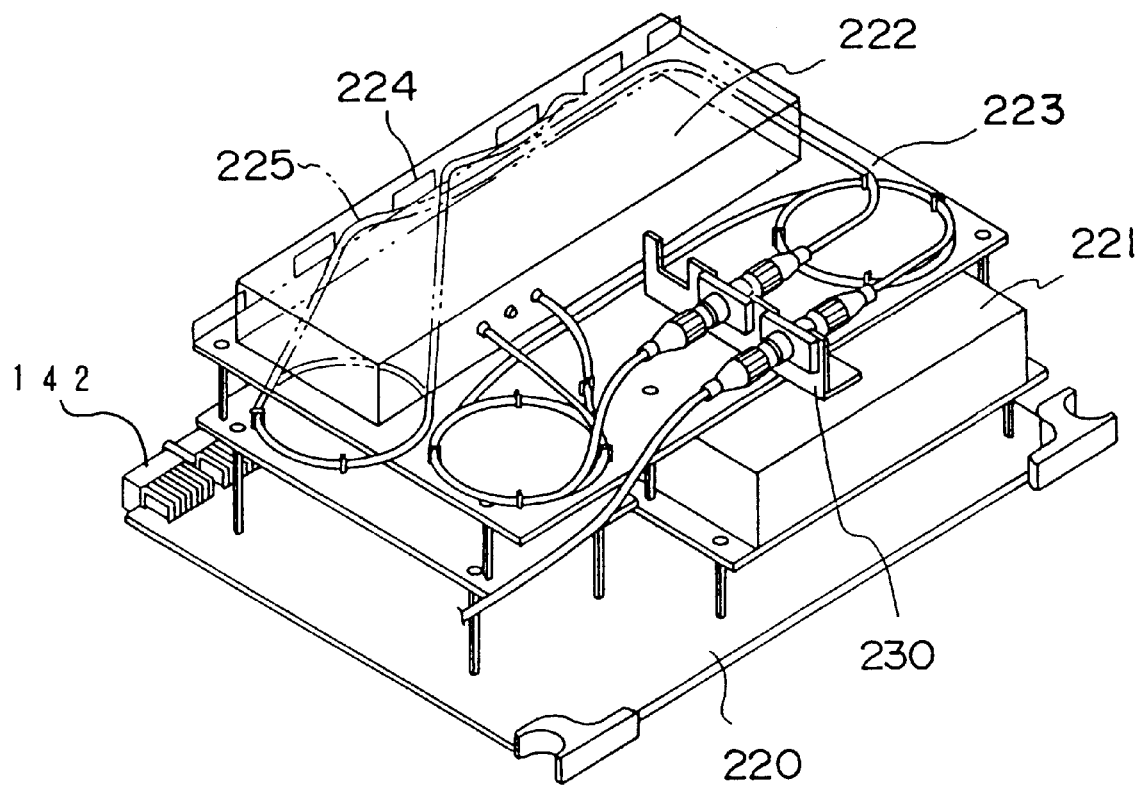
FIG. 42 is a diagram showing the construction of a plug-in optical transmission unit used in the optical telecommunication unit according to a fifth embodiment of the present invention.
Figure 43:
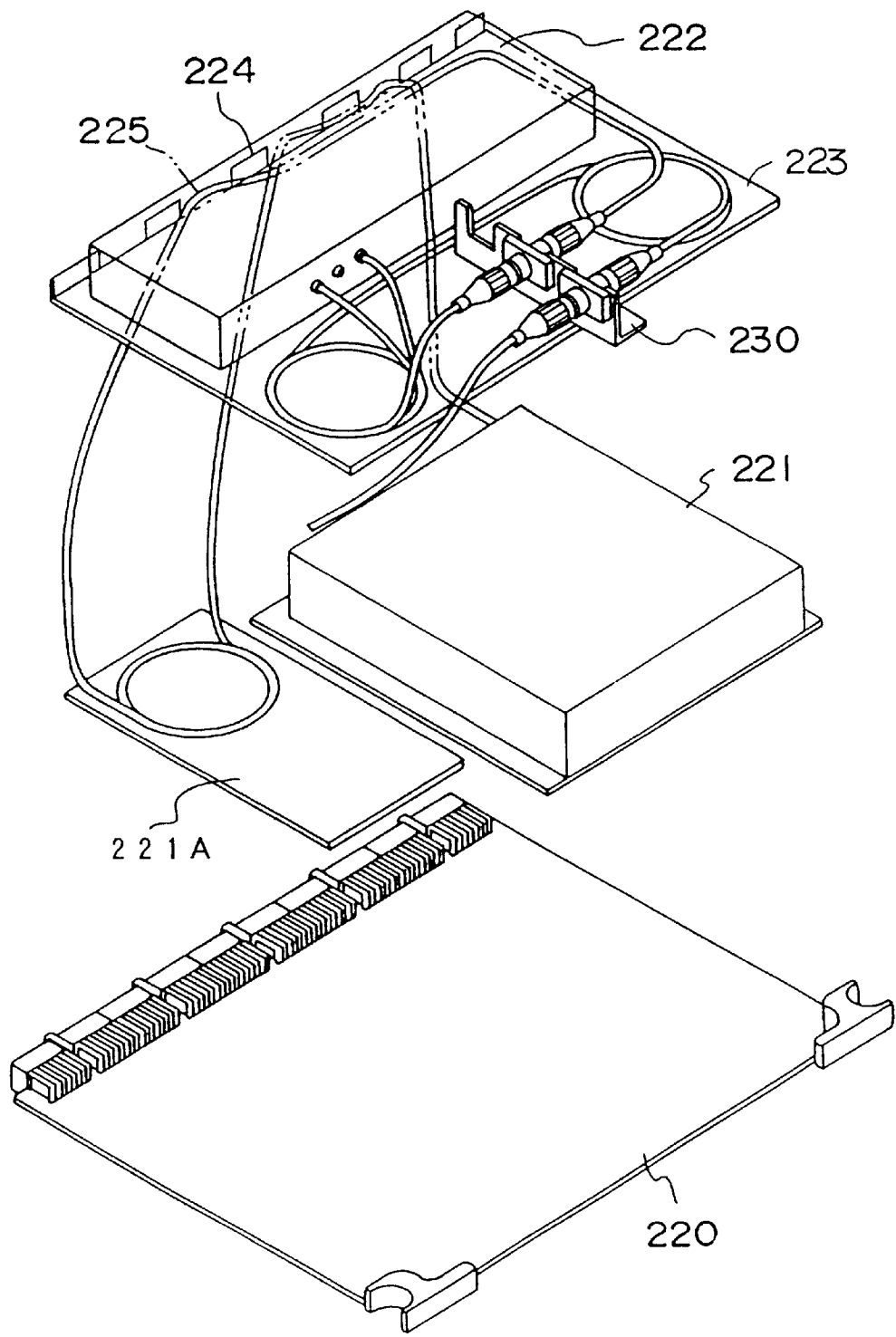
FIG. 43 is a diagram showing the optical transmission unit of FIG. 42 in an exploded view.

FIGS. 42 and 43 show the construction of the optical transmission device TC used in the optical telecommunication unit 40 as the device TC(1) or TC(2) according to a fifth embodiment of the present invention, wherein FIG. 42 shows the device TC in the assembled state while FIG. 43 shows the device TC in an exploded state.

Referring to FIGS. 42 and 43, the optical transmission device TC includes a printed circuit board 220 carrying the plug-in connector 142 at an edge thereof, wherein an E/O unit 221 including a laser diode for electric-to-optical (E/O) conversion is provided above the printed circuit board 220 with a separation therefrom.

On the E/O unit 221, there is provided a base board 223 carrying thereon an optical amplifier unit 222 for optical amplification of the optical signals produced by the E/O unit 221, wherein the base board 223 is formed of a metal plate formed with tongues 224 for catching an optical fiber 225 extending from the E/O unit to the optical amplifier unit 222. On the base board 223, there is further provided an optical connector assembly 230 for removably connecting the optical fiber 225 from the E/O unit 221 to a corresponding optical fiber leading to the optical amplifier 222. Further, the optical fiber carrying an optical output of the optical amplifier 222 is removably connected to a corresponding output optical fiber cable at the optical connector assembly 230.

Further, a plate 221A is provided also on the printed circuit board 220 adjacent to a base board that supports the E/O unit 221 thereon, with a separation from the printed circuit board 220, for supporting a loose part of the optical fiber 225.

According to the construction of FIGS. 42 and 43, the optical amplifier 222 can be bypassed when necessary or appropriate, by merely connecting the optical fiber 25 directly to the output optical fiber cable at the optical connector assembly 230.

FIGS. 44A–44F show the construction of the optical connector assembly 230.

Referring to the drawings, the optical connector assembly 230 includes a base bracket 230A including adaptor sites 230a–230c for holding optical adaptors of various types. Thus, the adaptor sites 230a–230c include respectively cutouts $230a_{-1}$–$230a_{-3}$ each having a width C and accommodating an optical adaptor 240 of an SC/SC type and mounting screw holes $230a_{-2}$–$230c_{-2}$ for accepting mounting screws 232.

FIG. 44B shows an example in which the base bracket 230A carries an optical adaptor 241 of an ST/SC type, while FIG. 44C shows an example in which the base bracket 230A carries an optical adaptor 242 of an FC/SC type. It should be noted that the SC/SC type adaptor connects an optical connector of an SC type to an optical connector of another SC type, wherein an SC type optical connector establishes an optical connection by a mere insertion of an optical connector plug to a corresponding connector socket. On the other hand, an ST type optical connector includes a connector body 244 for engagement with the foregoing cutouts such as the cutout $230c_{-1}$ and establishes the desired optical connection upon twisting of an optical connector plug after insertion to a corresponding connector socket. Further, an FC type optical connector is screwed into a corresponding optical socket for optical connection. The optical connector body 244 is fixed upon the foregoing bracket 230A by the screws 232 screwed into corresponding screw holes 243.

FIG. 44D shows an example in which optical connector plugs at respective ends of optical fiber cables are connected to the corresponding optical adaptors of FIG. 44A, while FIG. 44E shows an example of connecting an ST type connector plug to an SC type connector socket. Further, FIG. 44F shows an example of connecting a FC type connector plug to an SC type connector socket.

By providing the optical adaptor of FIG. 44A on the optical transmission unit of FIG. 43, the user of the optical telecommunication terminal can continuously use the optical fiber cable with a standard that has been adopted by the user in the past. Conversely, the manufacturer of the optical telecommunication terminal can eliminate the extraneous process of adapting the specification of the connectors to each of the customers, and the cost of the telecommunication terminal is reduced.

Figure 45:
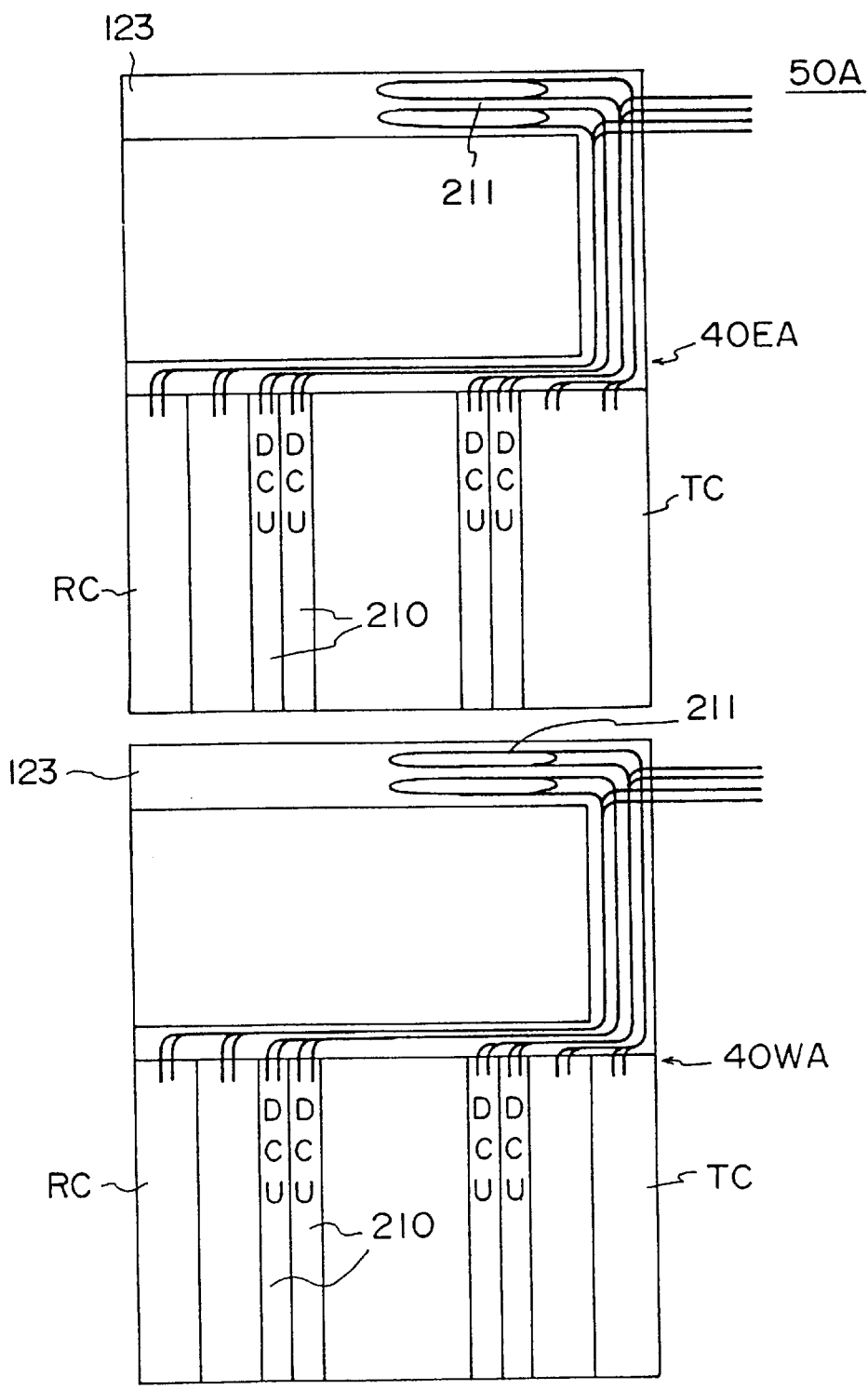
FIG. 45 is a diagram showing a modification of the optical telecommunication unit of FIG. 37.

FIG. 45 shows a modification 50A of the optical telecommunication terminal 50 of FIG. 37 in which a dispersion compensating unit DCU is provided inside an optical telecommunication unit 40EA or 40WA each corresponding to the optical telecommunication unit 40 in the form of a plug-in unit 210.

Referring to FIG. 45, an incoming optical fiber is first accommodated into a space 221 inside the optical terminal unit 123 and extends further to the photoreception unit RC in the optical telecommunication unit 40EA or 40WA via the foregoing plug-in dispersion compensating unit 210. Similarly, an outgoing optical fiber extends from an optical transmission unit TC to the optical terminal unit 123 via the dispersion compensating unit 210 and further therefrom to the outside of the terminal 50A.

Figure 46:
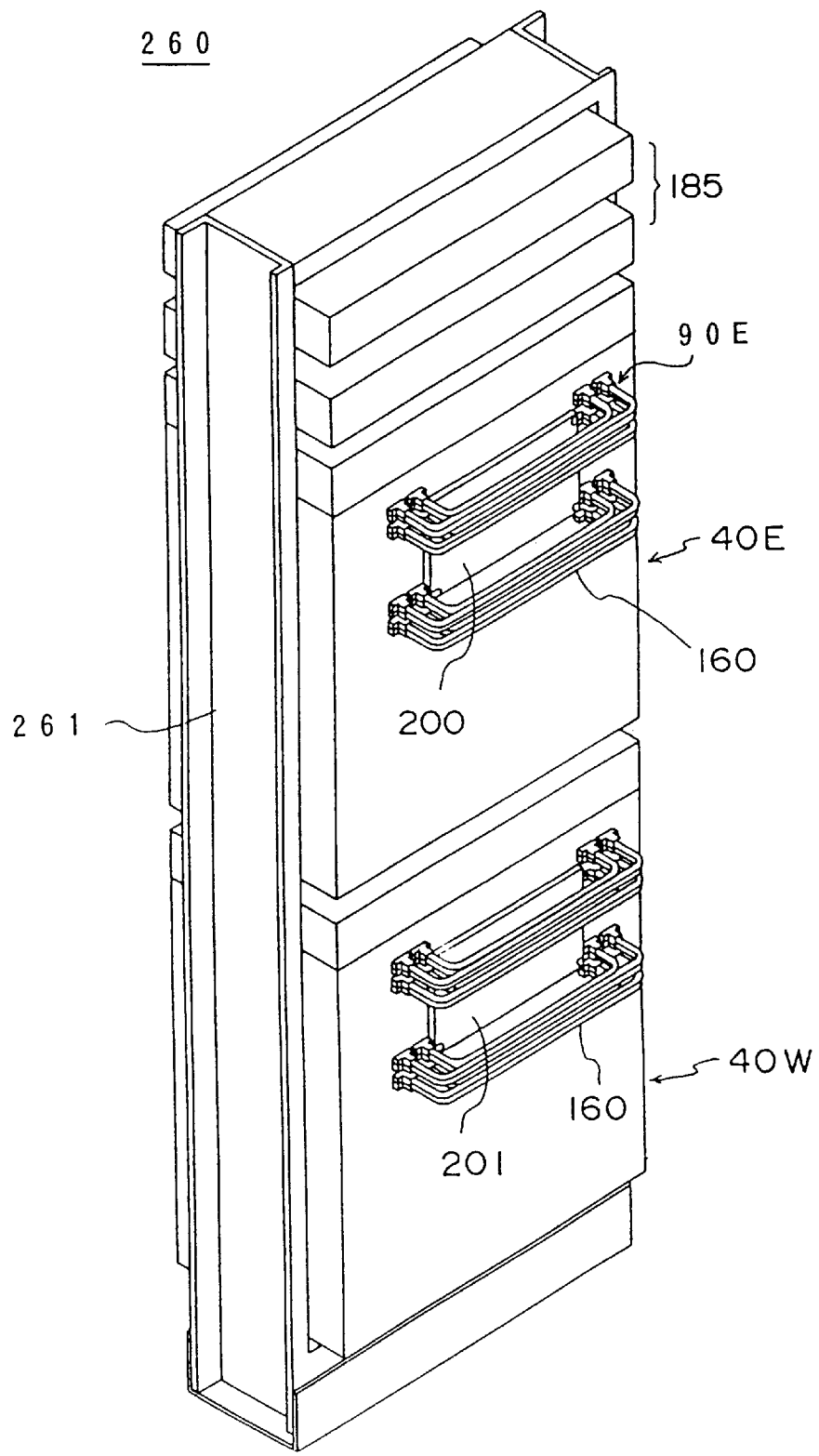
FIG. 46 is a diagram showing an optical regenerative station for a 4F-BLSR network according to a sixth embodiment of the present invention in an oblique view.

FIG. 46 shows an optical regenerative station 260 for a 4F-BLSR system corresponding to the system of FIG. 12 according to a sixth embodiment of the present invention in a rear oblique view.

Referring to FIG. 46, the regenerative station 260 includes an open-rack frame 261 corresponding to the open-rack frame 51, and a number of coaxial cables 160 are used for connecting the interface connectors 90E within the east side unit 40E with each other and further for connecting the interface connectors 90W within the west side unit 40W with each other. Further, a shield plate 200 or 201 are used for covering the interface connectors 90E or 90W not used for the connection by the coaxial cables 160.

Figure 47:
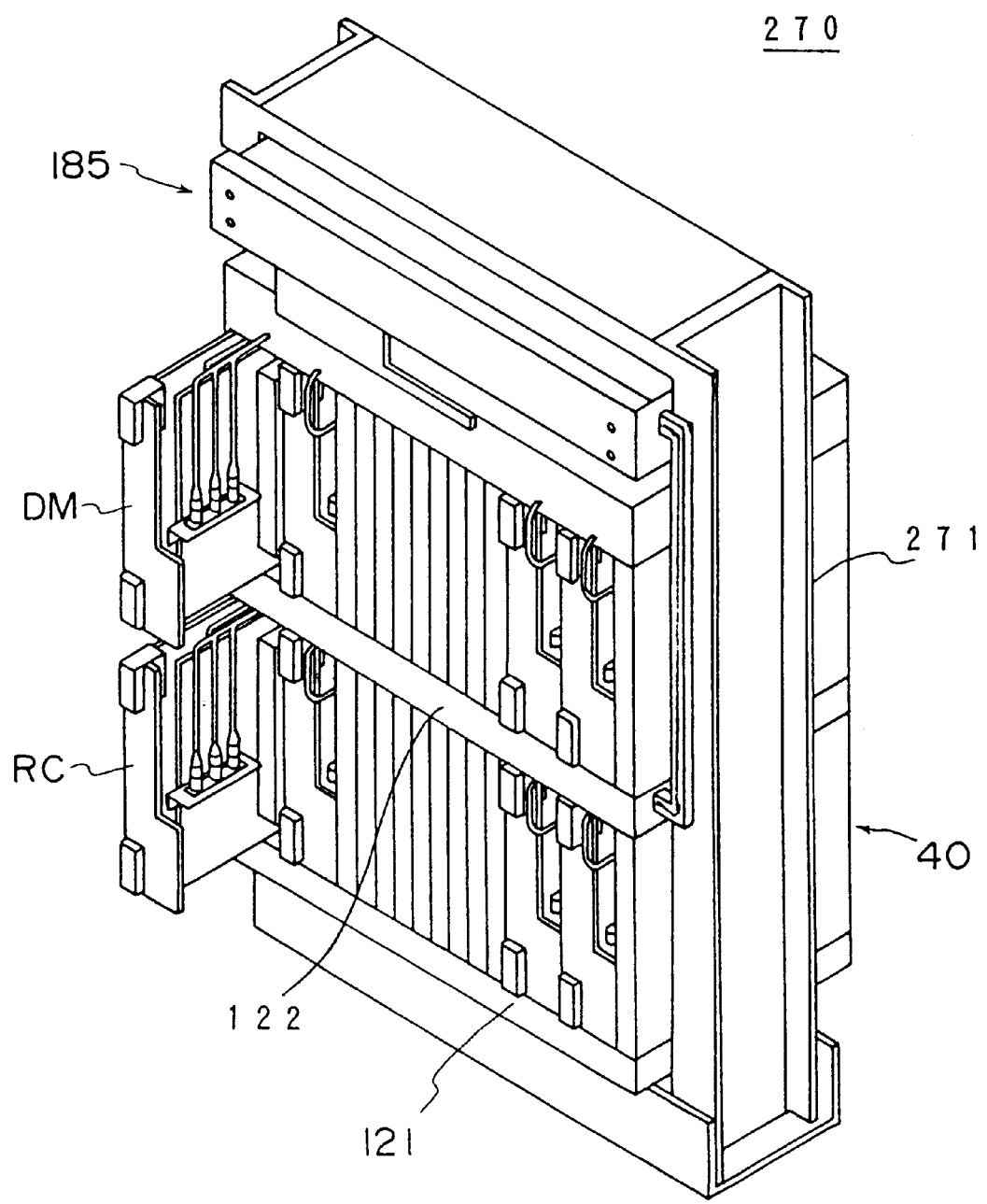
FIG. 47 is a diagram showing an optical telecommunication terminal for a 2F-BLSR network according to a seventh embodiment of the present invention.
Figure 48:
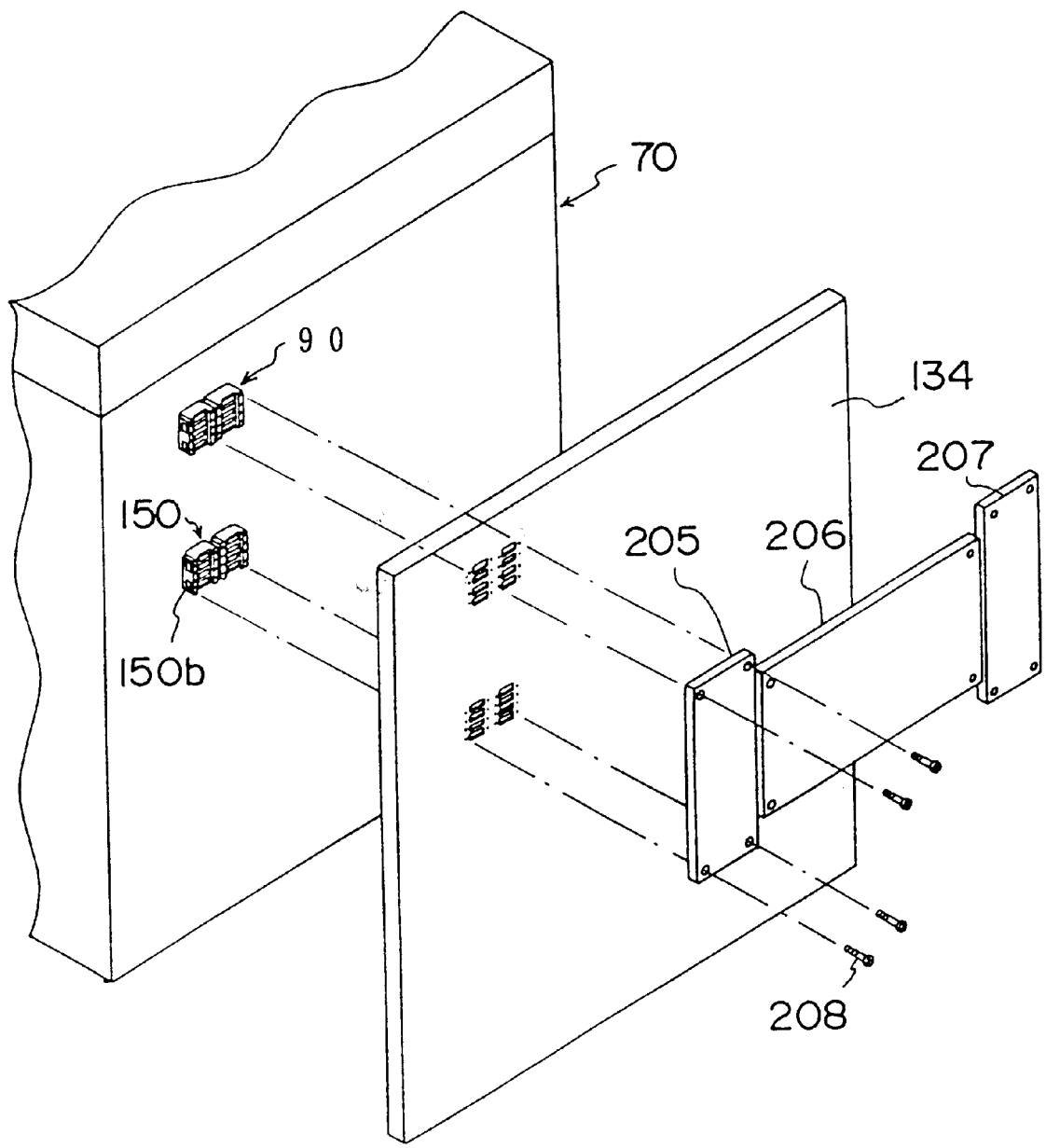
FIG. 48 is a diagram showing a rear side of the optical telecommunication apparatus of FIG. 47.

FIGS. 47 and 48 show a 2F-BLSR optical telecommunication terminal 270 corresponding to the system of FIG. 10 according to a seventh embodiment of the present invention respectively in a front oblique view and a rear oblique view.

Referring to FIG. 47, the terminal 270 includes a frame 271 accommodating therein the foregoing optical telecommunication unit 40. In the illustrated example, the frame 271 has a size corresponding to the optical telecommunication unit 40 such that only one such unit 40 is accommodated into the frame 271. However, this is not a requisite of the present embodiment and one may use the standard seven-feet open-rack frame for the terminal 270. As the interface connectors 90 are exposed at the rear cover 134 in the 2F-BLSR terminal as will be understood from the block diagram of FIG. 48, the terminal 270 uses shield plates 205–207 on the rear cover 134 for covering the exposed interface connectors 90. In the illustrated example, the shield plates 205–207 are mounted removably on the rear cover 134 by screws 208. Thus, when it is desired to construct a 4F-BLSR terminal or a regenerative station, the interface connectors 90 are exposed by merely removing shield plate 205–207.

Figure 49:
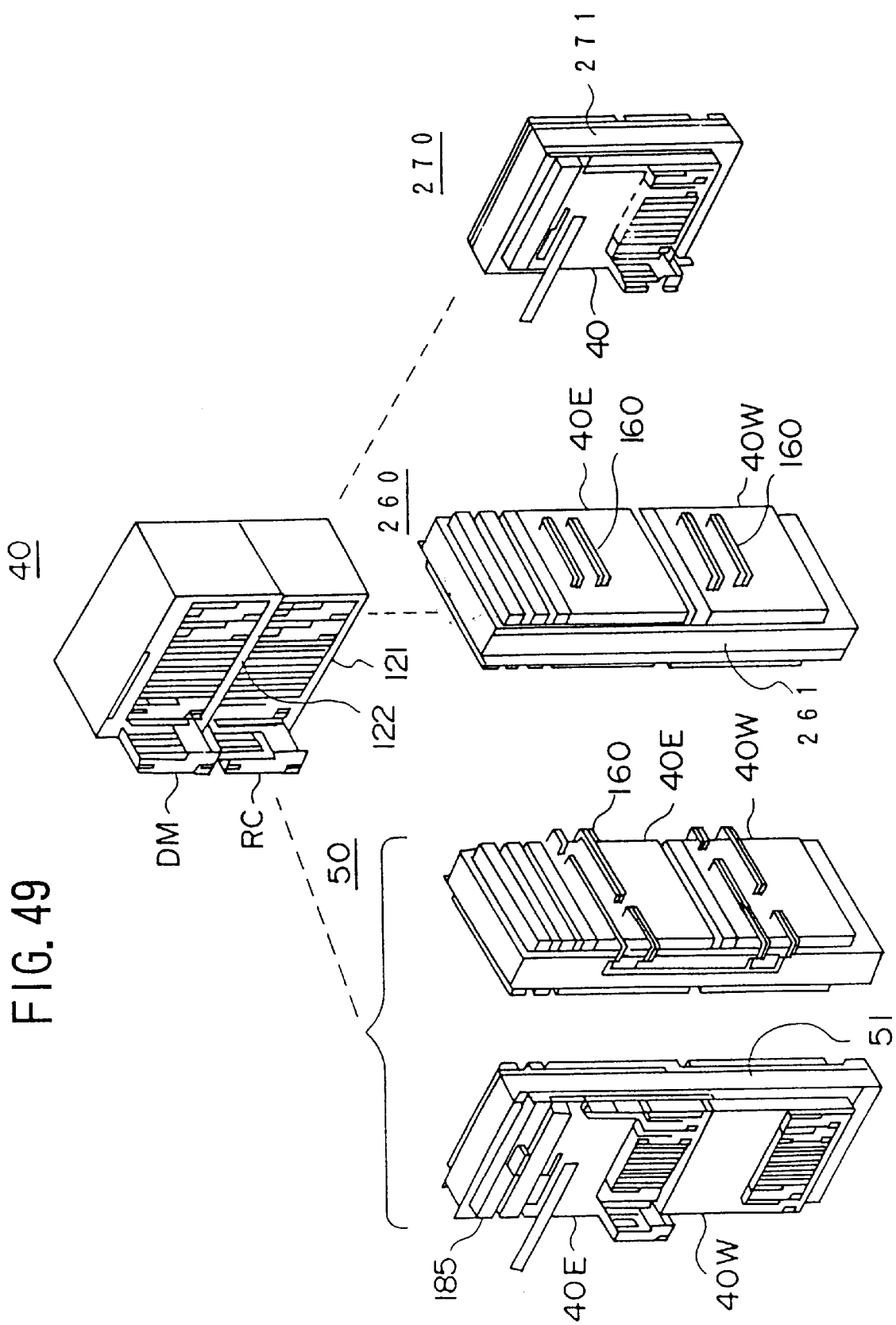
FIG. 49 is a diagram showing various optical telecommunication facilities constructed by using the optical telecommunication unit of FIG. 9.

FIG. 49 shows various optical telecommunication facilities 50, 260 and 270 constructed from the optical telecommunication unit 40. By using the same optical telecommunication unit 40, it is possible to construct the 4F-BLSR optical telecommunication terminal 50 or the regenerative station 260 within a standard open-rack frame by merely changing the interconnection of the coaxial cables 160 on the rear side. Further, it is possible to construct the 2F-BLSR terminal 270 also from the optical telecommunication unit 40.

Further, the present invention is not limited to the embodiments described heretofore, but various variations and modifications may be made without departing from the scope of the invention.

What is claimed is:

1. An optical telecommunication unit, comprising:
   a shielded case having a front opening, said shielded case having a size such that two of said shielded cases can be accommodated with a vertical alignment in a standard open-rack frame having a height of about 2100 mm, a width of about 660 mm and a depth of about 305 mm;
   a rear panel closing a rear opening of said shielded case;
   an interconnection pattern provided on said rear panel;
   a plurality of plug-in connectors provided on said rear panel at an inner side thereof in electrical connection with said interconnection pattern;
   an optical telecommunication apparatus carrying a plurality of plug-in connectors, said optical telecommunication apparatuses being provided such on said rear panel such that said plug-in connectors of said optical telecommunication apparatus establish a removal engagement with corresponding plug-in connectors on said rear panel;
   a plurality of interface connectors provided on said rear panel, each of said interface connectors including a plurality of interconnection pins studded on said rear panel in electrical contact to said interconnection pattern and a protective shroud provided on an outer side of said rear panel so as to surround said interconnection pins, said interconnection pins extending outwardly from said rear panel in each of said interface connectors for accepting an external connector, said protective shroud being adapted for guiding said external connector for insertion to and removal away from said interface connector; and
   a rear cover provided on said shielded case so as to cover said rear panel, said rear cover carrying a plurality of openings for exposing said interface connectors;
   said rear cover being adapted for carrying a shield cover plate at an outer side thereof for shielding one or more of said openings.

2. The optical telecommunication unit as claimed in claim 1, wherein said optical apparatus includes a plurality of plug-in units each adapted for a removable insertion to said plug-in connector on said rear panel through said front opening of said shielded case, said plug-in units including: a photoreception unit for receiving an optical transmission of a work channel and further an optical transmission of a protect channel; a switch unit including a plurality of switch circuit boards each adapted for a removable insertion to a corresponding plug-in connector on said rear panel, said switch unit thereby switching incoming signals, and an optical transmission unit for sending out an optical output signal for a work channel and an optical output signal for a protect channel.

3. The optical telecommunication unit as claimed in claim 1, further including a shield cover plate provided removably on said rear cover so as to cover one or more of said openings of said rear panel.

4. The optical telecommunication unit as claimed in claim 1, wherein said rear panel includes a plurality of layers each carrying a conductor pattern, and wherein said interconnection pins are press-fit into said rear panel in electrical contact to one of said conductor patterns.

5. The optical telecommunication unit as claimed in claim 1, wherein said rear panel carries a shielding conductor layer on a rear exposed surface thereof and a front exposed surface thereof.

6. The optical telecommunication unit as claimed in claim 1, further including a blower unit provided on said shielded case underneath said optical telecommunication apparatus for cooling said plug-in units and an optical terminal unit provided on said shielded case above said optical telecommunication apparatus for optical connection to an incoming optical fiber cable and an outgoing optical fiber cable.

7. The optical telecommunication unit as claimed in claim 2, wherein said plurality of plug-in units are arranged in the form of a lower first shelf and an upper second shelf, said blower unit is disposed below said first shelf, and wherein a second blower unit is disposed between said lower shelf and said upper shelf.

8. The optical telecommunication unit as claimed in claim 1, wherein said rear panel further carriers thereon power connector pins, and wherein said optical telecommunication unit further includes a shielding block between said rear panel and said rear cover so as to surround said power connector pins, said shielding block forming an electrical connection to a ground pattern provided on said rear panel.

9. The optical telecommunication apparatus as claimed in claim 1, wherein said rear panel further carries a plurality of capacitors respectively in the vicinity of a corresponding power connector pin, said shielding block thereby surrounding therein said plurality of power connector pins and said capacitors, each of said capacitors shunting a corresponding power connector pin to a ground pattern on said rear panel.

10. An optical telecommunication terminal for use in a two-fiber bidirectional-line-switched ring network, comprising:

an open-rack frame; and an optical telecommunication unit accommodated in said open-rack frame, said optical telecommunication unit comprising:

a shielded case having a front opening, said shielded case having a size such that two of said shielded cases can be accommodated with a vertical alignment in said open-rack frame;

a rear panel closing a rear opening of said shielded case;

an interconnection pattern provided on said rear panel;

a plurality of plug-in connectors provided on said rear panel at an inner side thereof in electrical connection with said interconnection pattern;

an optical telecommunication apparatus carrying a plurality of plug-in connectors, said optical telecommunication apparatuses being provided on said rear panel such that said plug-in connectors of said optical telecommunication apparatus establish a removal engagement with corresponding plug-in connectors on said rear panel;

a plurality of interface connectors provided on said rear panel, each of said interface connectors including a plurality of interconnection pins studded on said rear panel in electrical contact to said interconnection pattern and a protective shroud provided on an outer side of said rear panel so as to surround said interconnection pins, said interconnection pins extending outwardly from said rear panel in each of said interface connectors for accepting an external connector, said protective shroud being adapted for guiding said external connector for insertion to and removal away from said interface connector;

a rear cover provided on said shielded case so as to cover said rear panel, said rear cover carrying a plurality of openings for exposing said interface connectors; and a shield cover plate provided on said rear cover at an outer side thereof for shielding said openings;

said optical telecommunication apparatus being connected optically to said incoming optical fiber cable and said outgoing optical fiber cable of said work channel and said incoming optical fiber cable and said outgoing optical fiber cable of said protect channel.

11. An optical telecommunication terminal as claimed in claim 10, further including an optical fiber coil of a dispersion compensating optical fiber within said open-rack frame.

12. An optical telecommunication terminal for use in a four-fiber bidirectional-line-switched ring network, comprising:

an open-rack frame;

a first optical telecommunication unit accommodated in said open-rack frame;

a second optical telecommunication unit accommodated in said open-rack frame in a vertical alignment with said first optical telecommunication unit;

each of said first and second optical telecommunication units comprising:

a shielded case having a front opening, said shielded case having a size such that two of said shielded cases can be accommodated with a vertical alignment in said open-rack frame;

a rear panel closing a rear opening of said shielded case;

an interconnection pattern provided on said rear panel;

a plurality of plug-in connectors provided on said rear panel at an inner side thereof in electrical connection with said interconnection pattern;

an optical telecommunication apparatus carrying a plurality of plug-in connectors, said optical telecommunication apparatus being provided such on said rear panel such that said plug-in connectors of said optical telecommunication apparatus establish a removal engagement with corresponding plug-in connectors on said rear panel;

a plurality of interface connectors provided on said rear panel, each of said interface connectors including a plurality of interconnection pins studded on said rear panel in electrical contact to said interconnection pattern and a protective shroud provided on an outer side of said rear panel so as to surround said interconnection pins, said interconnection pins extending outwardly from said rear panel in each of said interface connectors for accepting an external connector, said protective shroud being adapted for guiding said external connector for insertion to and removal away from said interface connector; and a rear cover provided on said shielded case so as to cover said rear panel, said rear cover carrying a plurality of openings for exposing said interface connectors;

said rear cover being adapted for carrying a shield cover plate at an outer side thereof for shielding one or more of said openings;

said optical telecommunication apparatus of said first optical telecommunication unit being connected to an optical fiber cable of a first incoming work channel and an optical fiber cable of a first incoming protect channel and further to an optical fiber cable of a first outgoing work channel and an optical fiber cable of a first outgoing protect channel;

said optical telecommunication apparatus of said second optical telecommunication unit being connected to an optical fiber cable of a second incoming work channel and an optical fiber cable of a second incoming protect channel and further to an optical fiber cable of a second outgoing work channel and an optical fiber cable of a second outgoing protect channel;

wherein said optical telecommunication terminal further includes a coaxial cable carrying a first connector and a second connector at respective ends thereof such that said first connector is removably connected to an interface connector of said first telecommunication apparatus and said second connector is removably connected to an interface connector of said second telecommunication apparatus.

13. An optical telecommunication terminal as claimed in claim 12, further including an optical fiber coil of a dispersion compensating optical fiber within said open-rack frame.

14. An optical regenerative station for use in a four-fiber bidirectional-line-switched ring network, comprising:

an open-rack frame;

a first optical telecommunication unit accommodated in said open-rack frame;

a second optical telecommunication unit accommodated in said open-rack frame in a vertical alignment with said first optical telecommunication unit;

each of said first and second optical telecommunication units comprising:
  a shielded case having a front opening, said shielded case having a size such that two of said shielded cases can be accommodated with a vertical alignment in said open-rack frame;
  a rear panel closing a rear opening of said shielded case;
  an interconnection pattern provided on said rear panel;
  a plurality of plug-in connectors provided on said rear panel at an inner side thereof in electrical connection with said interconnection pattern;
  an optical telecommunication apparatus carrying a plurality of plug-in connectors, said optical telecommunication apparatus being provided on said rear panel such that said plug-in connectors of said optical telecommunication apparatus establish a removal engagement with corresponding plug-in connectors on said rear panel;
  a plurality of interface connectors provided on said rear panel, each of said interface connectors including a plurality of interconnection pins studded on said rear panel in electrical contact to said interconnection pattern and a protective shroud provided on an outer side of said rear panel so as to surround said interconnection pins, said interconnection pins extending outwardly from said rear panel in each of said interface connectors for accepting an external connector, said protective shroud being adapted for guiding said external connector for insertion to and removal away from said interface connector; and
  a rear cover provided on said shielded case so as to cover said rear panel, said rear cover carrying a plurality of openings for exposing said interface connectors;
  said rear cover being adapted for carrying a shield cover plate at an outer side thereof for shielding one or more of said openings;

said optical telecommunication apparatus of said first optical telecommunication unit being connected to an optical fiber cable of a first incoming work channel and an optical fiber cable of a first incoming protect channel and further to an optical fiber cable of a first outgoing work channel and an optical fiber cable of a first outgoing protect channel;

said optical telecommunication apparatus of said second optical telecommunication unit being connected to an optical fiber cable of a second incoming work channel and an optical fiber cable of a second incoming protect channel and further to an optical fiber cable of a second outgoing work channel and an optical fiber cable of a second outgoing protect channel;

wherein said optical regenerative station further includes a first coaxial cable and a second coaxial cable, said first coaxial cable carrying a first connector and a second connector at respective ends thereof such that said first connector is removably connected to an interface connector of said first telecommunication apparatus and said second connector is removably connected to another interface connector of said first telecommunication apparatus, said second coaxial cable carrying a third connector and a fourth connector at respective ends thereof such that said third connector is removably connected to an interface connector of said second telecommunication apparatus and said fourth connector is removably connected to another interface connector of said second telecommunication apparatus;

each of said first and second optical telecommunication units carrying a shield cover plate on said rear cover so as to cover one or more of said openings to which no coaxial cable is inserted.

15. An optical regenerative station as claimed in claim 14, further including an optical fiber coil of a dispersion compensating optical fiber within said open-rack frame.

* * * * *